United States Patent
Cheong et al.

(10) Patent No.: US 11,031,636 B2
(45) Date of Patent: Jun. 8, 2021

(54) PROTECTIVE CIRCUIT MODULE CASE OF BATTERY AND ELECTRONIC DEVICE INCLUDING THE SAME

(71) Applicant: Samsung Electronics Co., Ltd., Gyeonggi-do (KR)

(72) Inventors: Hyun-Mi Cheong, Gyeonggi-do (KR); Kwangjin Bae, Gyeonggi-do (KR); Howon Lee, Gyeonggi-do (KR); Hongmoon Cheon, Gyeonggi-do (KR); Byounguk Yoon, Gyeonggi-do (KR); Minsung Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 368 days.

(21) Appl. No.: 15/845,684

(22) Filed: Dec. 18, 2017

(65) Prior Publication Data

US 2018/0183112 A1     Jun. 28, 2018

(30) Foreign Application Priority Data

Dec. 23, 2016 (KR) .......................... 10-2016-0178125

(51) Int. Cl.
   *H01M 10/42* (2006.01)
   *H01M 50/10* (2021.01)
   (Continued)

(52) U.S. Cl.
   CPC ..... *H01M 10/4257* (2013.01); *H01M 10/425* (2013.01); *H01M 50/10* (2021.01);
   (Continued)

(58) Field of Classification Search
   None
   See application file for complete search history.

(56) References Cited

U.S. PATENT DOCUMENTS

| 9,123,951 B2 * | 9/2015 | Baek .................. H01M 2/06 |
| 10,297,866 B2 | 5/2019 | Choi et al. |

(Continued)

FOREIGN PATENT DOCUMENTS

| CN | 1659722 | 8/2005 |
| CN | 203150632 | 8/2013 |

(Continued)

OTHER PUBLICATIONS

European Search Report dated Oct. 14, 2019 issued in counterpart application No. 17883012.1-1108, 8 pages.

(Continued)

*Primary Examiner* — Alix E Eggerding
(74) *Attorney, Agent, or Firm* — The Farrell Law Firm, P.C.

(57) ABSTRACT

An electronic device includes a housing having a mounting portion to which a battery is mountable; and the battery mounted to the mounting portion, wherein the battery includes: a battery pouch comprising at least one conductive terminal exposed to the outside; a circuit board electrically connected to the exposed at least one conductive terminal and having at least one circuit element mounted thereon to electrically protect the battery pouch; a case including a first plate and a lateral plate extended to be bent from the first plate, wherein the circuit board is disposed in a space surrounded by the first plate and the lateral plate, and the first plate protrudes further than the accommodated circuit board in an opposite direction of a lateral wall of the battery pouch.

24 Claims, 46 Drawing Sheets

(51) Int. Cl.
*H01M 50/20* (2021.01)
*H01M 50/209* (2021.01)
*H01M 50/543* (2021.01)
*H01M 50/103* (2021.01)

(52) U.S. Cl.
CPC ......... *H01M 50/20* (2021.01); *H01M 50/209* (2021.01); *H01M 50/543* (2021.01); *H01M 50/103* (2021.01); *H01M 2010/4271* (2013.01); *H01M 2220/30* (2013.01)

(56) References Cited

U.S. PATENT DOCUMENTS

| | | |
|---|---|---|
| 2003/0108780 A1 | 6/2003 | Iwaizono et al. |
| 2005/0037259 A1* | 2/2005 | Maruyama ......... H01M 2/0426 429/176 |
| 2005/0208345 A1 | 9/2005 | Yoon et al. |
| 2008/0096101 A1 | 4/2008 | Kwag et al. |
| 2013/0040170 A1 | 2/2013 | Choi et al. |
| 2014/0023885 A1 | 1/2014 | Choi et al. |
| 2016/0233479 A1 | 8/2016 | Ahn et al. |
| 2016/0233554 A1 | 8/2016 | Choi et al. |
| 2016/0240892 A1 | 8/2016 | Ahn et al. |

FOREIGN PATENT DOCUMENTS

| | | |
|---|---|---|
| CN | 204760505 | 11/2015 |
| CN | 105556708 | 5/2016 |
| CN | 105826491 | 8/2016 |
| KR | 1020110066774 | 6/2011 |
| KR | 1020140100038 | 8/2014 |
| KR | 101619925 | 5/2016 |
| KR | 101650027 | 8/2016 |
| WO | WO 2015/046723 | 4/2015 |

OTHER PUBLICATIONS

International Search Report dated Apr. 9, 2018 issued in counterpart application No. PCT/KR2017/014949, 9 pages.
Chinese Office Action dated Sep. 30, 2020 issued in counterpart application No. 201780080287.5, 24 pages.

* cited by examiner

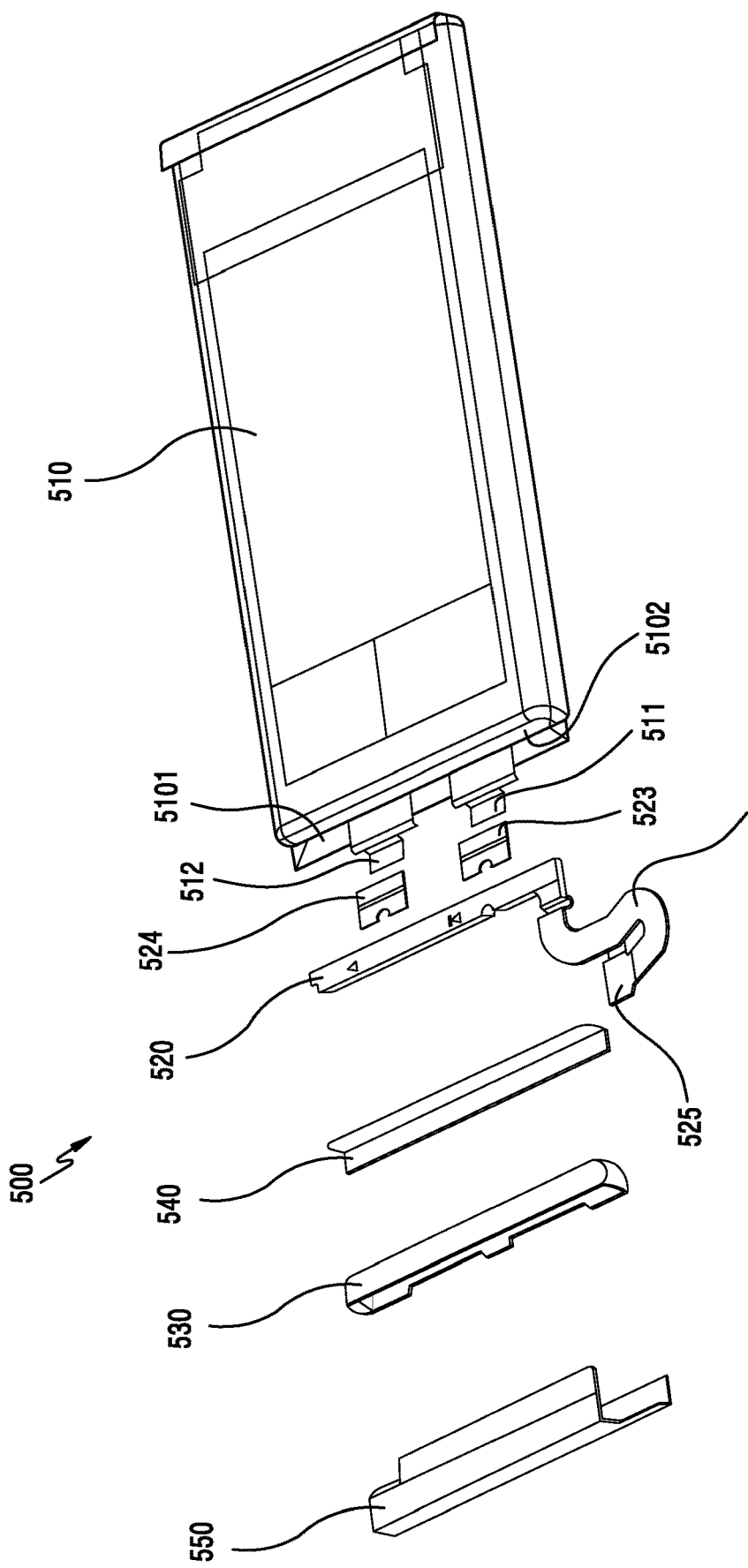

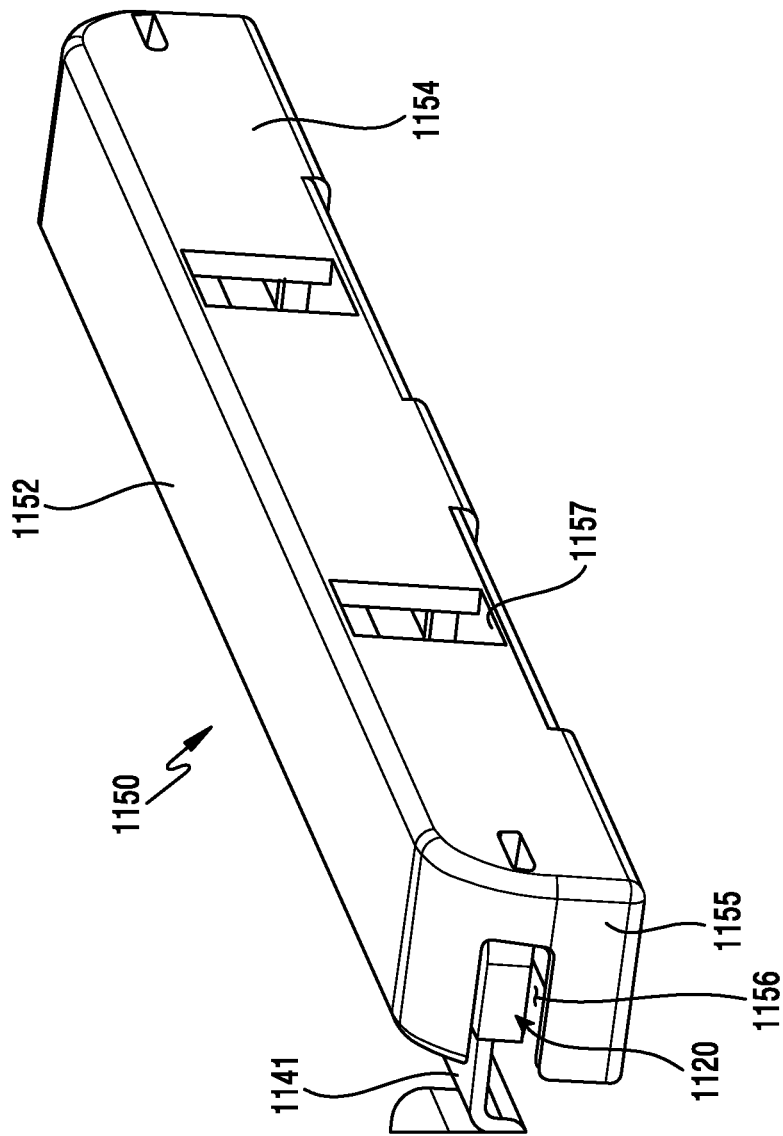

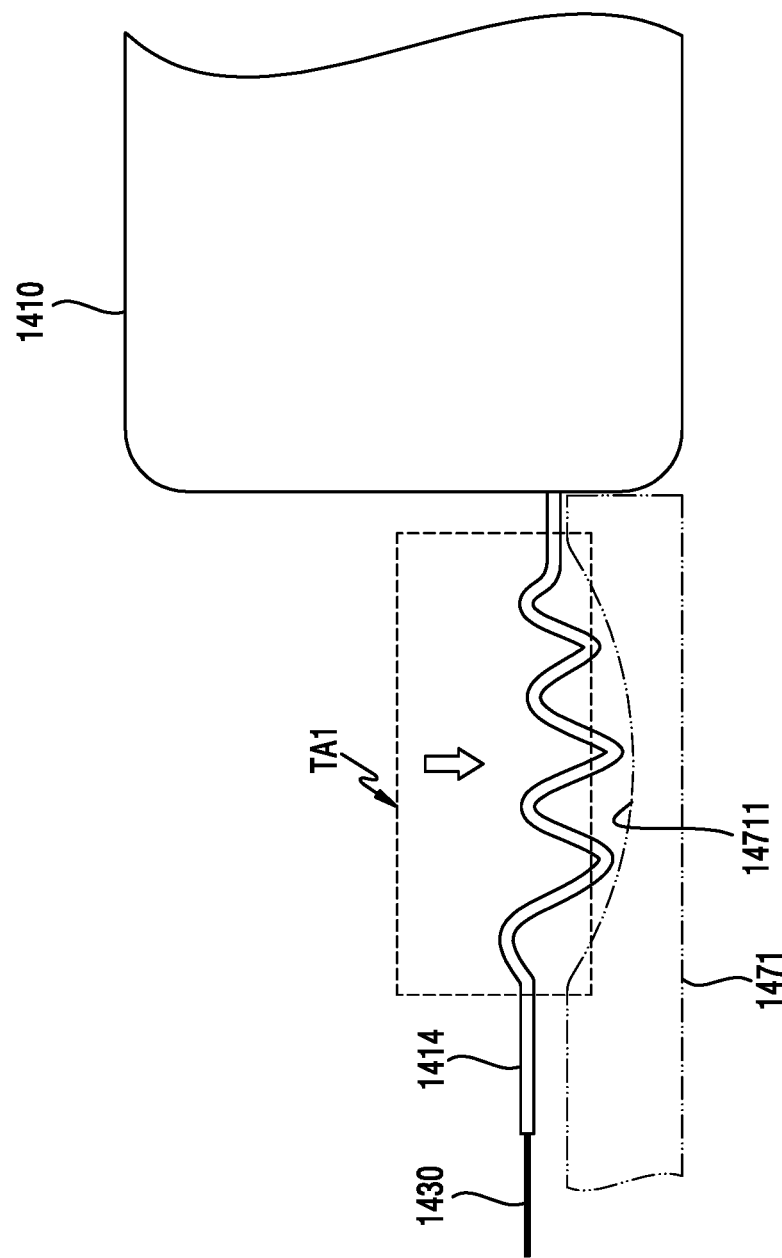

PROTECTIVE CIRCUIT MODULE CASE OF BATTERY AND ELECTRONIC DEVICE INCLUDING THE SAME

PRIORITY

This application claims priority under 35 U.S.C. § 119(a) to Korean Patent Application Serial No. 10-2016-0178125, which was filed in the Korean Intellectual Property Office on Dec. 23, 2016, the entire content of which is incorporated herein by reference.

BACKGROUND

1. Field of the Disclosure

The present disclosure relates to a protective circuit module (PCM) case for a battery, and an electronic device including the same.

2. Description of the Related Art

Electronic devices have become slimmer to satisfy needs of consumers, and have improved the rigidity of the electronic device along with enhancing the electronic device's design.

The electronic components disposed inside the electronic device tend to be designed to have a robust structure capable of withstanding an external impact such as dropping the electronic device. In particular, it is important that a battery disposed inside the electronic device have a structure that can withstand an external impact.

However, since the case is designed only to protect the circuit board, a placement relation with respect to the battery pouch is not considered. Therefore, the case may be randomly moved due to an external impact such as falling or the like of the electronic device. When the battery pouch which is relatively soft is torn due to a blow of the moving case, an electrolyte may be leaked, or in a worse case, the battery may be damaged due to a short circuit between battery cells having different polarities and disposed inside the battery pouch or due to a short circuit caused by a deformation of a conductive terminal, thereby deteriorating reliability of the electronic device.

SUMMARY

According to an aspect of the present disclosure, a protective circuit module (PCM) case of a battery and an electronic device including the same may be provided.

According to an aspect of the present disclosure, an electronic device including a battery having enhanced impact resistance capable of withstanding an external impact such as falling or the like is provided.

In accordance with an aspect of the present disclosure, an electronic device includes a housing having a mounting portion to which a battery is mountable; and the battery mounted to the mounting portion. The battery includes a battery pouch including at least one conductive terminal exposed to the outside; a circuit board electrically connected to the exposed at least one conductive terminal and having at least one circuit element mounted thereon to electrically protect the battery pouch; a case including a first plate, a second plate facing the first plate and spaced apart from the first plate, and a lateral plate surrounding at least a part of a space formed between the first plate and the second plate and connected to the first plate and the second plate; and a coupling member disposed between a lateral wall of the battery pouch and the lateral plate. The circuit board is disposed in the space of the case. The first plate or the second plate protrudes further than the circuit board in an opposite direction of the lateral wall.

In accordance with another aspect of the present disclosure, an electronic device includes a housing having a mounting portion to which a battery is mountable; and the battery mounted to the mounting portion. The battery includes a battery pouch including at least one conductive terminal exposed to the outside; a circuit board electrically connected to the exposed at least one conductive terminal and having at least one circuit element mounted thereon to electrically protect the battery pouch; a case including a first plate and a lateral plate extended to be bent from the first plate. The circuit board is disposed in a space surrounded by the first plate and the lateral plate, and the first plate protrudes further than the accommodated circuit board in an opposite direction of a lateral wall of the battery pouch; and at least one supporting member disposed to support the first plate.

In accordance with another aspect of the present disclosure, a battery includes a battery pouch including one pair of conductive terminals exposed to the outside; a circuit board electrically connected to the exposed one pair of conductive terminals and having at least one circuit element mounted thereon to electrically protect the battery pouch; a case including a first plate, a second plate facing the first plate and spaced apart from the first plate, and a lateral plate surrounding at least a part of a space formed between the first plate and the second plate and connected to the first plate and the second plate; a coupling member disposed between a lateral wall of the battery pouch and the lateral plate; and at least one supporting member disposed adjacent to at least one of the first plate and the second plate. The circuit board is disposed in the space of the case. At least one of the first plate and the second plate protrudes further than the circuit board in an opposite direction of the lateral wall.

BRIEF DESCRIPTION OF THE DRAWINGS

The above and other aspects, features, and advantages of embodiments of the present disclosure will be more apparent from the following description taken in conjunction with the accompanying drawings, in which:

FIG. 5 is an exploded perspective view of a battery according to various embodiments of the present disclosure;

FIG. 11A to FIG. 11J illustrate a manufacturing process of a battery in sequence according to various embodiments of the present disclosure;

FIG. 14B to FIG. 14E illustrate a shape of a pouch terrace according to various embodiments of the present disclosure;

DETAILED DESCRIPTION

Figure 1:
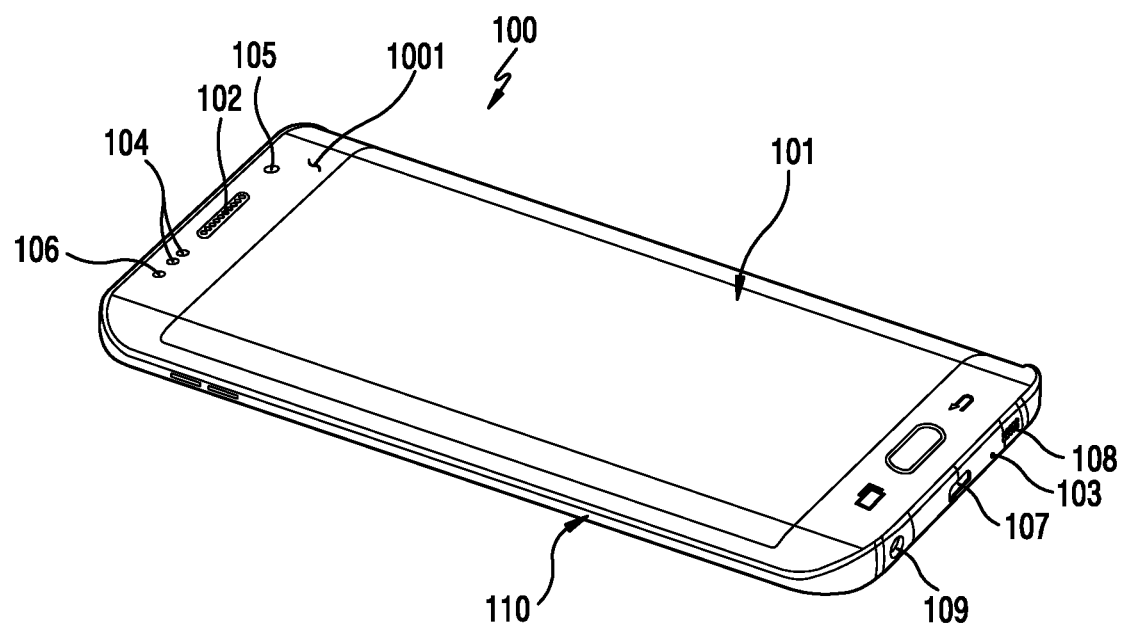
FIG. 1 is a front perspective view of an electronic device according to various embodiments of the present disclosure.

Hereinafter, various embodiments of the present disclosure are described with reference to the accompanying drawings. It should be understood, however, that it is not intended to limit the embodiments of the present disclosure to the particular form disclosed, but, on the contrary, it is intended to cover all modifications, equivalents, and alternatives falling within the spirit and scope of the embodiments of the present disclosure. Like reference numerals denote like elements throughout the drawings.

The expressions "have", "may have", "include", "may include", or the like used in the present disclosure are intended to indicate the presence of a corresponding characteristic (e.g., a number, a function, an operation, or an element such as a component), and it should be understood that there are additional possibilities of one or more other characteristics.

In the present disclosure, the expressions "A or B", "A and/or B", "one or more of A and/or B", or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$" "$2^{nd}$", "first", and "second" may be used in the present disclosure to express various elements, it is not intended to limit the corresponding elements. For example, the above expressions may be used to distinguish one element from another element. For example, a $1^{st}$ user device and a $2^{nd}$ user device are both user devices, and indicate different user devices. For example, a $1^{st}$ element may be referred to as a $2^{nd}$ element, and similarly, the $2^{nd}$ element may be referred to as the $1^{st}$ element without departing from the scope of the present disclosure.

When a certain element (e.g., the $1^{st}$ element) is mentioned as being "operatively or communicatively coupled with/to" or "connected to" a different element (e.g., the $2^{nd}$ element), it is to be understood that the certain element is directly coupled with/to another element or can be coupled with/to the different element via another element (e.g., a $3^{rd}$ element). On the other hand, when the certain element (e.g., the $1^{st}$ element) is mentioned as being "directly coupled with/to" or "directly connected to" the different element (e.g., the $2^{nd}$ element), it may be understood that another element (e.g., the $3^{rd}$ element) is not present between the certain element and the different element.

An expression "configured to" used in the present document may be interchangeably used with, for example, "suitable for", "having the capacity to", "designed to", "adapted to", "made to", or "capable of" according to the situation. The term "configured to" may not imply only "specially designed to" in a hardware manner. Instead, in certain situations, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor (AP)) capable of performing corresponding operations by executing one or more software programs stored in a memory device.

Terms used in the present disclosure are for the purpose of describing particular embodiments only and are not intended to limit other embodiments. A singular expression may include a plural expression unless there is a contextually distinctive difference. Unless otherwise defined, all terms, including technical and scientific terms, used herein have the same meaning as commonly understood by those ordinarily skilled in the art disclosed in the present disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present disclosure should not be interpreted to exclude the embodiments of the present disclosure.

An electronic device according to various embodiments of the present disclosure may include, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a MPEG-1 audio layer 3 (MP3) player, a mobile medical device, a camera, and a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to various embodiments of the present disclosure, the electronic device may be a home appliance. The home appliance may include, for example, at least one of a television (TV), a digital versatile disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic picture frame.

According to various embodiments of the present disclosure, the electronic device may include at least one of various medical devices (e.g., various portable medical measuring devices (e.g., a blood sugar measuring device, a hearing measuring device, a blood pressure measuring device, a body temperature measuring device, etc.), magnetic resonance angiography (MRA), magnetic resonance imaging (MRI), computed tomography (CT), imaging equipment, ultrasonic instrument, etc.)), a navigation device, a global navigation satellite system (GNSS), an event data recorder (EDR), a flight data recorder (FDR), a car infotainment device, an electronic equipment for a ship (e.g., a vessel navigation device, a gyro compass, etc.), avionics, a security device, a car head unit, an industrial or domestic robot, an automatic teller machine (ATM), point of sales (POS) devices, and Internet of things (IoT) devices (e.g., a light bulb, various sensors, an electric or gas meter, a sprinkler device, a fire alarm, a thermostat, a streetlamp, a toaster, a fitness equipment, a hot water tank, a heater, a boiler, etc.).

According to various embodiments of the present disclosure, the electronic device may include at least one of furniture or a part of buildings/constructions, an electronic board, an electronic signature input device, a projector, and various measurement machines (e.g., water supply, electricity, gas, propagation measurement machine, etc.). The electronic device may be one or more combinations of the aforementioned devices. The electronic device may be a flexible device. Further, the electronic device is not limited to the aforementioned devices, and may include a new electronic device depending on technical progress.

The term "user" used in the present disclosure may refer to a person who uses the electronic device or a device which uses the electronic device (e.g., an artificial intelligence (AI) electronic device).

Figure 2:
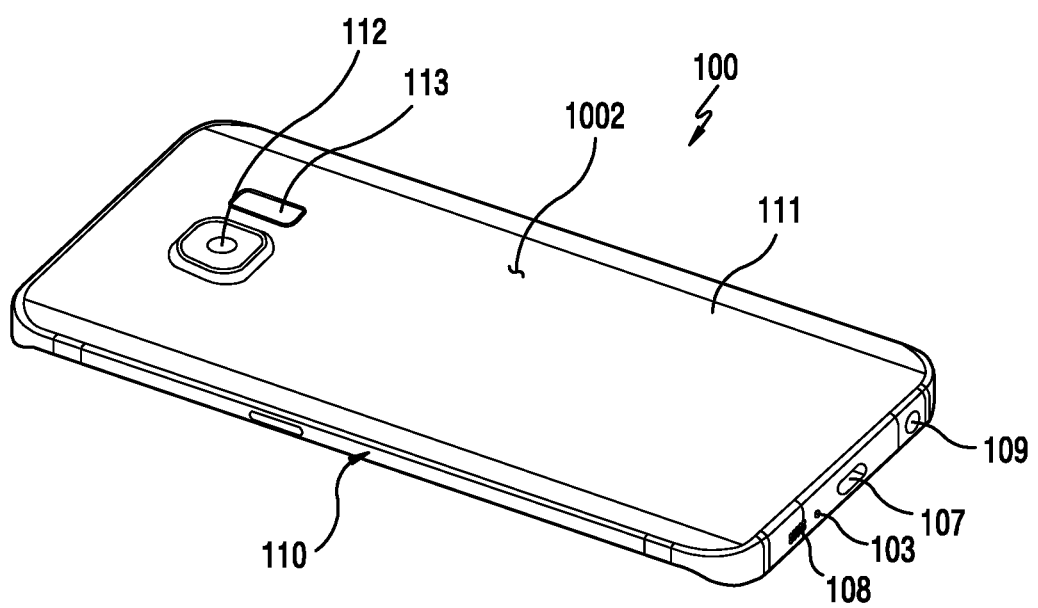
FIG. 2 is a rear perspective view of an electronic device according to various embodiments of the present disclosure.

FIG. 1 is a front perspective view of an electronic device according to various embodiments of the present disclosure. FIG. 2 is a rear perspective view of an electronic device according to various embodiments of the present disclosure.

Referring to FIG. 1 and FIG. 2, an electronic device 100 may include a display 101 disposed on a first surface 1001 (e.g., a front surface). According an embodiment of the present disclosure, the display 101 may include a touch sensor to operate as a touch screen device. The display 101 may include a pressure sensor to operate as a pressure responsive screen device. The electronic device 100 may include a speaker 102 to output the voice of a peer user. The electronic device 100 may include a microphone device 103 to transmit a voice of a user to the peer user.

According to various embodiments of the present disclosure, the electronic device 100 may have components for performing various functions of the electronic device 100 at a surrounding area where the speaker 102 is installed. The components may include at least one sensor module 104. The sensor module 104 may include, for example, at least one of an illumination sensor (e.g., an optical sensor), a proximity sensor (e.g., an optical sensor), an infrared sensor, and an ultrasonic sensor. The component may include a front camera device 105. The component may include an indicator 106 (e.g., an LED device) for informing the user of status information of the electronic device.

According to various embodiments of the present disclosure, the electronic device 100 may include a second speaker 108 disposed to one side of the microphone device 103. The electronic device 100 may include a connector port 107 disposed to the other side of the microphone device 103 to charge the electronic device 100 by using a data transmission/reception function provided by an external device or by receiving external power. The electronic device 100 may include an ear jack hole 109 disposed to one side of the connector port 107.

According to various embodiments of the present disclosure, the electronic device 100 may include a housing 110. The housing 110 may be formed of a conductive member and a non-conductive member. The housing 110 may be disposed along a boundary of the electronic device 100, and may be displayed by being extended to up to at least a sub-area of the front surface or rear surface. The housing 110 may define at least a part of the electronic device 100 along the boundary of the electronic device 100. However, the present disclosure is not limited thereto, and thus the housing 110 may also be formed as at least a part of the thickness of the electronic device 100. At least a part of the housing 110 may be embedded inside the electronic device 100.

According to various embodiments of the present disclosure, the electronic device 100 may include a rear window 111 disposed on a second surface 1002 (e.g., a rear surface) facing the first surface 1001. The electronic device 100 may include a rear camera device 112 disposed through the rear window 111. The electronic device 100 may include at least one electronic component 113 disposed on one side of the rear camera device 112. The electronic component 113 may include at least one of an illumination sensor (e.g., an optical sensor), a proximity sensor (e.g., an optical sensor), an infrared sensor, an ultrasonic sensor, a heart rate sensor, a flash device, and a fingerprint recognition sensor.

According to various embodiments of the present disclosure, the electronic device 100 may include a battery fixed to the housing 110 inside the electronic device 100 for the purpose of supplying power. The battery may include a pouch-type battery.

Figure 3:
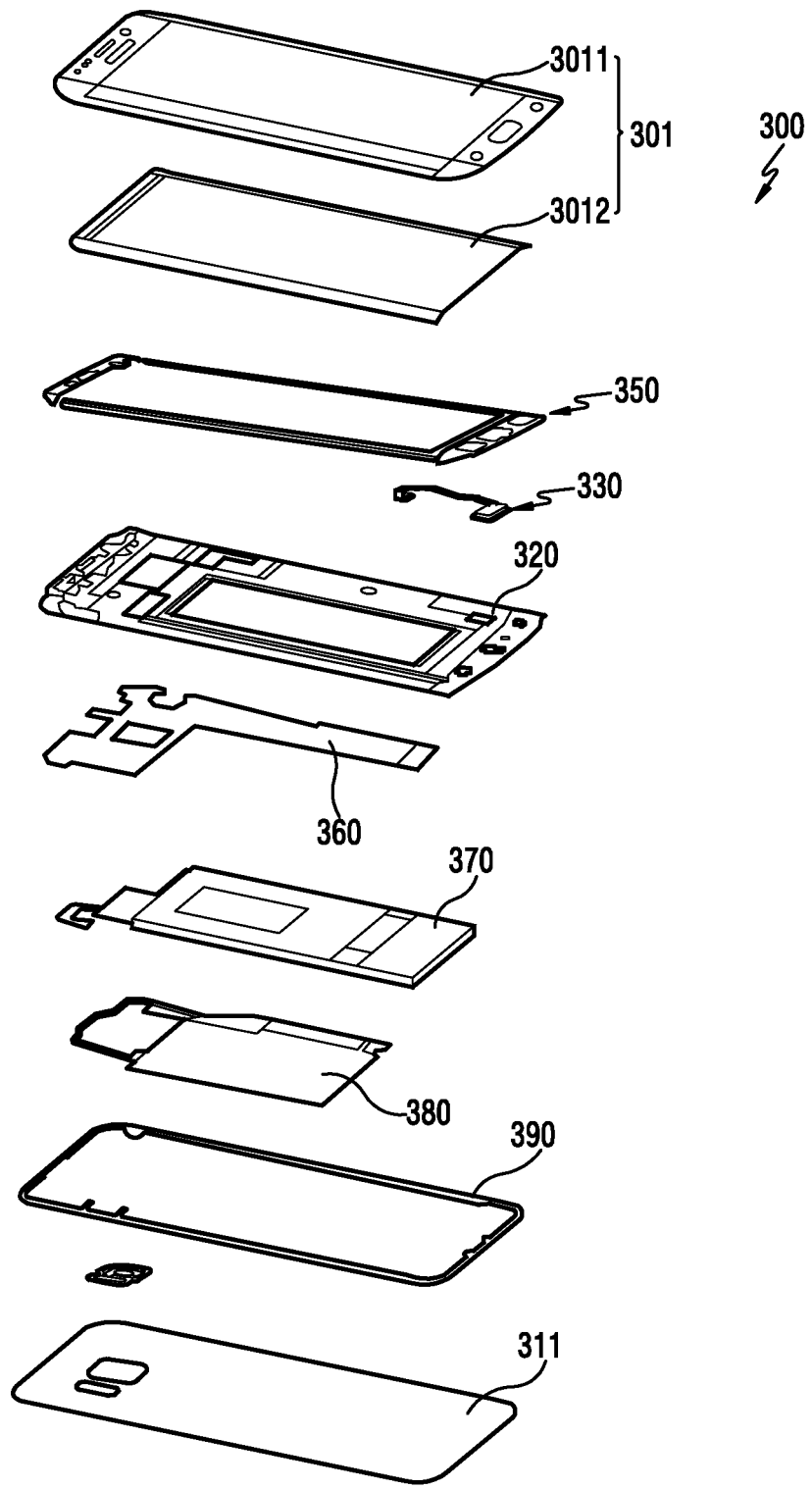
FIG. 3 is an exploded perspective view of an electronic device according to various embodiments of the present disclosure.

FIG. 3 is an exploded perspective view of an electronic device according to various embodiments of the present disclosure.

An electronic device 300 of FIG. 3 may be similar to the electronic device 100 of FIG. 1 and FIG. 2, or may include another embodiment of the present disclosure of the electronic device.

Referring to FIG. 3, the electronic device 300 may include a key input device 330, at least one seal member 350, and a display 301 including a display module 3012 and a window 3011, which are disposed sequentially at an upper side of a housing 320. According to an embodiment of the present disclosure, the electronic device 300 may include a printed circuit board 360 (e.g., a printed circuit board (PCB), an FPCB e.g., a main board, etc.), a battery 370, a wireless power transmission/reception member 380, a rear seal member 390, and a rear window 311. The battery 370 may be disposed in an accommodating space for the battery pack 370 formed in a housing 320, and may be disposed by avoiding the printed circuit board 360. The battery 370 and the printed circuit board 360 may be disposed in a parallel manner without overlapping. However, the present disclosure is not limited thereto, and thus at least a sub-area of the battery 370 may be disposed to overlap with the printed circuit board 360.

According to various embodiments of the present disclosure, although the housing 320 is used alone, at least one plate (e.g., a central plate, a rear plate, a detachable battery cover, etc.) coupled to the housing 320 may also be used together. The housing 320 may be formed by using a conductive member (e.g., a metal member, etc.) and a non-conductive member (e.g., resin, etc.). The housing 320 may be formed of a conductive member and a non-conductive member through an insert injection process or a double injection process.

According to various embodiments of the present disclosure, the display 301 may be applied to the housing 320 after the display module 3012 is attached to a rear surface of the window 3011. The window 3011 may be formed of a transparent material such as glass, resin, or the like. The display module 3012 may include a touch sensor. The display module may include a touch sensor and a force sensor. The electronic device 300 may include at least one seal member 350 disposed between the housing 320 and the display 301 for the purpose of making the device water resistant.

According to various embodiments of the present disclosure, the electronic device 300 may include the seal member 390 disposed between a rear surface of the housing 320 and the rear window 311 along a boundary thereof for the purpose of making the device water resistant. The rear window 311 may be formed of at least one material among glass, plastic, synthetic resin, and metal. The seal members 350 and 390 may include at least one of tapes, adhesive agents, waterproof dispensing, silicon, waterproof rubber, and urethane.

According to various embodiments of the present disclosure, the printed circuit board 360 may include a memory, a processor, various sensors, an input/output terminal, or the like, and may perform various functions of the electronic device by using power supplied from the battery 370. The printed circuit board 360 may be disposed adjacent to the battery 370. The printed circuit board 360 may be disposed in such a manner that at least one surface thereof is in contact with one surface of the battery 370 and thus at least one part thereof overlaps with the battery 370, or may be disposed in such a manner that the same plane is occupied in a divided manner with respect to the battery 370 by being configured in a shape of '¬' or '⊏' which avoids a space for arranging the battery 370.

According to various embodiments of the present disclosure, the battery 370 may provide power to primary components such as the display 301, the printed circuit board 360, or the like, and may provide a mounting plane for components such as the wireless power transmission/reception member 380, various sheet-type sensors, or the like. The battery 370 may be disposed in a battery placement area in which a specific space is enclosed due to a mounting cavity space, a guide rib, or the like prepared in a sub-area of the housing 320 to provide reliable assembling and to avoid movement during use due to its volume and weight. The battery 370 may be used as a built-in battery (e.g., a built-in battery packet) embedded in the electronic device 300, or may be detached from the electronic device by a user for the purpose of replacement when the battery cover is open.

According to various embodiments of the present disclosure, the battery 370 may include a battery pouch in which a battery cell is supported, a PCM (e.g., a circuit board) to which a terminal extended from the battery pouch is electrically connected, and a case (e.g., a PCM housing or a PCM case) for protecting the PCM. The case in which the PCM is disposed may be fixed to the battery pouch in an assembly structure for improving impact resistance, and thus elements (e.g., a battery pouch, a PCM, a terminal, etc.) of the battery can be prevented from damage even if an external impact is applied to the electronic device.

Figure 4A:
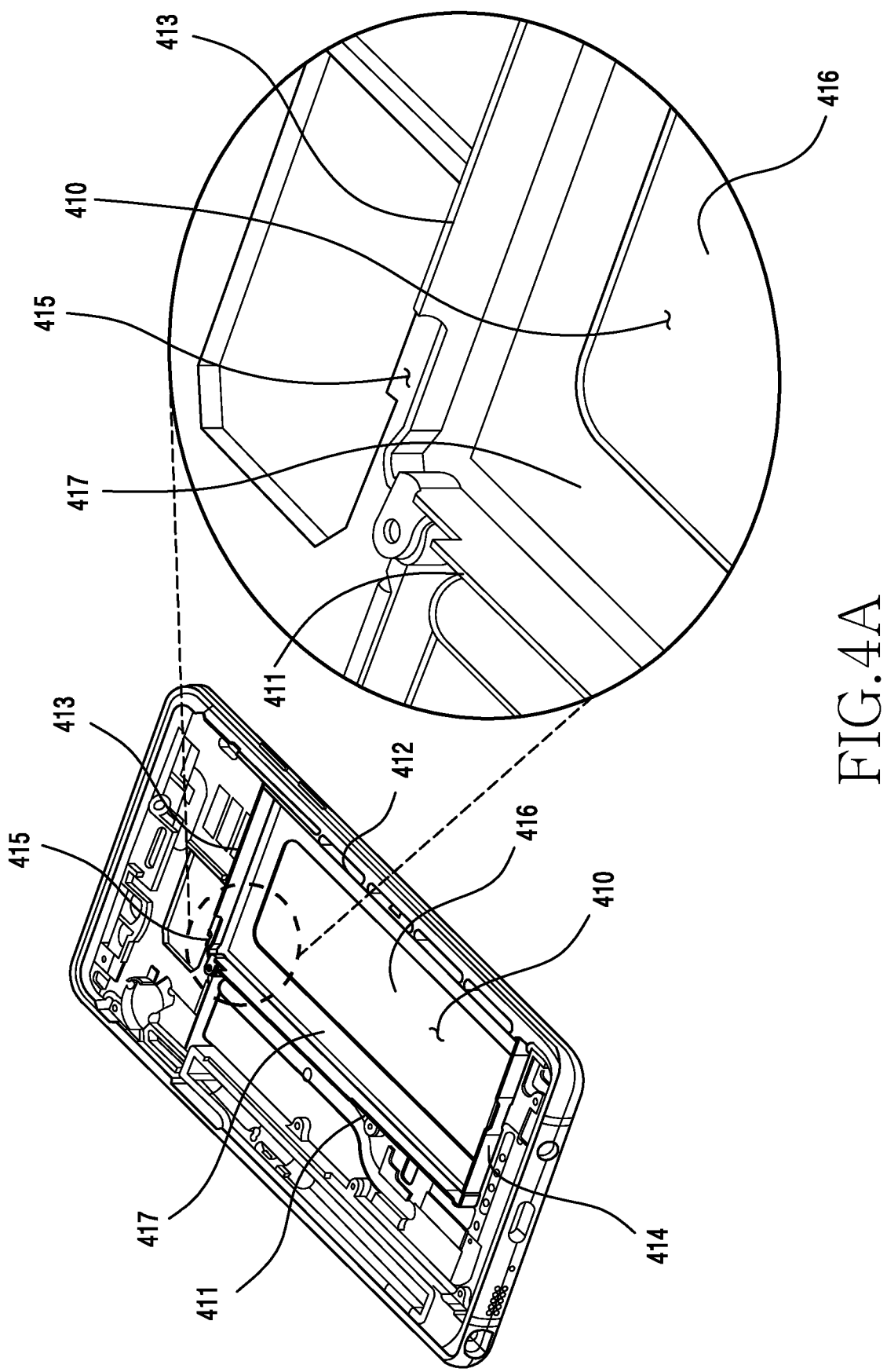
FIG. 4A is a perspective view of a housing of an electronic device to which a battery is applied according to various embodiments of the present disclosure.
Figure 4B:
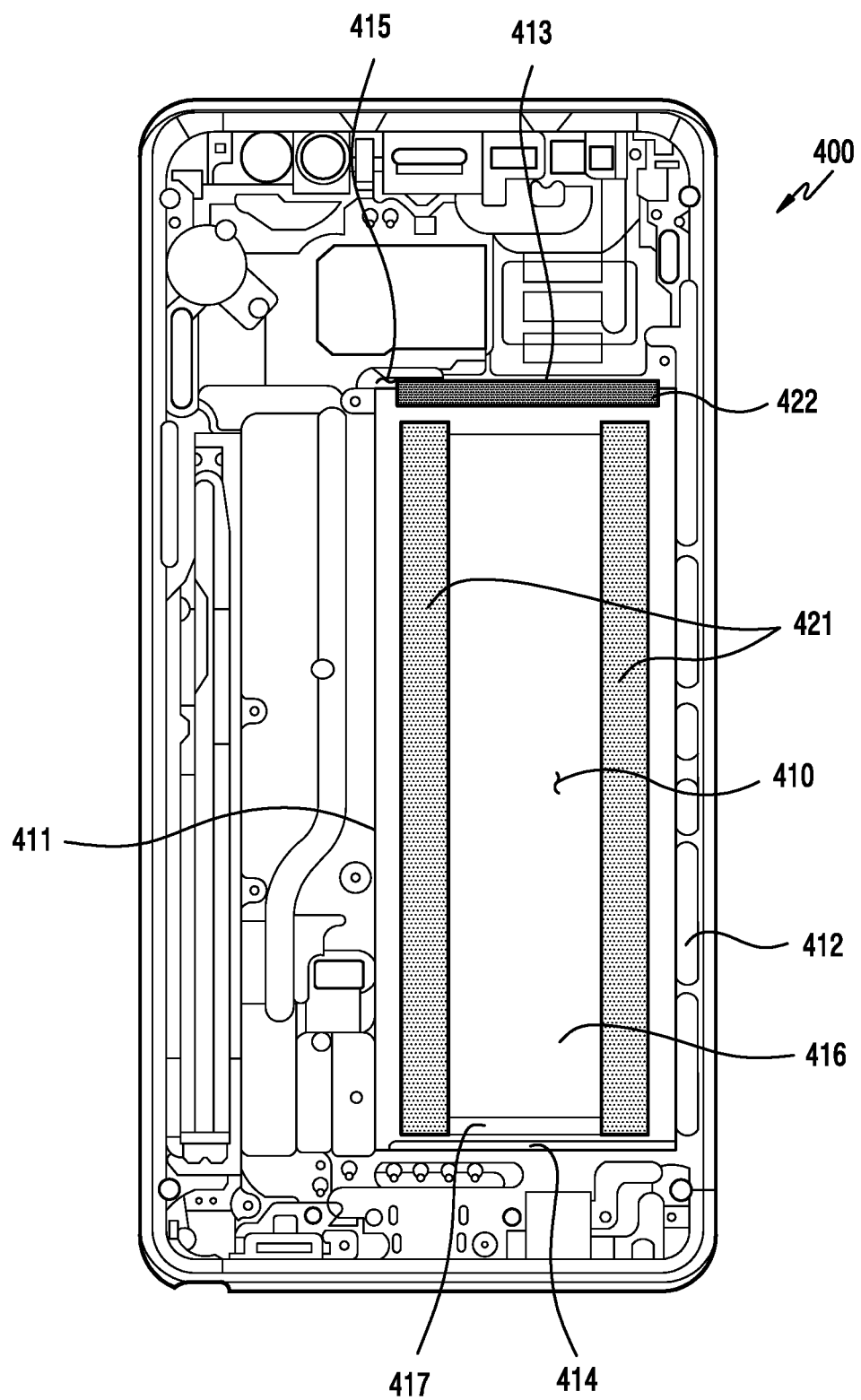
FIG. 4B is a plan view of a housing of an electronic device to which a battery is applied according to various embodiments of the present disclosure.
Figure 4C:
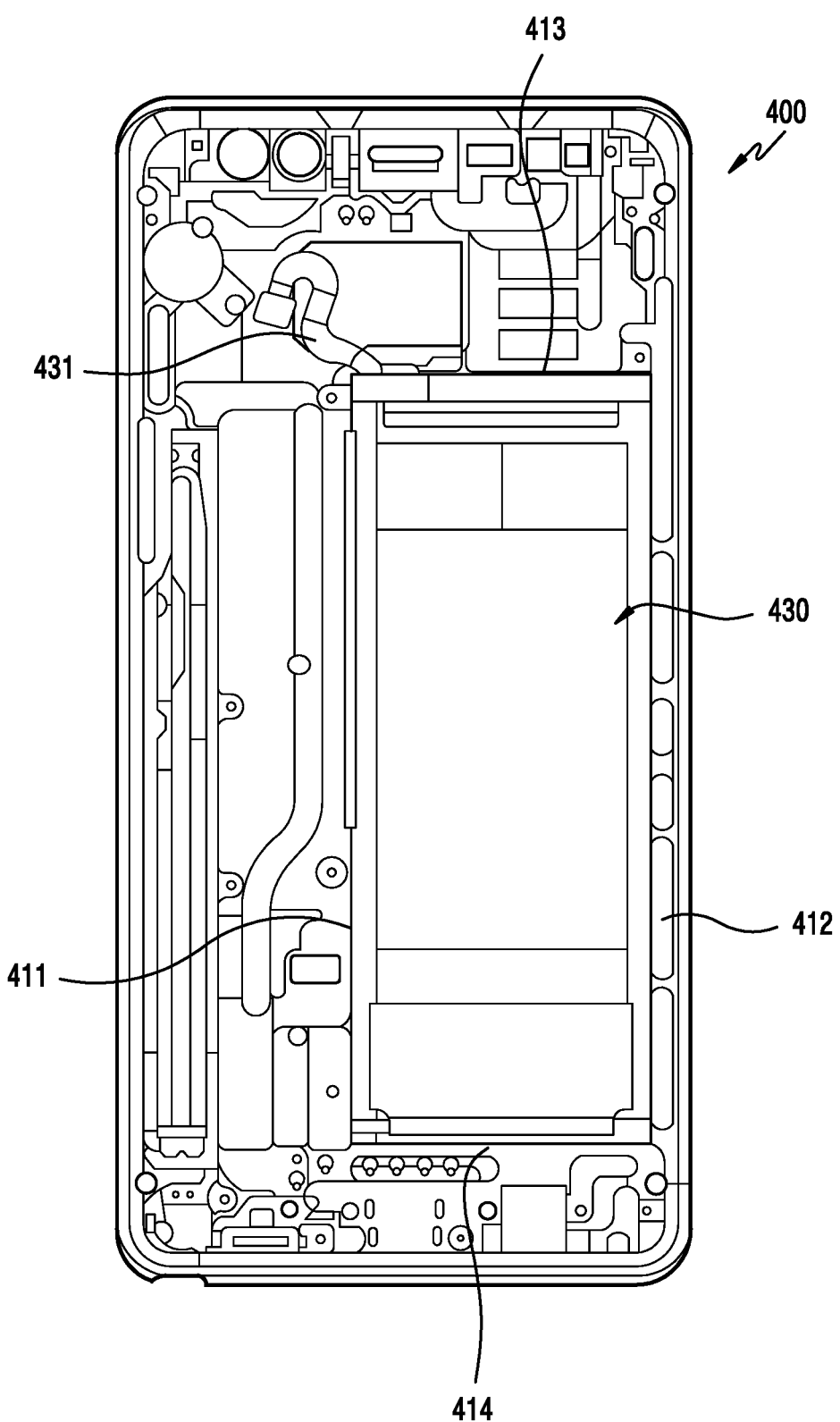
FIG. 4C illustrates a state where a battery is placed in a housing of an electronic device according to various embodiments of the present disclosure.

FIG. 4A is a perspective view of a housing of an electronic device to which a battery is applied according to various embodiments of the present disclosure. FIG. 4B is a plan view of a housing of an electronic device to which a battery is applied according to various embodiments of the present disclosure. FIG. 4C illustrates a state where a battery is placed in a housing of an electronic device according to various embodiments of the present disclosure.

A housing 400 of FIG. 4A to FIG. 4C may be similar to the housing 110 of FIG. 1 and FIG. 2 or the housing 320 of FIG. 3, or may include another embodiment of the housing.

Referring to FIG. 4A, the housing 400 may be formed of a conductive member and a non-conductive member. According to an embodiment of the present disclosure, if the housing 400 is formed of the conductive member and the non-conductive member, it may be formed by a double injection process, an insert injection process, or a computer numerical control (CNC)-based process. The housing 400 may include a mounting portion 410 for disposing a battery. The mounting portion 410 may be formed substantially in a shape of a mounting portion to which the battery is mountable. The mounting portion 410 may include a first guide rib 411, a second guide rib 412 formed to face the first guide rib 411 in a spaced apart manner, a third guide rib 413 for connecting one end of each of the first guide rib 411 and the second guide rib 412, and a fourth guide rib 414 for connecting the other end of each of the first guide rib 411 and the second guide rib 412. The first, second, third, and fourth guide ribs 411, 412, 413, and 414 may be formed to protrude with a specific height from a surface of the housing 400, and the mounting portion 410 may accommodate at least a part of a thickness of the battery in a recess shape by means of each of the guide ribs 411, 412, 413, and 414. A protrusion amount of each of the guide ribs 411, 412, 413, and 414 may be formed in the range of 50% to around 80% of a battery thickness, and the remaining protrusion parts of the battery may be compensated (e.g., supported or sealed) by a construction (e.g., a central plate, a rear plate, a rear housing, a battery cover, etc.) assembled to the housing 400. However, the present disclosure is not limited thereto, and thus the mounting portion 410 may be formed in a shape of a gap formed with a specific depth in a surface of the housing, without a separate protruding guide rib.

According to various embodiments of the present disclosure, at least one of the guide ribs 411, 412, 413, and 414 may be provided in such a manner that some or all areas thereof are visually transparent. The guide ribs 411, 412, 413, and 414 may be visually transparent and may allow a mounting state in which the battery is mounted to the mounting portion 410 to be confirmable when or after it is assembled. In this case, the guide ribs 411, 412, 413, and 414 extended inside the housing may be formed with a heterogeneous transparent material different from the housing through a double injection or insert injection process.

According to various embodiments of the present disclosure, the mounting portion 410 may include an opening 416 formed to cope with swelling of the battery. However, the present disclosure is not limited thereto, and thus a gap lower than the mounting portion may be formed in the mounting portion 410 to cope with battery swelling. The mounting portion 410 may include a tape mounting portion 417 for fixing the battery to the mounting portion 410. The mounting portion 410 may include an opening portion 415 such that an FPCB including a connector extended from the to-be-placed battery is extended to a printed circuit board in the vicinity thereof. The opening portion 415 may be formed by excluding at least a sub-area from the aforementioned guide ribs 411, 412, 413, and 414.

Referring to FIG. 4B, a tape 421 (e.g., a double-sided tape, etc.) for fixing the battery may be disposed to the tape mounting portion 417 of the mounting portion 410. However, the present disclosure is not limited thereto, and thus the tape may be replaced with adhesive agents or adhesive resin. According to an embodiment of the present disclosure, at least one supporting member 422 disposed to compensate (e.g., support or seal) a step-height area in the battery may be included in the mounting portion 410. The supporting member 422 may be replaced by using at least a sub-area of the tape mounting portion 417, and in this case, the supporting member 422 may perform an adhesive function such as a double-sided tape.

According to various embodiments of the present disclosure, the supporting member 422 or the tape 421 may be formed of a visually transparent material. The supporting member 422 or tape formed of the transparent material may allow a mounting state in which the battery is mounted to the mounting portion 410 to be confirmable when or after it is assembled. The supporting member 422 or the tape may be replaced through bonding based on the transparent material, dispensing, UV illumination, or curling accompanied by natural drying.

Referring to FIG. 4C, the housing 400 may accommodate a battery 430 in a state where a double-sided tape 421 and a supporting member 422 are disposed through a tape mounting portion 417. According to an embodiment of the present disclosure, the double-sided tape and the supporting member may be placed on the mounting portion 410 of the housing 400 attached to a corresponding outer surface of the battery 430 instead of the tape mounting portion 417. If the battery 430 is placed to the mounting portion 410, an FPCB 431 of the battery 430 may be extended to the outside of the mounting portion 410 through an opening portion (e.g., the opening portion 415 of FIG. 4A), and may be electrically connected to a printed circuit board in the vicinity thereof.

According to various embodiments of the present disclosure, since the battery 430 placed to the mounting portion 410 has a specific volume and weight, when the electronic device experiences an external primary impact caused by falling or the like, such an impact is delivered to an inner portion, which may lead to a secondary impact caused by elements in the vicinity thereof or the weight of the battery. The secondary impact applied to the battery 430 may cause a fault (e.g., a short-circuit caused by a deformation of a terminal, a leakage based on a breakage of a battery pouch) caused by mutual blows between elements of the battery 430. Accordingly, an erroneous operation of the electronic device may occur and reliability of the device may deteriorate.

FIG. 5 is an exploded perspective view of a battery according to various embodiments of the present disclosure.

The battery 500 may be similar to the battery 370 or the battery 430, or may include another embodiment of a battery pack.

Referring to FIG. 5, a battery 500 may include a battery pouch 510 including a battery cell, a PCM 520 electrically connected to conductive terminals 511 and 512 extended from the battery pouch 510, a case 530 for disposing the PCM 520, a coupling member 540 for fixing the case 530 to the battery pouch 510 while providing a buffering effect, and a finishing member 550 for providing a finishing effect to cover the case 530, in which the PCM 520 is disposed, together with the battery pouch 510.

According to various embodiments of the present disclosure, the battery pouch 510 may include a battery cell inside thereof. The battery cell may include a plurality of plate-type cells which can be wound or stacked, and may be disposed in the battery pouch 510 in which an electrolyte is filled. The battery pouch 510 may include a pouch terrace 5101 acting as a sealing portion for interrupting the battery cell in which the electrolyte is filled. The pouch terrace 5101 or a lateral wall 5102 of the battery pouch 510 from which the pouch terrace 1501 protrudes may be utilized as a contact or fixed area of the case 510 in which the PCM 520 is disposed. The battery pouch 510 may be formed of a material such as cast coated paper (CCP), aluminum, nylon, or the like. The pouch terrace 5101 may be sealed and formed by using heating, laser, or the like.

According to various embodiments of the present disclosure, the battery pouch 510 may include at least one conductive terminal 511 or 512 exposed through the pouch terrace 5101 and electrically connected to an internal battery cell. The conductive terminals 511 and 512 may include a negative terminal and a positive terminal.

Figure 6A:
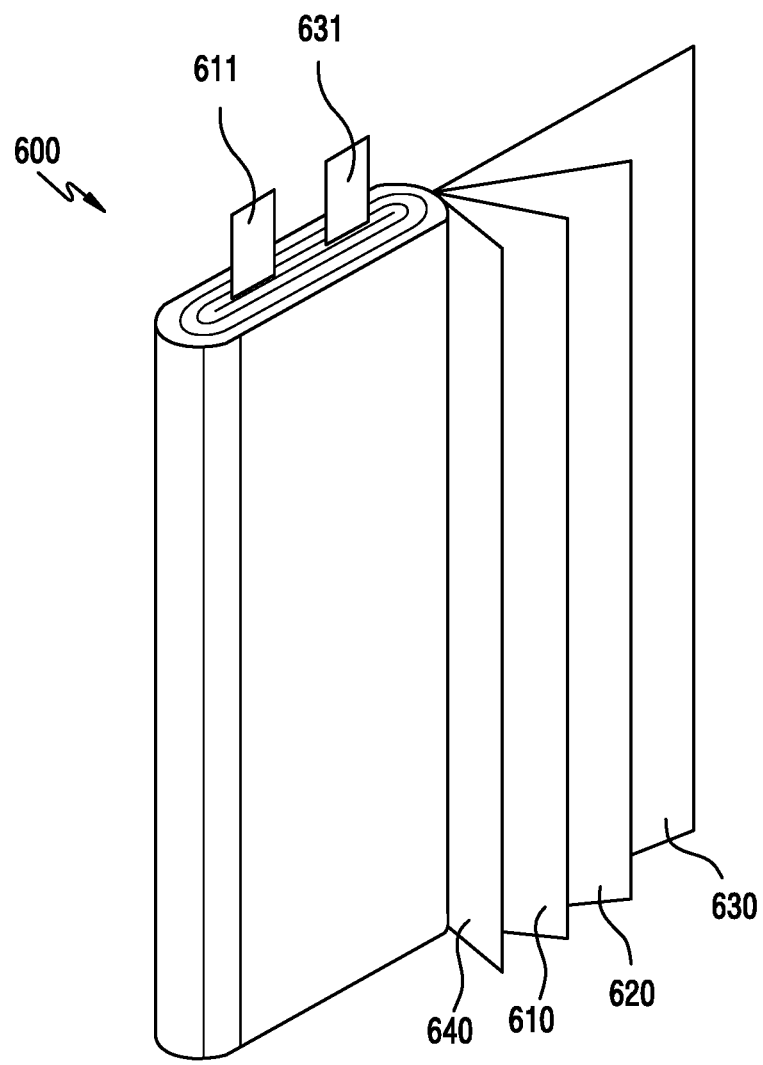
FIG. 6A and FIG. 6B illustrates a structure of a battery cell according to various embodiments of the present disclosure.
Figure 6B:
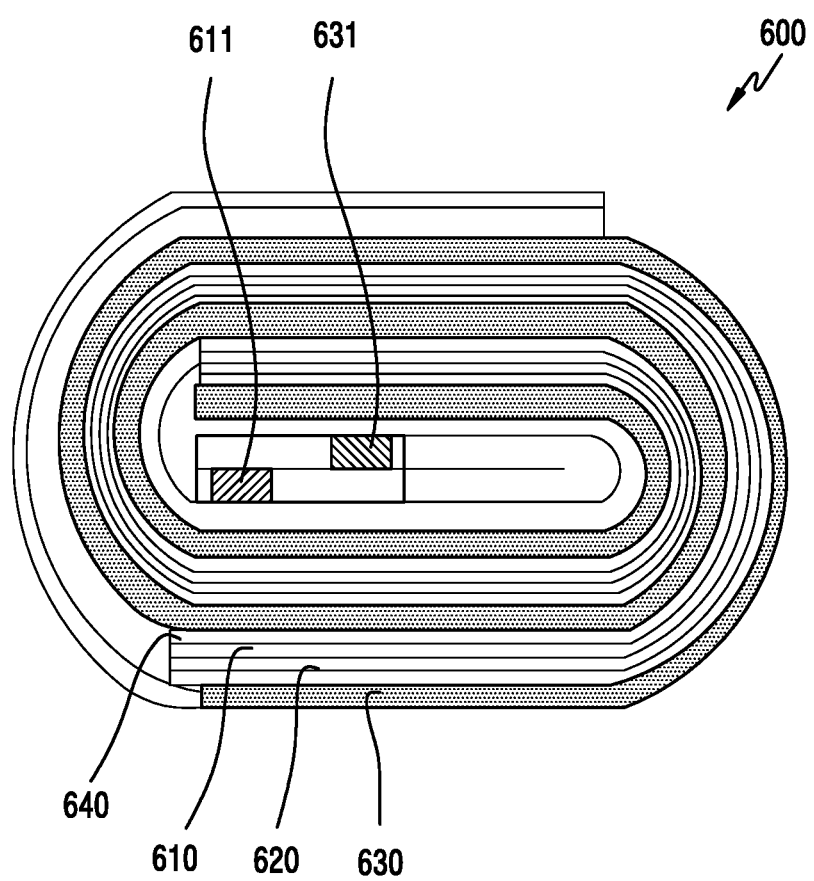

FIG. 6A and FIG. 6B illustrate a structure of a battery cell 600 according to various embodiments of the present disclosure. The battery cell 600 disposed inside a battery pouch 510 may be formed in such a manner that plate-type first and second cells 610 and 630 are wound together with one pair of separation layers 620 and 640 for separating the first cell 610 and the second cell 630. The one pair of separation layers 620 and 640 may serve to separate the first cell 610 and the second cell 630 so as not to be electrically connected with each other. The cells 610 and 630 which are wound multiple times may have a thickness, and as illustrated, may include corresponding conductive terminals 611 and 631 (e.g., an inner circumferential electrode tab) protruding substantially from a focal area of the battery cell 600. The conductive terminals 611 and 631 may include a negative terminal 611 extended from the negative cell contributed as the first cell 610 and the positive terminal 631 extended from a positive cell contributed as the second cell 630.

Figure 7A:
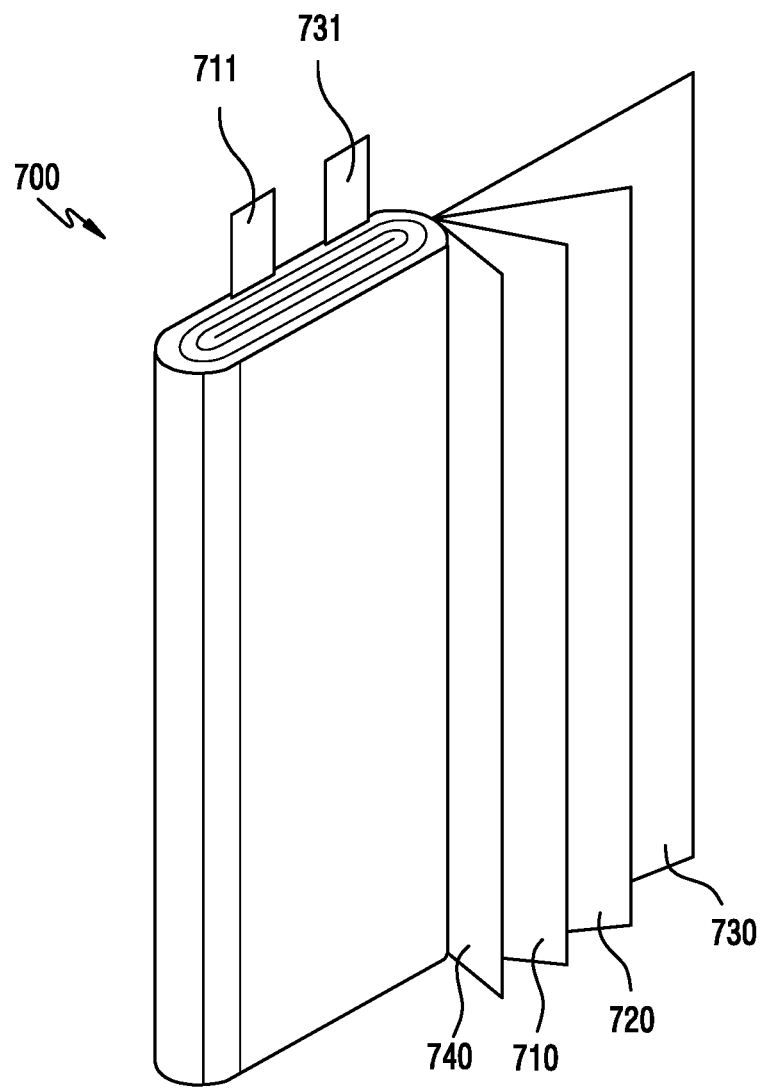
FIG. 7A and FIG. 7B illustrates a structure of a battery cell according to various embodiments of the present disclosure.
Figure 7B:
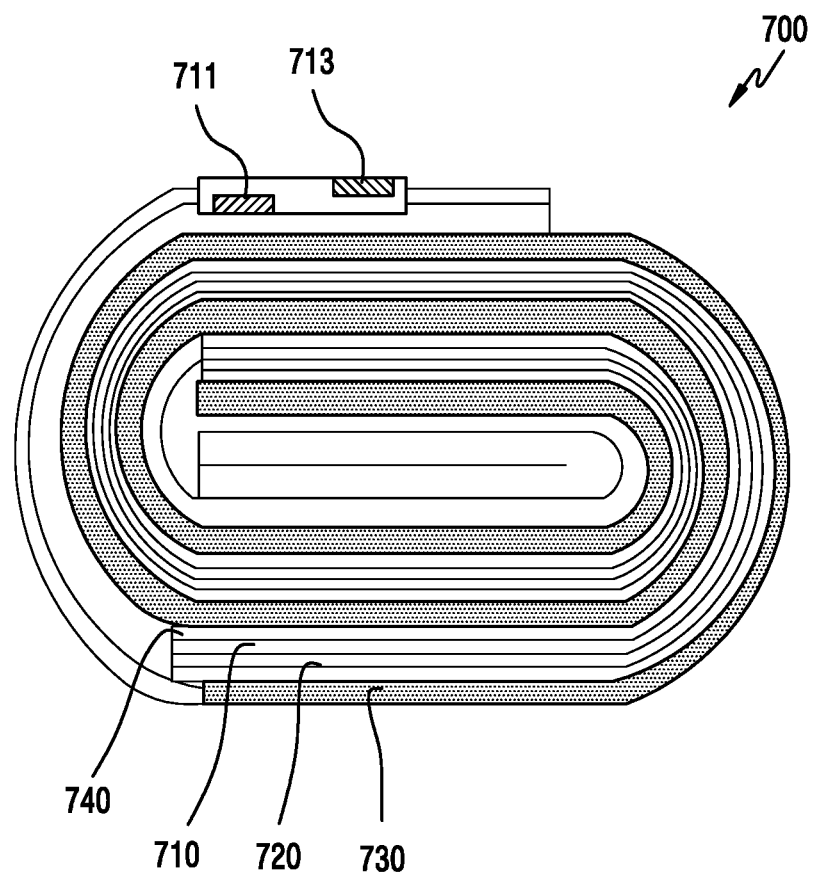

FIG. 7A and FIG. 7B illustrate a structure of a battery cell 700 according to various embodiments of the present disclosure. The battery cell 700 disposed inside a battery pouch 610 may be formed in such a manner that plate-type first and second cells 710 and 730 are wound together with one pair of separation layers 720 and 740 for separating the first cell 710 and the second cell 730. The one pair of separation layers 720 and 740 may serve to separate the first cell 710 and the second cell 730 so as not to be electrically connected with each other. The cells 710 and 730 which are wound multiple times may have a thickness, and as illustrated, may include corresponding conductive terminals 711 and 731 (e.g., an outer circumferential electrode tab) protruding substantially from an outer area of the battery cell 700. The conductive terminals 711 and 731 may include the negative terminal 711 extended from a negative cell contributed as the first cell 710 and the positive terminal 731 extended from a positive cell contributed as the second cell 730.

Returning to FIG. 5, the battery 500 may include the PCM 520 to be electrically connected to the conductive terminals 511 and 512 extended from the pouch terrace 5101. The PCM 520 may include one or more circuit elements capable of electrically protecting all or some parts of the battery 500 and a circuit board (e.g., a PCB) on which the circuit elements can be mounted, and may be electrically connected to the conductive terminals 511 and 512 extended from the pouch terrace 5101 through the conductive plates 523 and 524. The PCM 520 may be used to maintain voltage (e.g., to prevent over-charging or over-discharging) in a specific range when the battery cell is charged and discharged. For example, if the battery cell is a lithium battery, the PCM 520 may control the cell voltage to operate in a range of 2V to 4.2V in order to prevent damage to the battery cell.

Figure 8A:
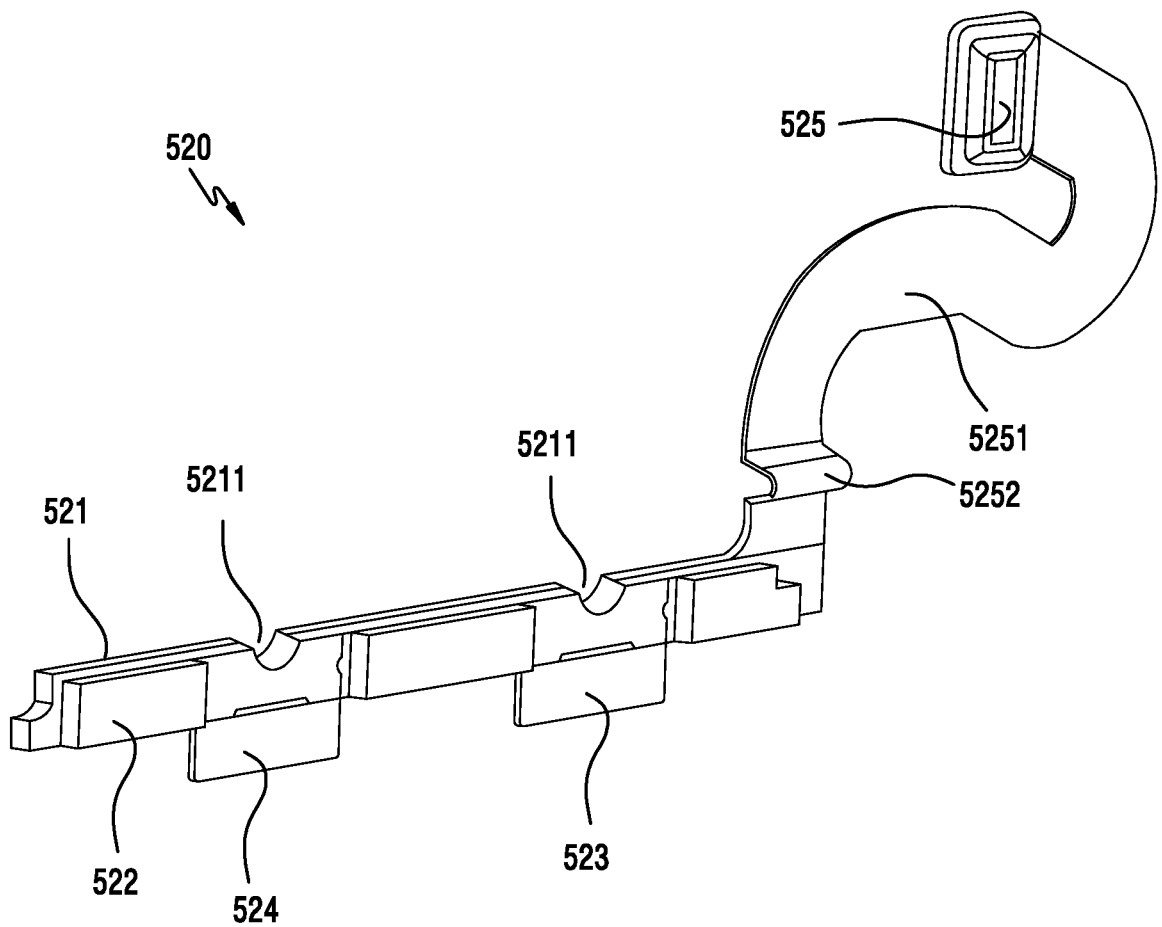
FIG. 8A is a perspective view illustrating a structure of a PCM of FIG. 5 according to various embodiments of the present disclosure.

FIG. 8A is a perspective view illustrating a structure of the PCM 520 of FIG. 5 according to various embodiments of the present disclosure, and may include a circuit board 521 on which a plurality of elements 522, including a protective circuit, may be mounted. The circuit board 521 may include metal plates 523 and 524 (e.g., a nickel tab, etc.) to connect with conductive terminals extended from the pouch terrace 5101. The metal plates 523 and 524 may support the conductive terminals 511 and 512 which are relatively soft, may be used as an intermediary member for electrically connecting to the circuit board 521, and may be electrically connected to the circuit board 521 and the conductive terminals 511 and 512 by using welding, soldering, or anisotropic conductive film (ACF). The conductive terminals 511 and 512 may be formed in at least one bending portion or in a foldable shape formed by being bent multiple times in different directions to absorb an external impact without breakage of a battery pouch or a battery cell caused by the external impact or intervention of conductive terminals.

According to various embodiments of the present disclosure, the PCM 520 may be electrically connected to the circuit board 521, and may include an FPCB 5251 including a connector 525 extended by a specific length and electrically connected to an electronic device (e.g., the PCB of the electronic device 300)). The FPCB 5251 may also be electrically connected to the circuit board by using welding, soldering, or ACF.

According to various embodiments of the present disclosure, the FPCB 5251, which is relatively soft and susceptible to an external impact, may include a bending portion 5252 of which a specific portion is bent for a buffering effect. However, the present disclosure is not limited thereto, and thus the FPCB 5251 may include a margin area of which at least a sub-area I is curled or formed to have a specific length for the purpose of buffering to prevent breakage. The bending portion 5252, curling area, or margin area of the FPCB 5251 may be disposed in a space between the housing and the PCB to contribute to prevention of breakage caused by an impact.

According to various embodiments of the present disclosure, at least one stopper recess 5211 may be formed on one side of the circuit board 521 of the PCM 520. The stopper recess 5211 may accommodate a stopper protrusion formed in a case to be described later, thereby preventing the circuit board 521 from being randomly deviated inside the case 530.

Figure 8B:
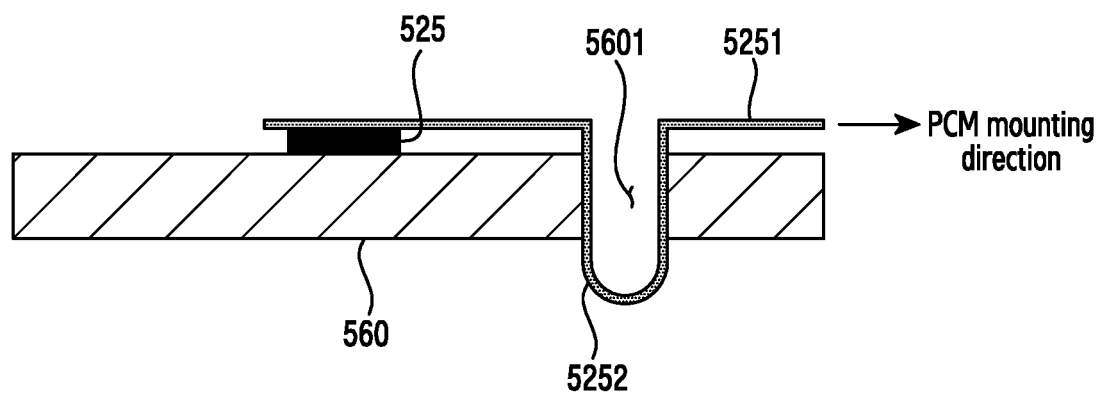
FIG. 8B to FIG. 8D illustrate a state where an FPCB of a PCM is disposed inside an electronic device according to various embodiments of the present disclosure.
Figure 8C:
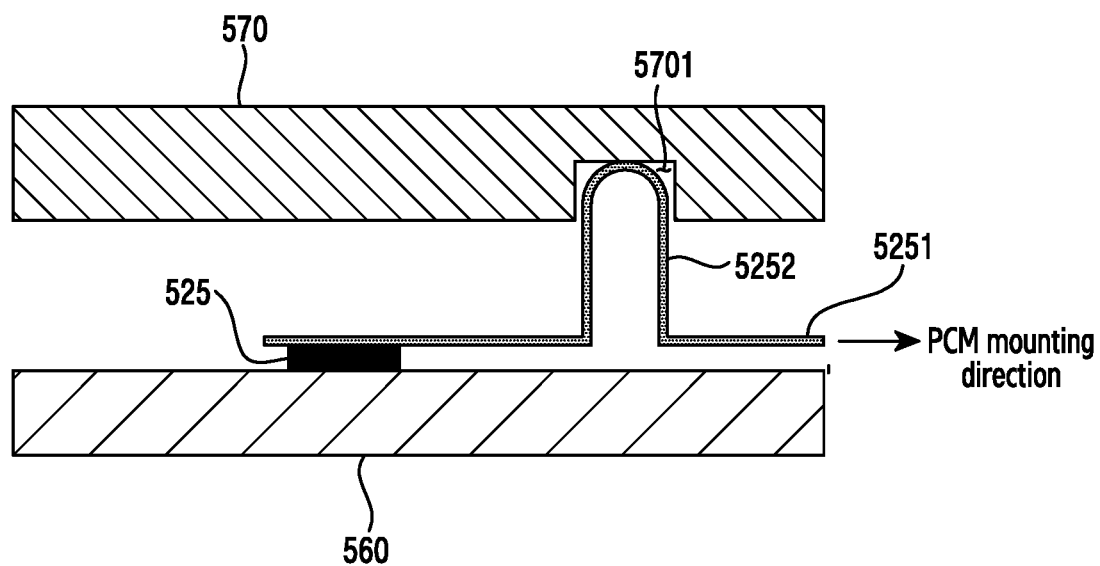
Figure 8D:
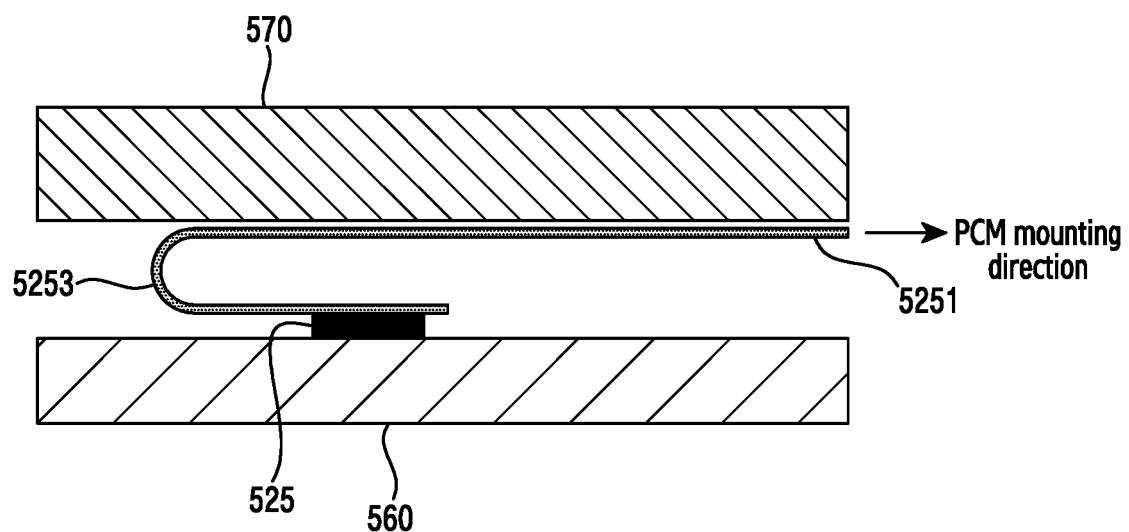

FIG. 8B to FIG. 8D illustrates a state where an FPCB of a PCM is disposed inside an electronic device according to various embodiments of the present disclosure.

Referring to FIG. 8B, the FPCB 5251 may be electrically connected in such a manner that one end thereof is mounted on the PCM and the connector 525 of the other end is mounted on a PCB 560 disposed inside the electronic device. The bending portion 5252 formed as a margin area of the FPCB 5251 may be disposed in a penetration manner to an opening 5601 formed in the PCB 560. The bending portion 5252 of the FPCB 5251 may be disposed to be mounted on a recess formed in the PCB 560. The bending portion 5252 of the FPCB 5251 may provide a buffering effect based on a relative movement of a battery cell or a PCM due to an external impact delivered in a PCM connection direction, thereby preventing a short circuit or the like of the FPCB 5251.

Referring to FIG. 8C, the FPCB 5251 may be electrically connected in such a manner that one end is mounted on the PCM and the connector 525 of the other end is mounted on the PCB 560 disposed inside the electronic device. The bending portion 5252 formed as a margin area of the FPCB 5251 may be disposed in a mounting manner to a recess 5701 formed inside a housing 570 of the electronic device. The bending portion 5252 of the FPCB 5251 may provide a buffering effect based on a relative movement of a battery cell or a PCM due to an external impact delivered in a PCM connection direction, thereby preventing a short circuit or the like of the FPCB 5251.

Referring to FIG. 8D, the FPCB 5251 may be electrically connected in such a manner that one end is mounted on the PCM and the connector 525 of the other end is mounted on the PCB 560 disposed inside the electronic device. A bending portion 5253 formed as a margin area of the FPCB 5251 may be disposed to have a margin in an area between the PCB 560 and the housing 570 of the electronic device. The bending portion 5253 of the FPCB 5251 may provide a buffering effect based on a relative movement of a battery cell or a PCM due to an external impact delivered in a PCM connection direction, thereby preventing a short circuit or the like of the FPCB 5251.

Returning to FIG. 5, the battery 500 may include the case 530 (e.g., a PCM case, a PCM housing, etc.) for accommodating the PCM 520. According to an embodiment of the present disclosure, at least a sub-area of the case 530 may be formed in a shape capable of protecting the PCM 520 from an external impact and capable of being fixed to the lateral wall 5102 or pouch terrace 5101 of the battery pouch 510. The case 530 may be fixed to the battery pouch 510 by being bent at least one time in a state of disposing the PCM 520 to be electrically connected to the conductive terminals 511 and 512 through the conductive plates 523 and 524. The case 530 may be disposed in such a manner that at least one outer surface is in contact with the lateral wall 5102 or pouch terrace 5101 of the battery pouch 510.

Figure 9A:
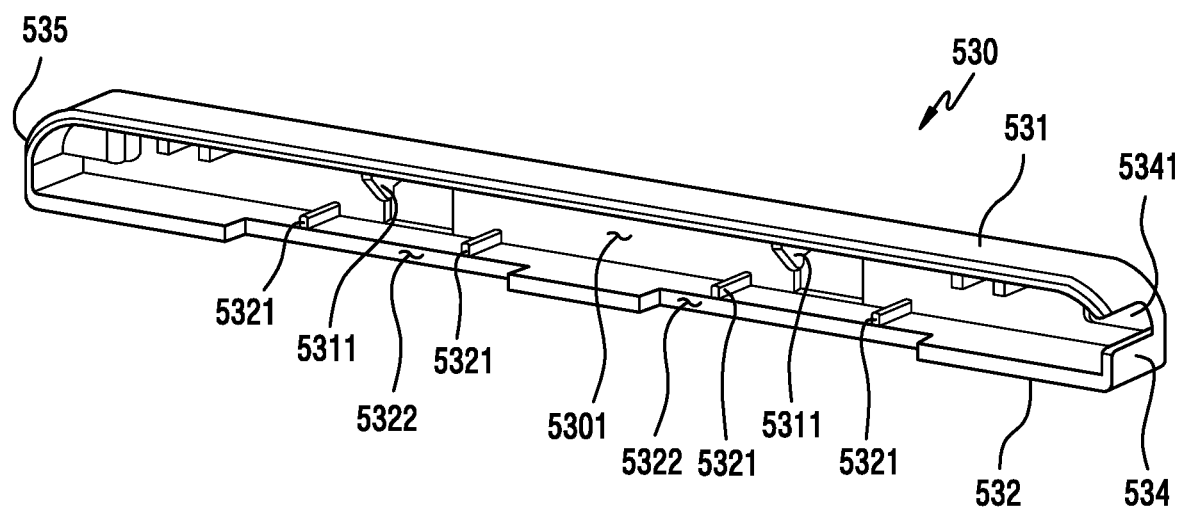
FIG. 9A and FIG. 9B are perspective views of a case of FIG. 5, viewed in various directions, according to various embodiments of the present disclosure.
Figure 9B:
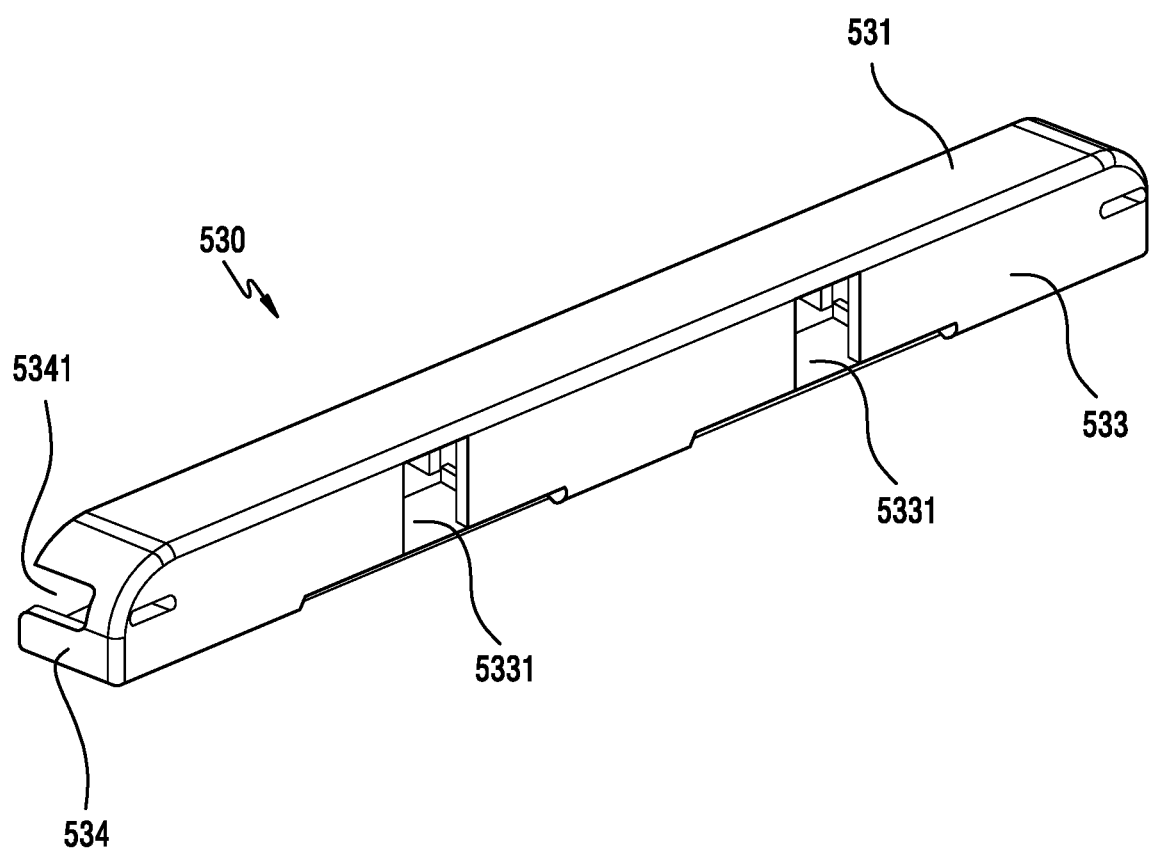

FIG. 9A and FIG. 9B are perspective views of the case 530 of FIG. 5, viewed in various directions, according to various embodiments of the present disclosure. The case 530 may include a first plate 531, a second plate 532 facing the first plate 531 by being spaced apart by a specific interval, and a lateral plate 533 connected to surround at least a sub-area between the first plate 531 and the second plate 532. In the case 530, the first plate 531, the second plate 532, and the lateral plate 533 may be formed together, and an accommodating space 5301 may be prepared to accommodate a circuit board 521 of the PCM 520. The case 530 may include at least one extension plate 534 or 535 extended at both ends of the lateral plate 533. Any one extension plate 534 may include an opening recess 5341 through which at least a part of the FPCB 5251 can be exposed. The case 530 may be formed in a rectangular shape having a length due to the first plate 531, the second plate 532, the lateral plate 533, and at least one extension plate 534 or 535. The case 530 may be open in a portion facing the lateral plate 533 to accommodate the circuit board 521 of the PCM 520, and an outer surface of the lateral plate 533 may be fixed in such a manner that the entire area is substantially in surface contact with the lateral wall 5102 of the battery pouch 510. The case 530 may be formed of a metal material, a synthetic resin material, or the like, or may be formed of a transparent material. Not only the aforementioned supporting member 422 and tape 421 for compensating (e.g., supporting or sealing) a step height but also a coupling member 1160 and finishing member 1180, to be described below, may be formed of a transparent material, and thus an assembly state of the PCM 520 with respect to the case 530, an assembly state of the case 530 with respect to the battery pouch 510, or an assembly state of the battery 500 with respect to a battery mounting portion 410 can be confirmed with the naked eye. The case 530 may be formed as an integral injection object by using an injection method. The case 530 may be formed by coupling a plurality of plates mechanically (e.g., bonding) or chemically (e.g., adhering).

According to various embodiments of the present disclosure, the case 530 may include at least one stopper protrusion 5311 (e.g., a hook) protruding from an inner surface of the first plate 531 in the accommodating space 5301. The stopper protrusion 5311 may be stopped at a stopper recess 5211 formed in a snap-fit structure on the circuit board 521 of the PCM 520 placed to the accommodating space 5301, so that the circuit board (e.g., the circuit board 521) is interrupted not to be deviated inside the accommodating space 5301. The case 530 may include a plurality of supporting ribs 5321 protruding from an inner surface of the second plate 532 with a specific interval in the accommodating space 5301. The supporting rib 5321 may support one surface of the circuit board 521 of the PCM 520 placed to the accommodating space 5301 to provide a spacer for minimizing a contact area with respect to an inner portion of the case 530, thereby facilitating a buffering effect and contributing to allowing the stopper protrusion 5311 to be tightly accommodated in a stopper recess 5211 of the circuit board 521. The case 530 may include a terminal guide recess 5322 formed to be lower than a boundary along a boundary of the second plate 532. The terminal guide recess 5322 may guide the conductive terminals 511 and 512, or the metal plates 523 and 524.

According to various embodiments of the present disclosure, the lateral plate 533 may be formed in a shape substantially corresponding to a shape of the lateral wall 5102 of the battery pouch 510. The lateral plate 533 may be formed in a planar shape without a step height or a curvature so that the lateral wall 5102 of the battery pouch 510 has a maximum contact area (e.g., an area of about 65% to 100% with respect to a total area of the lateral wall). At least one through-hole 5331 may be formed in the lateral plate 533, and the through-hole 5331 may accommodate a notch or protrusion formed on the lateral surface of the battery pouch 510 to facilitate extension of the contact area. The lateral plate 533 may include a recess formed to be lower than the lateral plate 533 instead of the through-hole 5331. However, the present disclosure is not limited thereto, and thus the through-hole 5331 may be created in the shape of a mold for injecting elements (e.g., a stopper protrusion, etc.) disposed inside the case.

According to various embodiments of the present disclosure, the lateral plate 533 of the case 530 may be fixed or attached to the lateral wall 5102 of the battery pouch 510 through taping, bonding, laser welding, or the like. The lateral plate 533 of the case 630 may have an escaping portion and a laser/plasma processing portion which are formed or disposed to be fixed or attached to the lateral wall 5102 of the battery pouch 510.

According to various embodiments of the present disclosure, the case 530 may include the PCM 520 and a structure for protecting the conductive terminals 511 and 512, including the conductive plate, connected to the PCM 520. The case 530 may be formed in such a manner that the circuit board 521 does not protrude to the outside of the case 530 when the PCM 520 is completely placed in the accommodating space 5301. At least one plate between the first plate 531 and second plate 532 of the case 530 may be formed to have a size capable of protruding further outward than the circuit board 521 placed to the accommodating space 5301. In addition, at least one plate between the first plate 531 and second plate 532 of the case 530 may be connected to the circuit board 521 and may be formed to have a size capable of protruding further outward than the conductive terminals 511 and 512 disposed by detouring a boundary of the first plate 531 or the second plate 532. Therefore, an impact and breakage caused by a direct contact from the outside of the PCM 520 can be prevented by the first plate 531 or second plate 532 having such a protrusion amount. Even if a secondary impact caused by an external impact of the electronic device is delivered to the battery 500, the impact may be first delivered to at least one plate of the case 530 further protruding than the circuit board 521 of the PCM 520 and the conductive terminals 511 and 512, thereby preventing breakage of the circuit board 521, or the conductive terminals 511 and 512. The secondary impact delivered to at least one plate may be cancelled through the lateral plate 533 which is in surface contact with the lateral wall 5102 of the battery pouch 510, thereby preventing damage of a battery cell 600.

Returning to FIG. 5, the battery 500 may include the coupling member 540 for fixing the lateral plate 533 of the case 530 to which the PCM 520 is placed in the lateral wall 5102 of the battery pouch 510. According to an embodiment of the present disclosure, the coupling member 540 may be formed of an elastic material interposed between the case 530 and the lateral wall 5102 of the battery pouch 510 to provide a buffering effect. The coupling member 540 may include rubber, urethane, silicone, resin, UV molding, or an adhesive agent having a specific modulus property. The coupling member 540 may serve to attach the case 530 to the lateral wall 5102 of the battery pouch 510, as well as the buffering effect.

According to various embodiments of the present disclosure, the battery 500 may include the finishing member 550 for finishing the case 530 in which the PCM 520 is disposed in a state where the case 530 is fixed to the lateral wall 5102 of the battery pouch 510. The finishing member 550 may include a finishing tape or a protective label, and may be attached to an outer surface of the battery pouch 510 while surrounding substantially the entire area of the case 530 by including the PCM 520.

Figure 10:
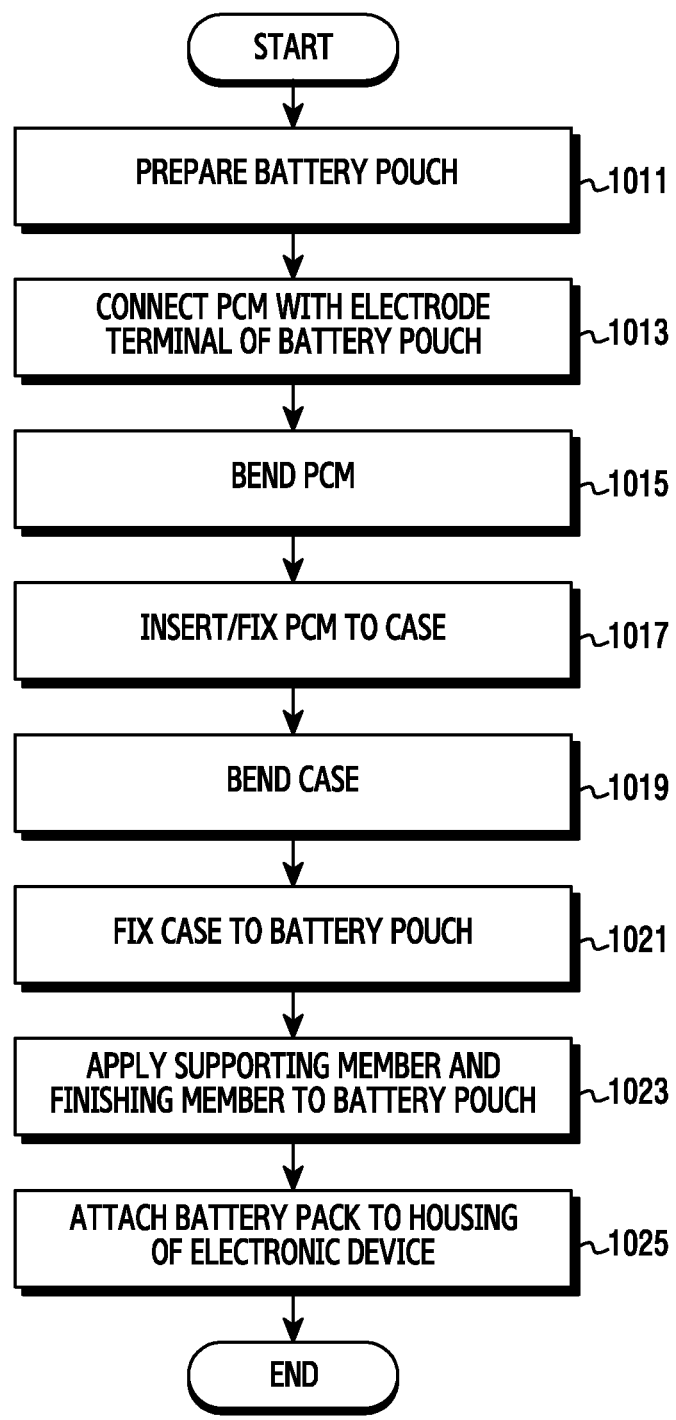
FIG. 10 is a flowchart illustrating a manufacturing process of a battery according to various embodiments of the present disclosure.

FIG. 10 is a flowchart illustrating a manufacturing process of a battery according to various embodiments of the present disclosure. FIG. 11A to FIG. 11J illustrate a manufacturing process of a battery in sequence according to various embodiments of the present disclosure.

A battery 1100 of FIG. 11A to FIG. 11J may be similar to the battery 370 of FIG. 3, the battery 430 of FIG. 4C, or the battery 500 of FIG. 5, or may include another embodiment of the battery.

A battery manufacturing process of FIG. 10 will be described with reference to FIG. 11A to FIG. 11J.

Figure 11A:
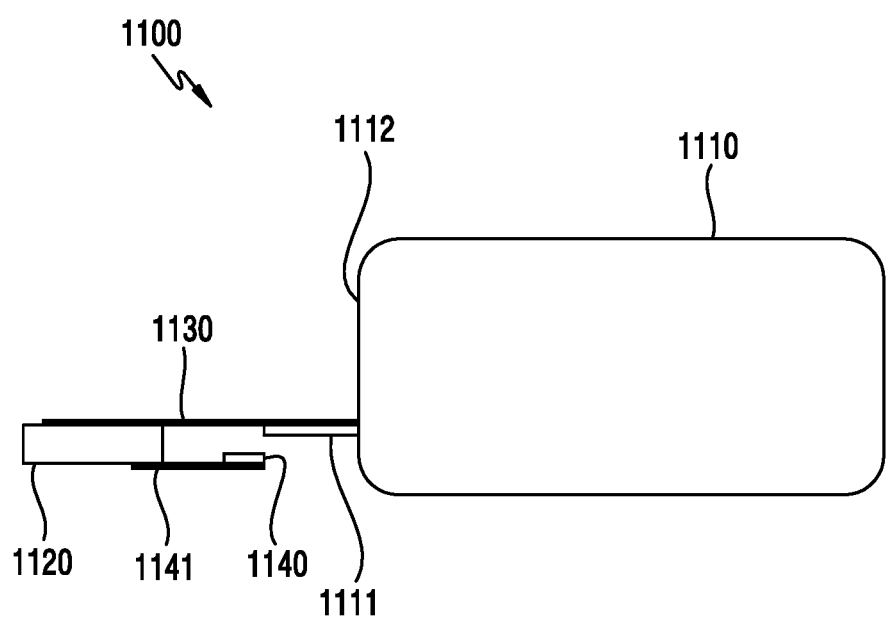
Figure 11B:
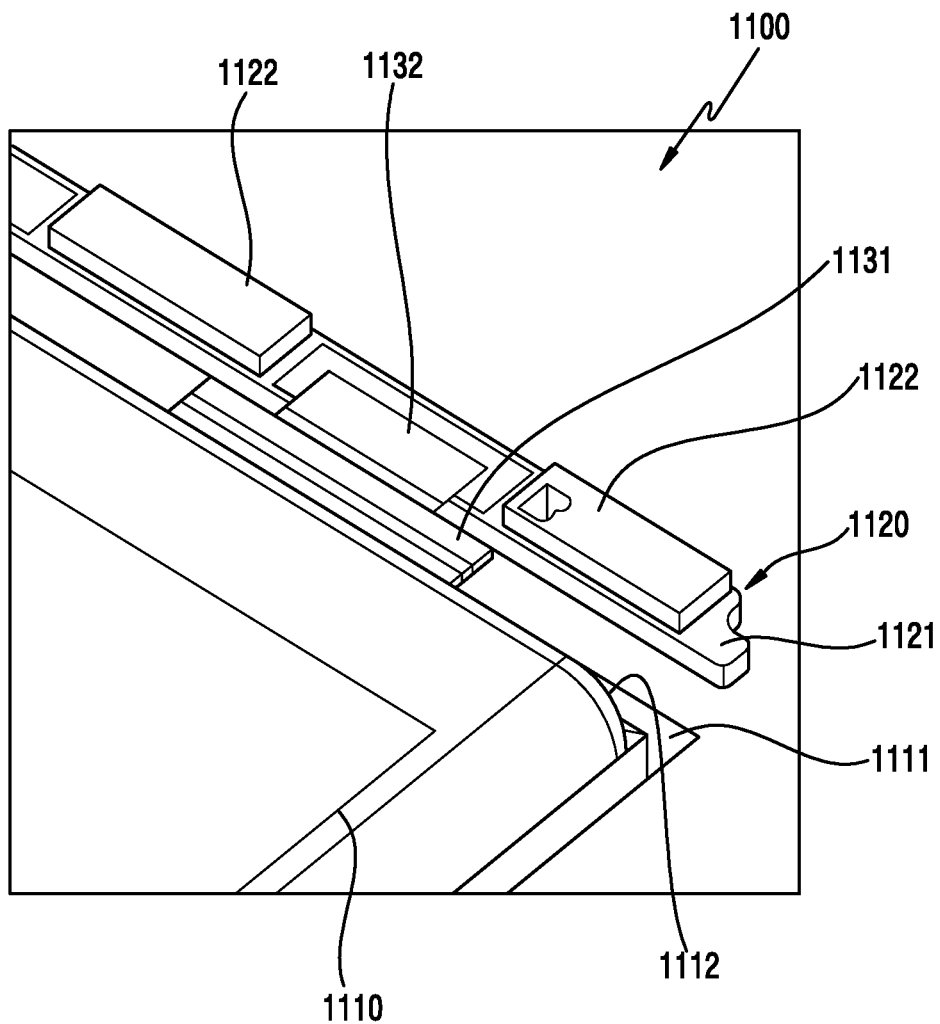

Referring to FIG. 10, in step 1011, a battery pouch 1110 may be prepared. According to an embodiment of the present disclosure, as shown in FIG. 11A, a battery pouch 1110 may be configured such that a battery cell 600 including plate-type cells (e.g., cells 610 and 630, or cells 710 and 730) which are wound multiple times and which have a separation layer 620 therebetween is supported by an electrolyte. The battery pouch 1110 may include a pouch terrace 1111 as a sealing portion, and may include an electrode connection portion 1130 (e.g., a conductive terminal or a conductive plate) exposed through the pouch terrace 1111.

Thereafter, in step 1013, the battery pouch 1110 may be electrically connected to a PCM 1120 through the electrode connection portion 1130 (e.g., the conductive terminal or the conductive plate). According to an embodiment of the present disclosure, the PCM 1120 may be electrically connected through the electrode connection portion 1130 protruding from the pouch terrace 1111 in which a circuit board 521 having a plurality of circuit elements 522 mounted thereon is formed on a lateral wall 1112 of the battery pouch 1110. The electrode connection portion 1130 may be electrically connected to a circuit board 521 of the PCM 1120 by using welding, soldering, or ACF. The PCM 1120 may be extended from the circuit board 521, and may include an FPCB 1141 having a specific length including a connector 1140 to be electrically connected to a PCB inside the electronic device.

Figure 11C:
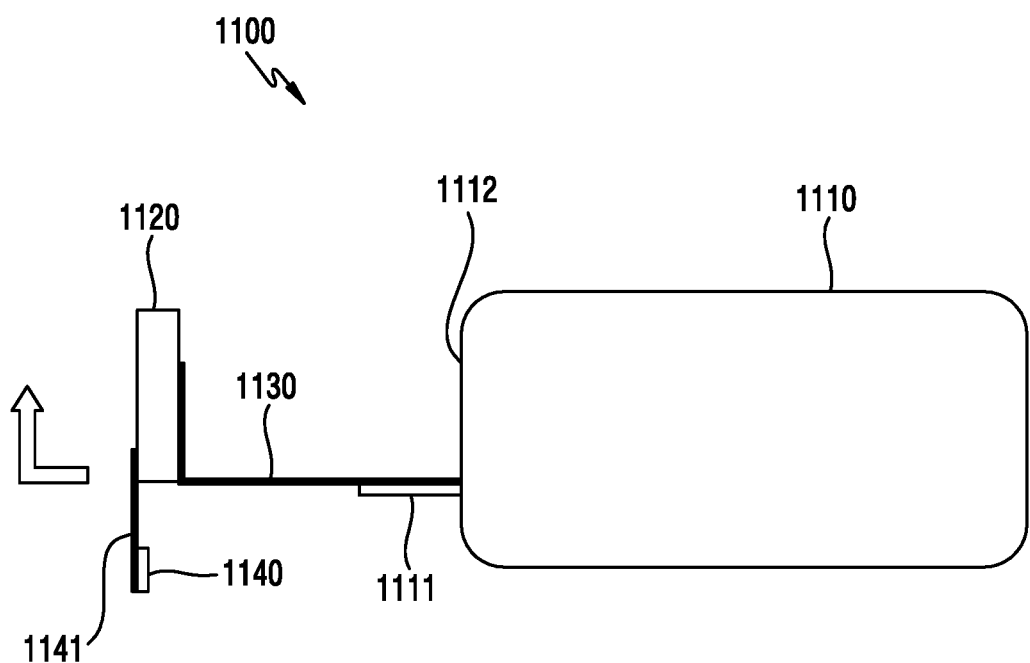

In step 1015, the PCM 1120 may be bent in a specific direction. As illustrated in FIG. 11C, the PCM may be bent one time in an arrow direction. According to an embodiment of the present disclosure, a direction of the PCM 1120 may change in practice due to an operation of bending the electrode connection portion 1130. In the electrode connection portion 1130, a conductive terminal 1131 extended from the pouch terrace 1111 may be bent, a conductive plate 1132 may be bent, or an overlapping portion in which the conductive plate and the conductive terminal are electrically connected may be bent.

Figure 11D:
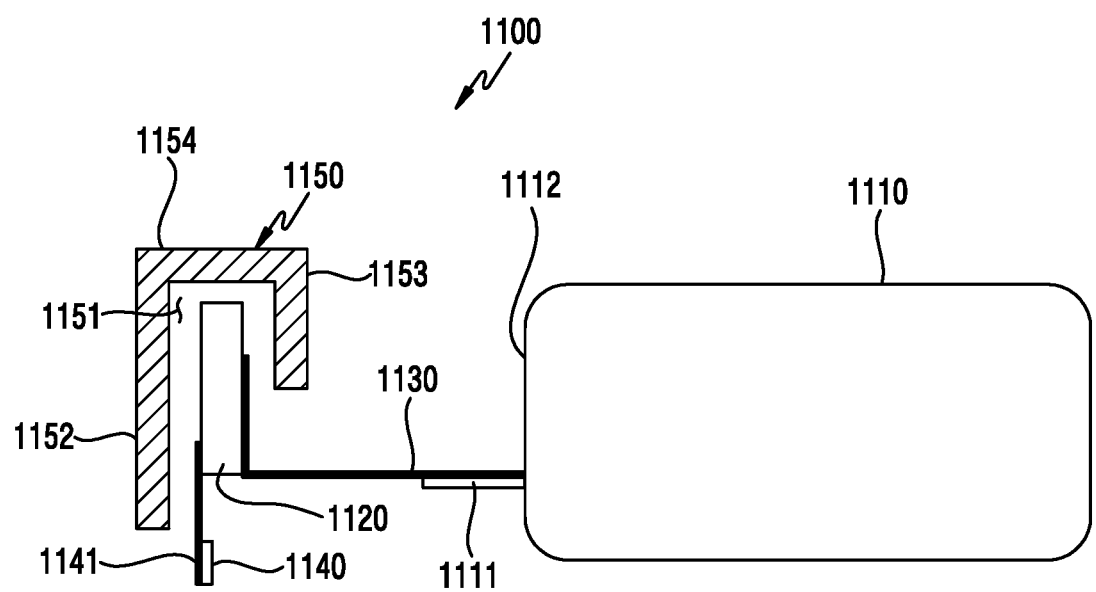

In step 1017, the PCM 1120 may be inserted or fixed to a case 1150. According to an embodiment of the present disclosure, as illustrated in FIG. 11D, the case 1150 may include a first plate 1152, a second plate 1153 facing the first plate 1152 by being space apart by a specific interval, and a lateral plate 1154 for connecting at least one portion along boundaries of the first plate 1152 and the second plate 1153. The accommodating plate 1151 may be prepared to dispose the PCM 1120 by means of the first plate 1152, the second plate 1153, and the lateral plate 1154. The PCM 1120 may be fixed in such a manner that a stopper protrusion 5311 formed inside the accommodating space 1151 is stopped at a stopper recess 5211 formed in a circuit board 52 while being supported by a supporting rib 5321 formed inside the accommodating space 1151 of the case 1150.

According to various embodiments of the present disclosure, before the step 1015, the case 1150 may first dispose the PCM 1120, and thereafter the case 1150 in which the PCM 1120 is disposed may be bent in an arrow direction illustrated in FIG. 11C.

Figure 11E:
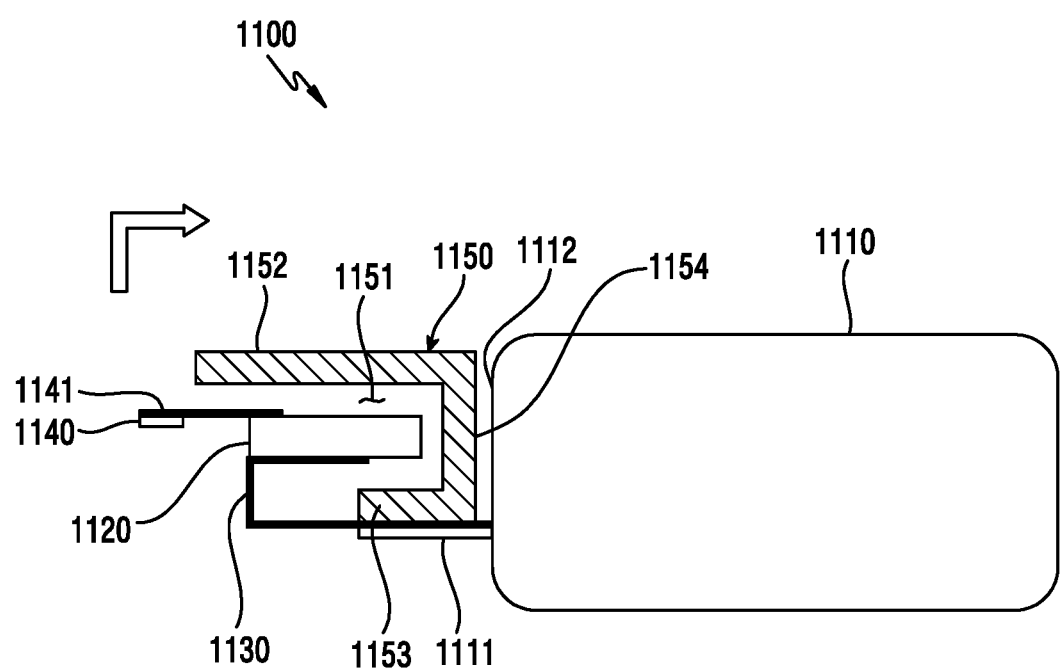

In step 1019, the case to which the PCM is fixed may be bent in a specific direction. According to an embodiment of the present disclosure, as shown in FIG. 11E and FIG. 11F, the case 1150 may be bent in an arrow direction so that the lateral plate 1154 faces the lateral wall 1112 of the battery pouch 1110. The through-hole 1157 for accommodating a notch or protrusion which may be formed on the lateral wall 1112 of the battery pouch 1110 may be formed in the lateral plate 1154 of the case 1150. The case 1150 may be extended from the lateral plate 1154, and may include an extension plate 1155 connected to the first and second plates 1152 and 1153. The extension plate 1155 may include an opening recess 1156 formed such that at least a part of the FPCB 1141 can be extended.

According to various embodiments of the present disclosure, the lateral plate 1154 of the case 1150 may be formed substantially in the same shape as the lateral wall 1112 of the battery pouch 1110. The lateral plate 1154 of the case 1150 may be formed to have a height of a lateral wall, which is the same as the height from the pouch terrace 1111 of the battery pouch 1110 to an upper surface of the battery.

According to various embodiments of the present disclosure, the case 1150 may include the PCM 1120 and a structure for protecting the electrode connection portion 1130 connected to the PCM 1120. The case 1150 may be formed in such a manner that a circuit board does not protrude to the outside of the case 530 when the PCM 1120 is completely placed in the accommodating space 1151. The first plate 1152 of the case 1150 may be formed to have a size capable of protruding further outward than the PCM 1120 placed in the accommodating space 1151. In addition, the first plate 1152 of the case 1150 may be connected to the PCM 1120, and may have a size capable of protruding further outward than the electrode connection portion 1130 disposed by detouring a boundary of the second plate 1153. Therefore, an impact and breakage caused by a direct contact from the outside of the PCM 1120 can be prevented by the first plate 1152 having such a protrusion amount. Even if a secondary impact caused by an external impact of the electronic device is delivered, the impact may be first delivered to the first plate 1152 of the case 1150 further protruding than the PCM 1120 and the electrode connection portion 1130, thereby preventing breakage of the PCM 1120 and the electrode connection portion 1130. The secondary impact delivered to the first plate 1152 may be cancelled through the lateral plate 1154 which is in surface contact with the lateral wall 1112 of the battery pouch 1110, thereby preventing damage of a battery cell 600 inside thereof.

Figure 11G:
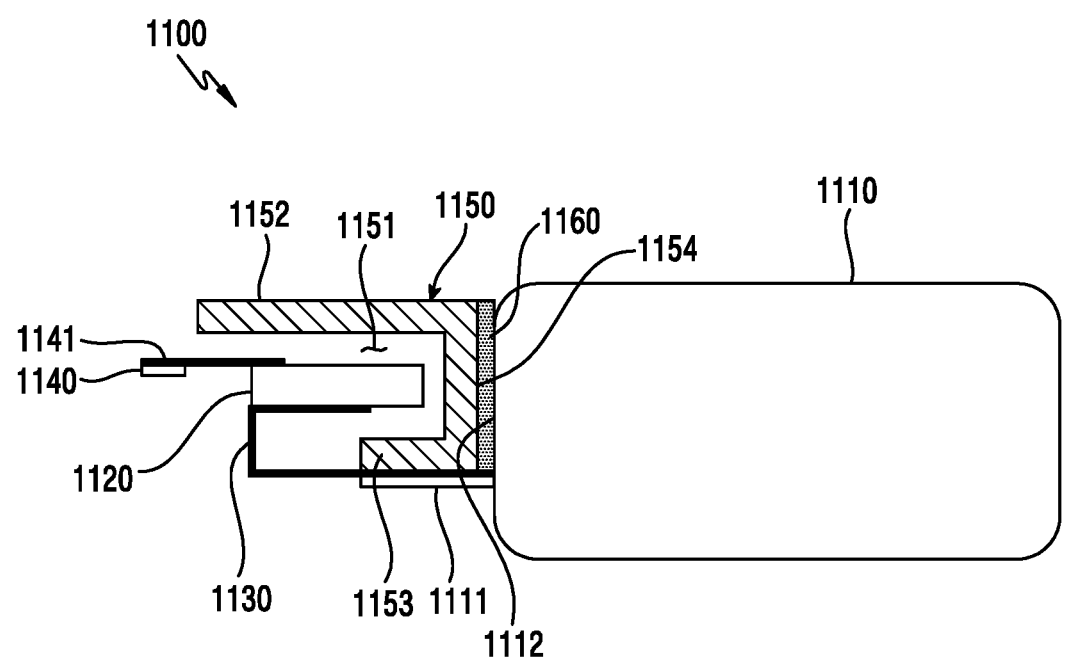
Figure 11H:
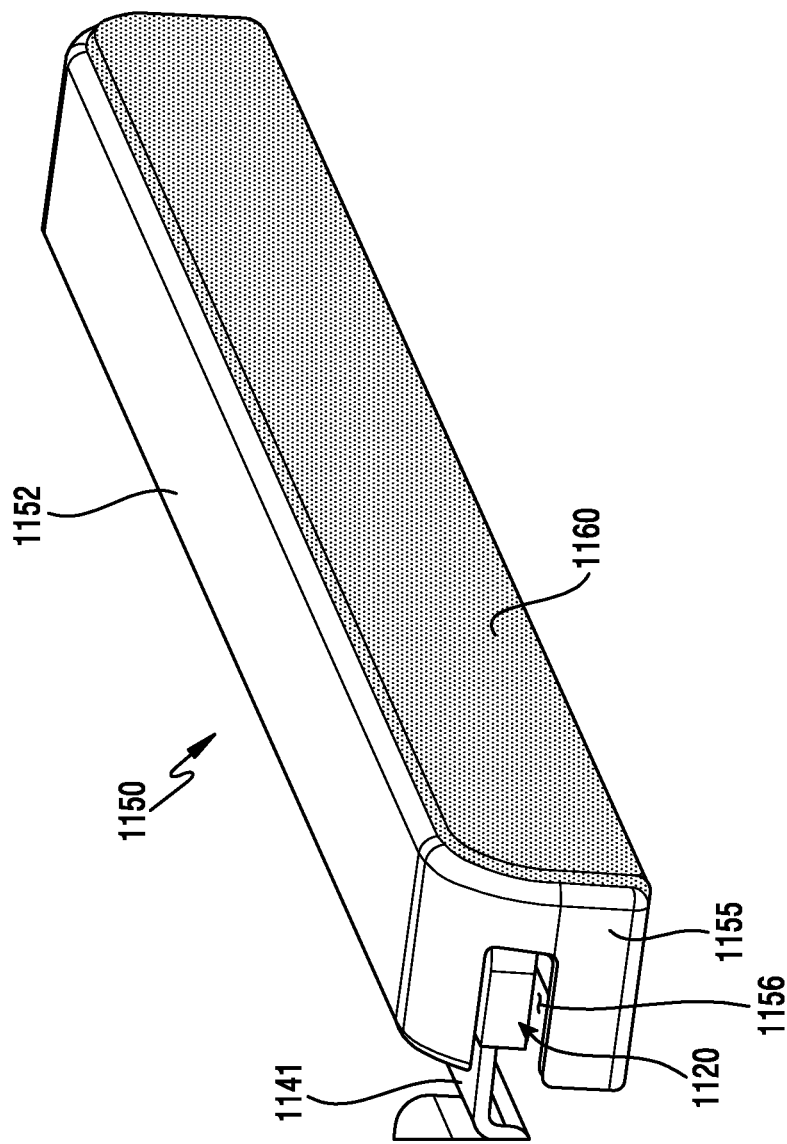

Thereafter, in step 1021, the case 1150 to which the PCM 1120 is placed may be fixed to the battery pouch 1110. According to an embodiment of the present disclosure, as shown in FIG. 11G and FIG. 11H, a coupling member 1160 may be disposed between the lateral plate 1154 of the case 1110 and the lateral wall 1112 of the battery pouch 1110 to provide fixing or buffering effects. The coupling member 1160 may include rubber, urethane, silicone, resin, or an adhesive agent having a specific modulus property.

Figure 11I:
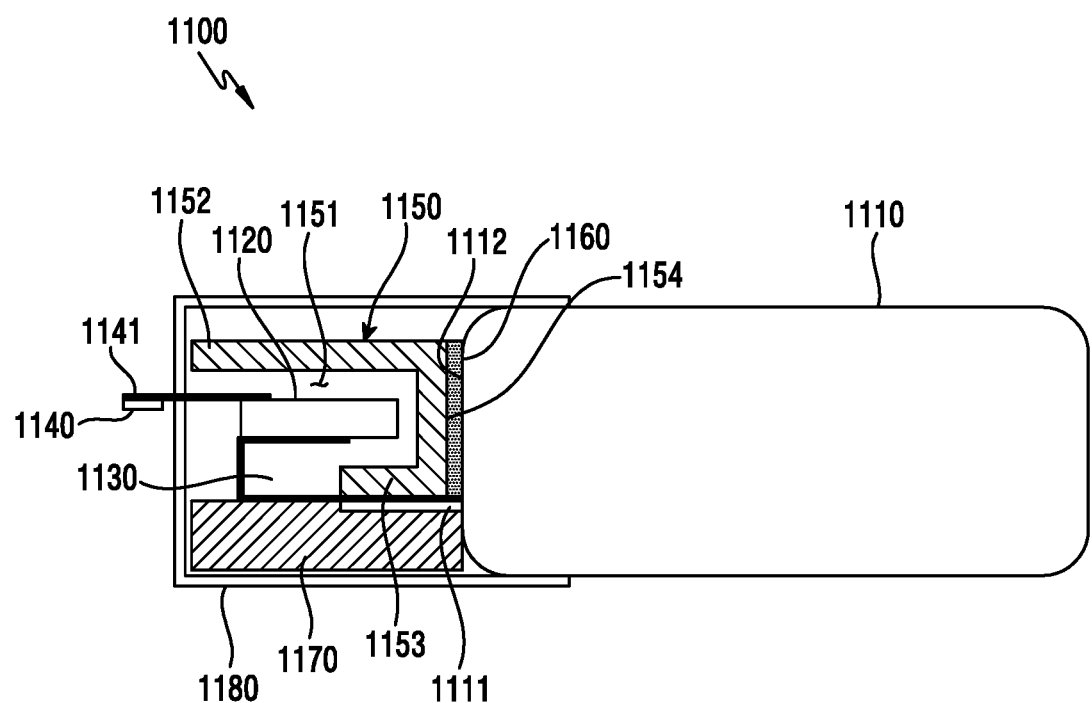
Figure 11J:
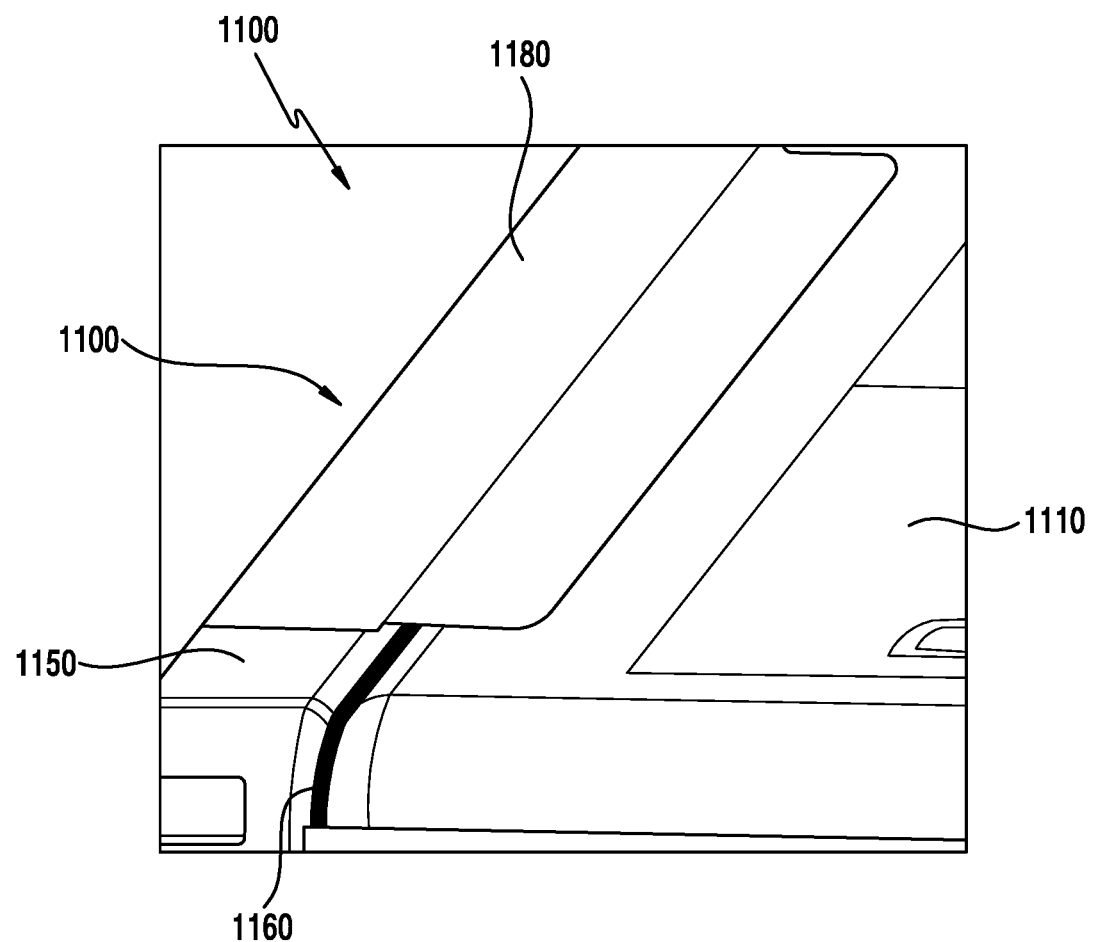

In step 1023, a supporting member 1170 and a finishing member 1180 may be applied to the battery pouch 1110. According to an embodiment of the present disclosure, as illustrated in FIG. 11I and FIG. 11J, the supporting member 1170 may be disposed to compensate (e.g., support or seal) a step height of a portion to which the case 1150 is not attached with respect to the pouch terrace 1111 in the lateral wall 1112 of the battery pouch 1110. The supporting member 1170 may support the electrode connection portion 1130 together with the second plate 1153 of the case 1150 in a sandwich manner. The supporting member 1170 may uniformly ensure a distribution area of the secondary impact for the battery pouch 1110, and may prevent a rotational movement of the PCM 1120 and the case 1150, which may occur due to an external impact caused by a contact area imbalance between the lateral wall 1112 and the lateral plate 1154 to avoid breakage of the electrode connection portion 1130 (e.g., a conductive terminal and a conductive plate) inside the battery 1100. The supporting member 1170 may provide an effect of surrounding a periphery of the electrode connection portion 1130 in a sandwich manner, and may provide a structure for avoiding buckling caused by an external force applied perpendicularly to a direction of extending the electrode connection portion. The supporting member 1170 may be disposed in such a manner that it is attached to the case 1150 as a separate injection object of the same material as the case 1150. The supporting member 1170 may include a member such as rubber, urethane, silicone, adhesive agents, or the like having different elasticity. When the supporting member 1170 is disposed outside the battery 1100, it may be replaced with a part of the housing of the electronic device. When the supporting member 1170 is formed as a rigid body, a certain distance may be ensured between the battery pouch 1110 and the electrode connection portion 1130 to prevent a primary impact from being directly applied to the battery pouch 1110.

According to various embodiments of the present disclosure, the supporting member 1170 may be disposed to further protrude than the second plate 1153 and the electrode connection portion 1130. The supporting member 1170 may be disposed to have the same protrusion amount as the first plate 1152. The supporting member 1170 may be disposed to further protrude than the first plate 1152.

According to various embodiments of the present disclosure, the finishing member 1180 may be applied to finish the case 1150 in which the PCM 1120 is accommodated in a state where the case 1150 is fixed to the lateral wall 1112 of the battery pouch 1110. The finishing member 1180 may include a finishing tape or a protective label, and may be arranged to be attached to an outer surface of the battery pouch 1110 while surrounding substantially the entire area of the case 1150 by including the PCM 1120. The finishing member 1180 may be disposed by including the supporting member 1170. The supporting member 1170 may be disposed to be attached to or in contact with an outer surface of the finishing member 1180.

According to various embodiments of the present disclosure, the finishing member 1180 may be disposed to be in contact with or attached to a protruding ending portion of the first plate 1152 further protruding than the PCM 1120 disposed inside the case 1150. The finishing member 1180 may finish the battery 1100, and at the same time, if it is formed of an elastic material having a specific thickness, may facilitate a buffering effect.

In step 1025, the battery 1100 (e.g., battery pack) may be placed in a housing of an electronic device.

Figure 12:
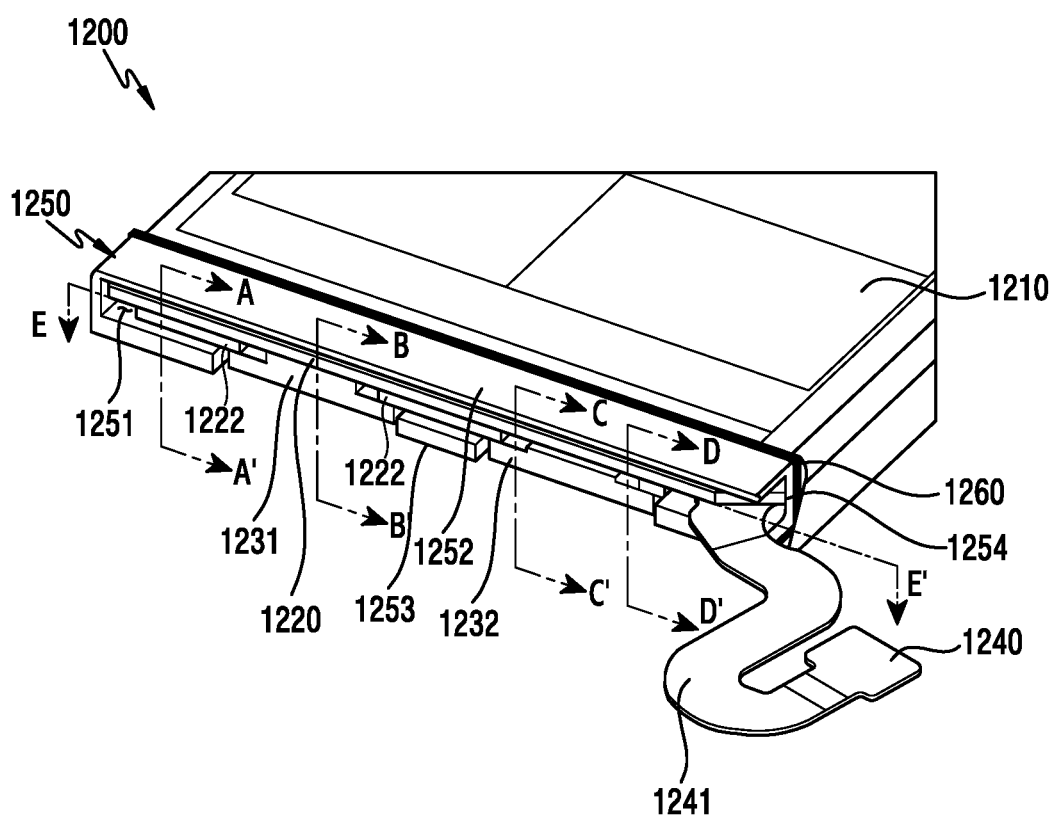
FIG. 12 is a perspective view illustrating a state where a PCM is assembled to a battery pouch according to various embodiments of the present disclosure.

FIG. 12 is a perspective view illustrating a state where a PCM is assembled to a battery pouch according to various embodiments of the present disclosure.

A battery 1200 of FIG. 12 may be similar to the battery 370, or may include another embodiment of the battery.

Referring to FIG. 12, the battery 1200 may include a battery pouch 1210 including a battery cell, a case 1250 fixed to one side of the battery pouch 1210, and a PCM 1220 disposed to an inner accommodating space of the case 1250 and having at least one circuit element 1222 mounted thereon to electrically protect the battery cell.

According to various embodiments of the present disclosure, the case 1250 may include a first plate 1252, a second plate 1253 disposed to be spaced apart from the first plate 1252, and a lateral plate 1254 fixed to the battery pouch 1210 to connect the first plate 1252 and the second plate 1253. The PCM 1220 may be electrically connected in such a manner that electrode connection portions 1231 and 1232 (e.g., a conductive terminal and a conductive plate) extended from the battery pouch 1210 are provided by detouring into the case 1250 along an outer surface of the second plate 1253. The PCM 1220 may not protrude to the outside of the case 1220, and at least a sub-area (e.g., the first plate 1252) of the case 1250 protrudes further outward than the PCM 1220 such that an external impact is first applied thereto. The battery 1220 may include an FPCB 1241 including a connector 1240 at an ending portion extended to the outside of the case 1250 from the PCM 1220. If the battery 1200 is placed in a mounting portion 410 of a housing 400, the FPCB 1241 may be electrically connected to a PCB in the vicinity thereof.

Figure 13A:
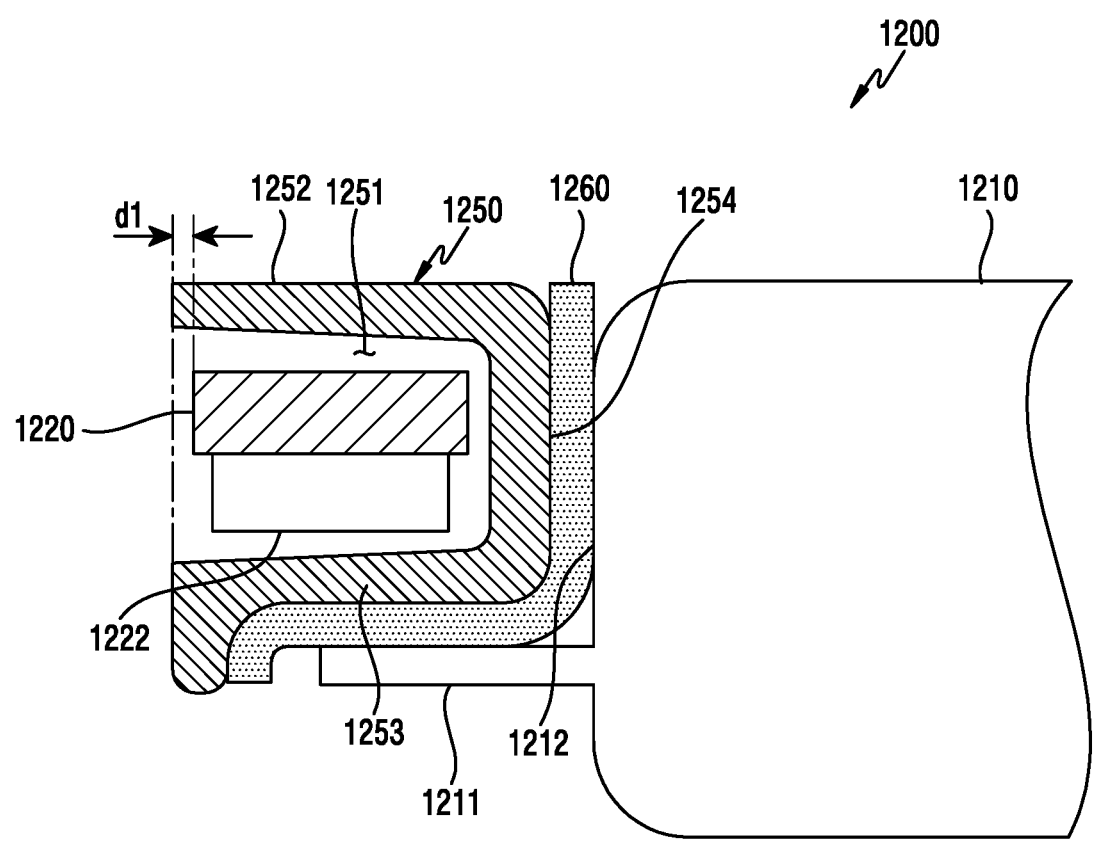
FIG. 13A is a sectional view, cut along the line A-A', of the battery pouch of FIG. 12 according to various embodiments of the present disclosure.

FIG. 13A is a sectional view, cut along the line A-A' of the battery pouch of FIG. 12 according to various embodiments of the present disclosure.

Referring to FIG. 13A, the case 1250 may have the accommodating space 1252 prepared to accommodate the PCM 1220 by means of the first plate 1252, the second plate 1253, and the lateral plate 1254. According to an embodiment of the present disclosure, the PCM 1220 may include at least one circuit element 1222 mounted to electrically protect a battery cell included in the battery pouch 1210. The case 1250 may accommodate the PCM 1220 in the accommodating space 1251, and thereafter may be bent multiple times, so that an outer surface of the lateral plate 1254 is fixed to a lateral wall 1212 of the battery pouch 1210 by means of a coupling member 1260. The coupling member 1260 may be disposed to be extended to the lateral plate 1254 and second plate 1253 of the case 1250. Accordingly, the case 1250 may be fixed to the lateral wall 1212 of the battery pouch 1210 and a pouch terrace 1211 by means of the coupling member 1260.

According to various embodiments of the present disclosure, the case 1250 may be formed such that at least a sub-area further protrudes in a direction opposite to a case placement direction than the PCM 1220 to which the accommodating space 1251 is disposed. The case 1250 may be formed such that the first plate 1251 has a protrusion amount d1 with respect to the PCM 1220. An impact or breakage caused by a direct contact from the outside of the PCM 1220 may be avoided by means of the first plate 1252 having such a protrusion amount. Even if a secondary impact caused by an external impact of the electronic device is delivered, the impact may be first delivered to the first plate 1252 of the case 1250 protruding further than the PCM 1220, thereby preventing breakage of the PCM 1220. The secondary impact delivered to the first plate 1252 may be cancelled through the lateral plate 12154 and coupling member 1260 which are in surface contact with the lateral wall 1212 of the battery pouch 1110, thereby preventing damage of a battery cell 600 inside thereof.

Figure 13B:
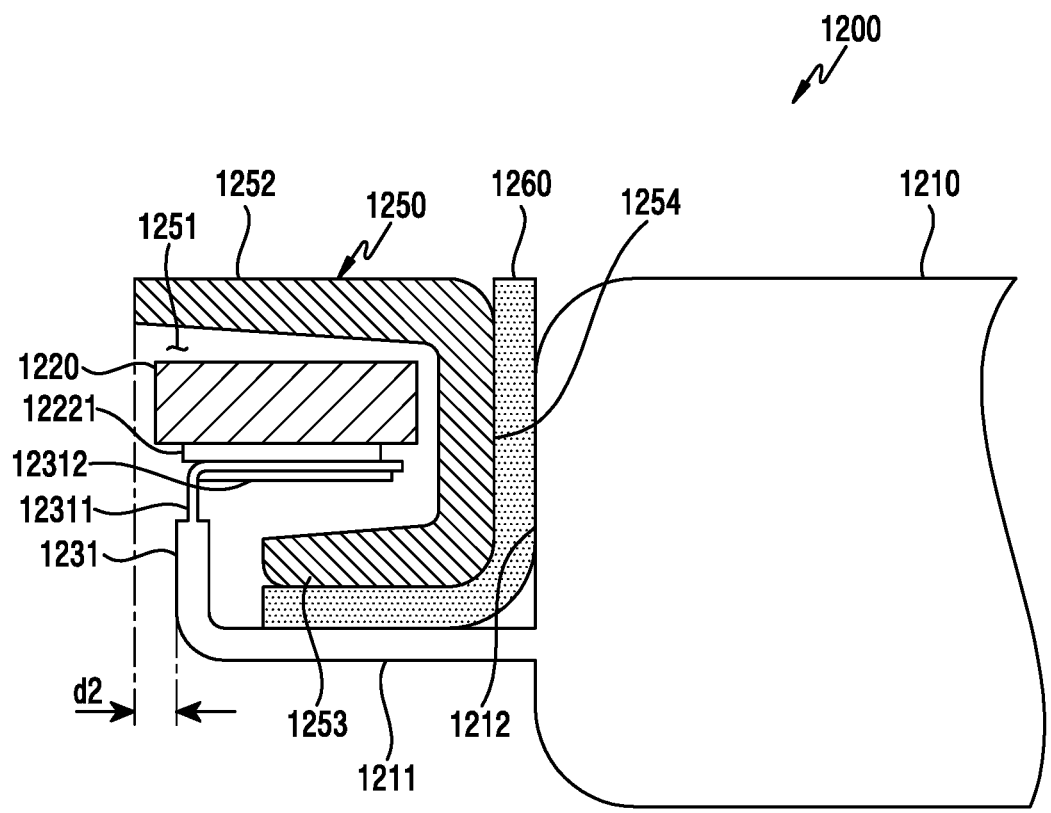
FIG. 13B is a sectional view, cut along the line B-B', of a battery pouch of FIG. 12 according to various embodiments of the present disclosure.

FIG. 13B is a sectional view, cut along the line B-B' of a battery pouch of FIG. 12 according to various embodiments of the present disclosure.

Referring to FIG. 13B, the electrode connection portion 1231 protruding from a pouch terrace 1211 may maintain a state of being electrically connected to the PCM 1220 installed inside an accommodating space 1251 by detouring the second plate 1253 of the case 1250. According to an embodiment of the present disclosure, a conductive plate 12312 may be included in the PCM 1220 or a conductive terminal 12311, or may electrically connect a PCM terminal 12221, the conductive terminal 12311, and the PCM 1220 as a separate element. The conductive plate 12312 may be located in the PCM 1220 and the conductive terminal 12311. In this case, a total length of the pouch terrace 1211 and the electrode connection portion 1231 protruding from the pouch terrace 1211 may also be disposed not to protrude in comparison with the first plate 1252 of the case 1250. The case 1250 may be formed to have a protrusion amount d2 so as to further protrude than a maximum protrusion amount of the electrode connection portion 1231. Since an impact is preferentially delivered to the first plate 1252 of the case 1250 protruding with the protrusion amount d2 even if a secondary impact is delivered to the battery 1200 due to an impact of the electronic device, the electrode connection portion can be minimized, and an impact applied to the lateral plate 1254 from the first plate 1252 may be compensated by the lateral wall 1212 of the battery pouch 1210 of which a surface is in contact with the coupling member 1260 and the lateral plate 1254.

Figure 13C:
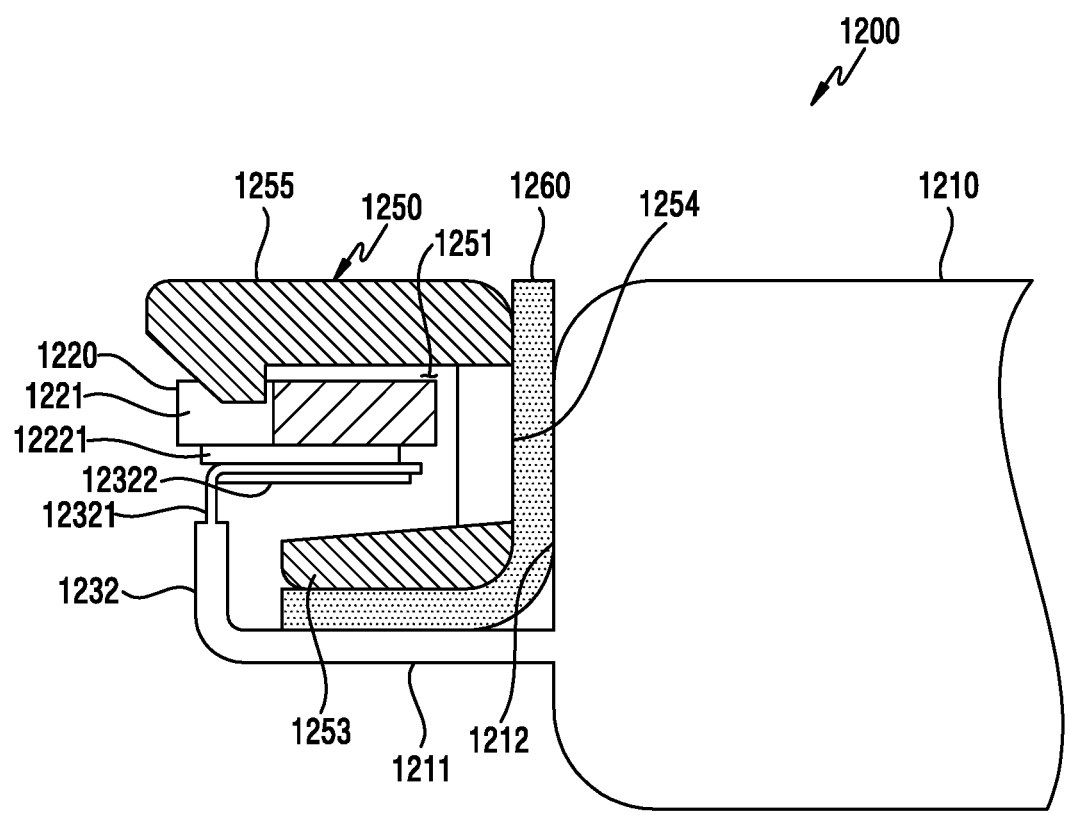
FIG. 13C is a sectional view, cut along the line C-C', of a battery pouch of FIG. 12 according to various embodiments of the present disclosure.

FIG. 13C is a sectional view, cut along the line C-C' of a battery pouch of FIG. 12 according to various embodiments of the present disclosure.

Referring to FIG. 13C, the electrode connection portion 1232 protruding from the pouch terrace 1211 may maintain a state of being electrically connected to the PCM 1220 installed inside the accommodating space 1251 by detouring the second plate 1253 of a case 1250. According to an embodiment of the present disclosure, the electrode connection portion 1232 may include the conductive terminal 12321 extended from a pouch terrace 1211 and a conductive plate 12322 for electrically connecting the conductive terminal 12321 to the PCM 1220.

According to various embodiments of the present disclosure, the case 1250 may include a fixing structure by which the PCM 1220 is fixed inside the accommodating space 1251. The PCM 1220 may include a stopper rib 1255 formed inside the accommodating space 1251 of the case 1250. When the PCM 1220 is placed in the accommodating space 1251 of the case 1250, a stopper recess 1221 may be formed at a position corresponding to the stopper rib 1255. Accordingly, the PCM 1220 may be fixed in such a manner that the stopper recess 1255 of the case 1250 is stopped at the stopper recess 1221.

Figure 13D:
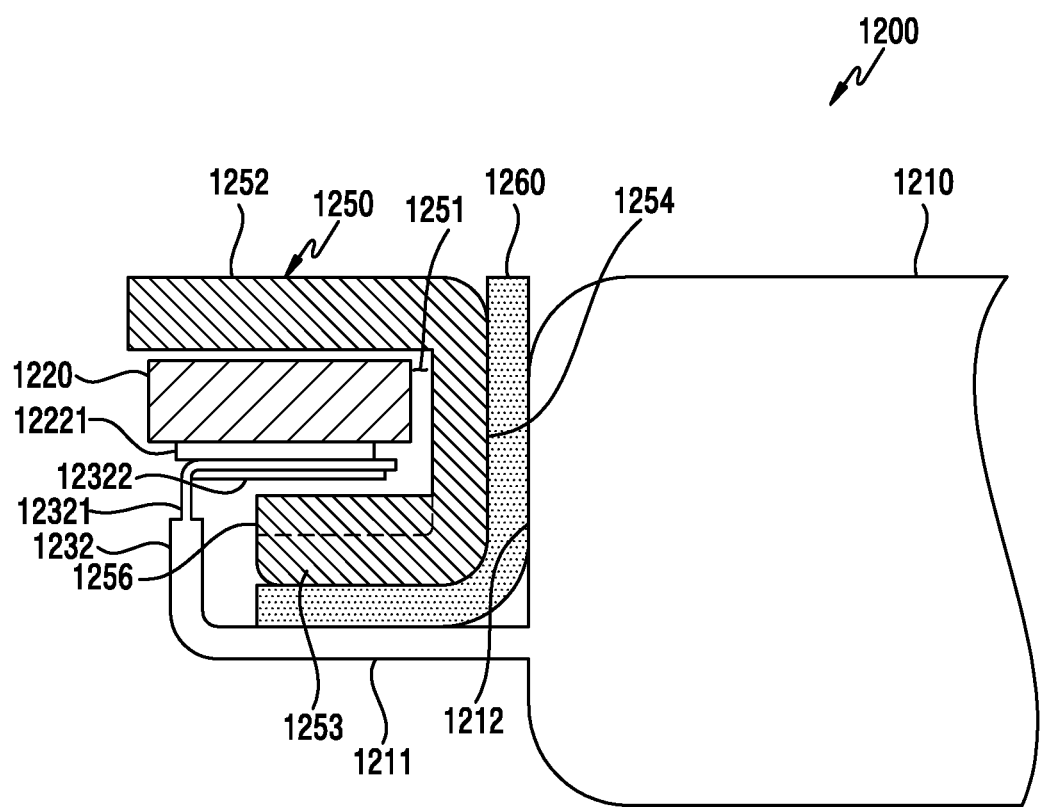
FIG. 13D is a sectional view, cut along the line D-D', of a battery pouch of FIG. 12 according to various embodiments of the present disclosure.

FIG. 13D is a sectional view, cut along the line D-D' of a battery pouch of FIG. 12 according to various embodiments of the present disclosure.

Referring to FIG. 13D, the electrode connection portion 1232 protruding from the pouch terrace 1211 may maintain a state of being electrically connected to the PCM 1220 installed inside the accommodating space 1251 by detouring the second plate 1253 of a case 1250. According to an embodiment of the present disclosure, the electrode connection portion 1232 may include the conductive terminal 12321 extended from the pouch terrace 1211 and the conductive plate 12322 for electrically connecting the conductive terminal 12321 to the PCM 1220.

According to various embodiments of the present disclosure, the case 1250 may include a plurality of supporting ribs 1256 protruding from the second plate 1253 with a specific interval in a direction of the accommodating space 1251. The supporting rib 1256 may support one surface of the PCM 1220 placed in the accommodating space 1251 to provide a spacer for minimizing a contact area with respect to an inner portion of the case 1250, thereby facilitating a buffering effect. The supporting rib 1256 may be disposed at a position for supporting the electrode connection portion 1232 of the PCM 1220.

Figure 13E:
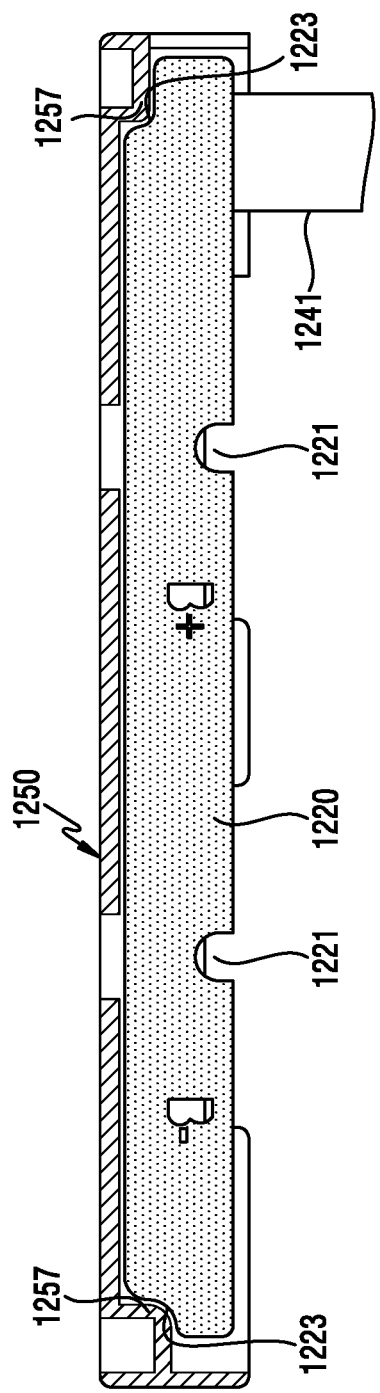
FIG. 13E is a sectional view, cut along the line E-E', of a battery pouch of FIG. 12 according to various embodiments of the present disclosure.

FIG. 13E is a sectional view, cut along the line E-E' of a battery pouch of FIG. 12 according to various embodiments of the present disclosure.

Referring to FIG. 13E, the case 1250 may include at least one supporting rib 1257 formed inside the accommodating space 1251. According to an embodiment of the present disclosure, the PCM 1220 may include at least one mounting portion 1223 formed at a corresponding position. When the PCM 1220 is placed in the accommodating space 1251 of the case 1250, the supporting rib 1257 is mounted to the mounting portion 1223 to guide the PCM 1220 so that a position thereof is not deviated.

Figure 14A:
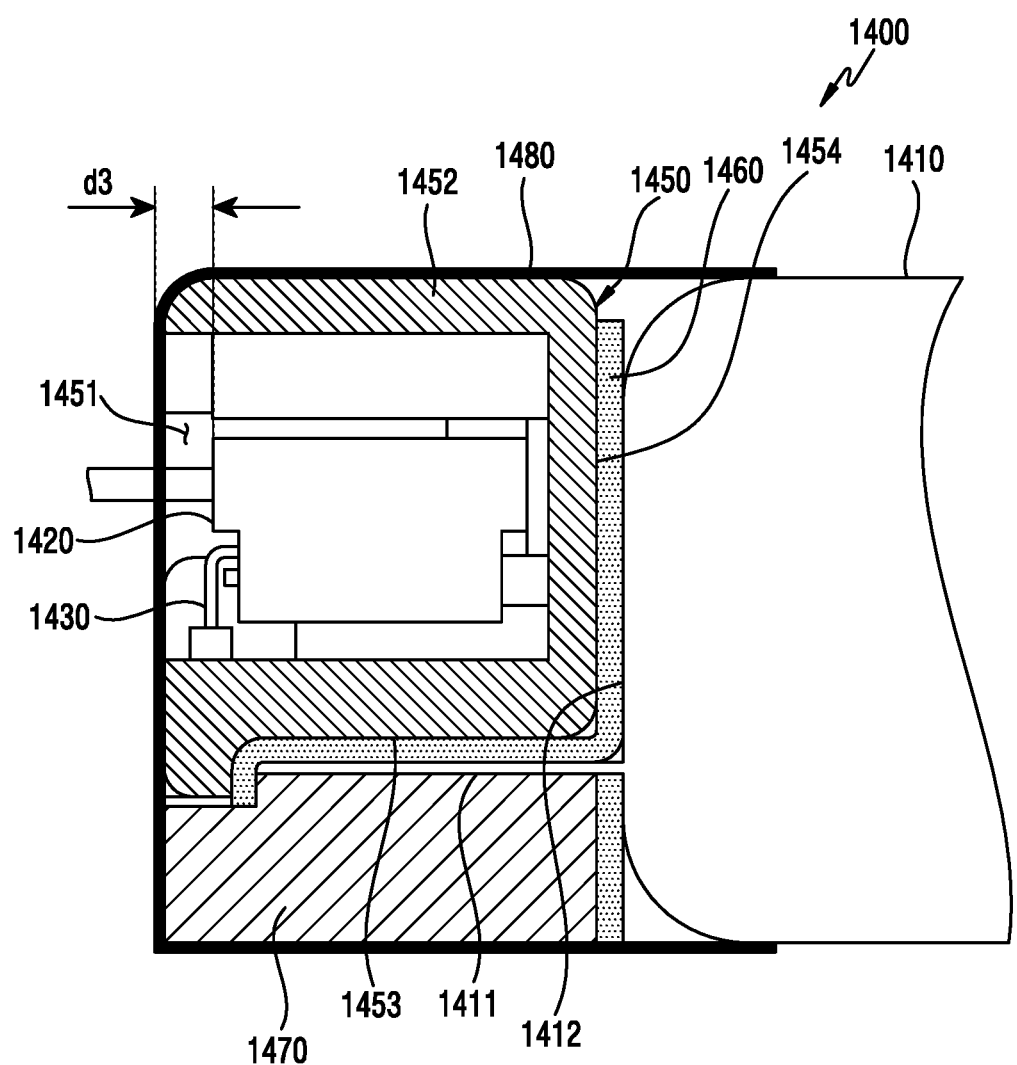
FIG. 14A is a sectional view illustrating a state where a battery is assembled according to various embodiments of the present disclosure.

FIG. 14A is a sectional view illustrating a state where a battery is assembled according to various embodiments of the present disclosure.

A battery 1400 of FIG. 14A may be similar to the battery 370, or may include another embodiment of the present disclosure of the battery.

Referring to FIG. 14A, the battery 1400 may include a battery pouch 1410 including a battery cell, a case 1450 fixed to one side of the battery pouch 1410, and a PCM 1420 disposed in an inner accommodating space 1451 of the case 1450.

According to various embodiments of the present disclosure, the case 1450 may include a first plate 1452, a second plate 1453 disposed to be spaced apart from the first plate 1452, and a lateral plate 1454 fixed to the battery pouch 1410 to connect the first plate 1452 and the second plate 1453. The PCM 1420 may be electrically connected in such a manner that an electrode connection portion 1430 (e.g., a conductive terminal and a conductive plate) extended from the battery pouch 1410 is provided by disposing to an accommodating space of the case 1450 along an outer surface of the second plate 1453.

According to various embodiments of the present disclosure, the case 1450 may have the accommodating space 1451 prepared to accommodate the PCM 1420 by means of the first plate 1452, the second plate 1453, and the lateral plate 1454. The case 1450 may accommodate the PCM 1420 in the accommodating space 1451, and thereafter may be bent multiple times, so that an outer surface of the lateral plate 1454 is attached to a lateral wall 1412 of the battery pouch 1410 by means of a coupling member 1460. The coupling member 1460 may be disposed to be extended to the lateral plate 1454 and second plate 1453 of the case 1450. Accordingly, the case 1450 may be attached to the lateral wall 1412 of the battery pouch 1410 and a pouch terrace 1411 by means of the coupling member 1460.

According to various embodiments of the present disclosure, the case 1450 may be formed such that at least a sub-area further protrudes in a direction opposite to a case placement direction than the PCM 1420 to which the accommodating space 1451 is disposed. The case 1450 may be formed such that the first plate 1451 has a protrusion amount d3 with respect to the PCM 1420. An impact or breakage caused by a direct contact from the outside of the PCM 1420 may be avoided by means of the first plate 1452 having such a protrusion amount. Even if a secondary impact caused by an external impact of the electronic device is delivered, the impact may be first delivered to the first plate 1452 of the case 1450 protruding further than the PCM 1420, thereby preventing breakage of the PCM 1420. The secondary impact delivered to the first plate 1452 may be cancelled through the lateral plate 1454 and coupling member 1460 which are in surface contact with the lateral wall 1412 of the battery pouch 1110, thereby preventing damage of a battery cell 600 inside thereof. The first plate of the case may be disposed in a position having substantially the same plate as an upper surface of the battery pouch. The second plate of the case may be disposed to have substantially the same plane as the pouch terrace of the battery pouch.

According to various embodiments of the present disclosure, the battery 1400 may include a supporting member 1470 disposed to compensate (e.g., support or seal) a step height of a portion to which the case 1450 is not attached with respect to the pouch terrace 1411 of the lateral wall 1412 in the battery pouch 1410. The supporting member 1470 may support the electrode connection portion 1430 together with the second plate 1453 of the case 1450 in a sandwich manner. The supporting member 1470 may uniformly ensure a distribution area of the secondary impact for the battery pouch 1410, and may prevent a rotational movement of the PCM 1420 and the case 1450, which may occur due to an external impact caused by a contact area imbalance between the lateral wall 1412 and the lateral plate 1454 to avoid breakage of the electrode connection portion 1430 (e.g., a conductive terminal and a conductive plate) inside the battery 1400. The supporting member 1470 may provide an effect of surrounding a periphery of the electrode connection portion 1430 in a sandwich manner, and may provide a structure for avoiding buckling caused by external force applied perpendicularly to a direction of extending the electrode connection portion.

According to one embodiment of the present disclosure, the supporting member 1470 may be disposed in such a manner that it is assembled to the case 1450 as a separate injection object of the same material as the case 1450. The supporting member 1470 may include rubber, urethane, silicone, adhesive agents, or the like having different elasticity. When the supporting member 1470 is disposed outside the battery 1400, it may be replaced with a part of the housing of the electronic device. When the supporting member 1470 is formed as a rigid body, a certain distance may be ensured between the battery pouch 1410 and the electrode connection portion 1430 to prevent a primary impact from being directly applied to the battery pouch 1410.

According to various embodiments of the present disclosure, the supporting member 1470 may be disposed to further protrude than the second plate 1453 and the electrode connection portion 1430. The supporting member 1470 may be disposed to have the same protrusion amount as the first plate 1452. The supporting member 1470 may be disposed to protrude further than the first plate 1452.

According to various embodiments of the present disclosure, the battery 1400 may include a finishing member 1480 applied to finish the case 1450 in which the PCM 1420 is accommodated in a state where the case 1450 is fixed to the lateral wall 1412 of the battery pouch 1410. The finishing member 1480 may include a finishing tape or a protective label, and may be arranged to be attached to at least a sub-area of an outer surface of the battery pouch 1410 while surrounding substantially the entire area of the case 1450 by including the PCM 1420. The finishing member 1480 may be disposed by including the supporting member 1470. The supporting member 1470 may be disposed to be attached to or in contact with an outer surface of the finishing member 1480.

According to various embodiments of the present disclosure, the supporting member 1470 may be formed such that a corresponding surface thereof has a shape for accommodating the pouch terrace 1411 or the conductive terminal 1430. The supporting member 1470 may include a hollow portion (e.g., a recess) capable of accepting a change in a shape (e.g., a shape change caused by an external impact, etc.) of the pouch terrace 1411 or the conductive terminal 1430, or a change in a movement (e.g., a positional change caused by an external impact, etc.). The hollow portion may accommodate the pouch terrace 1411 or the conductive terminal which may have a multiple-bent shape or a foldable shape.

Figure 14B:
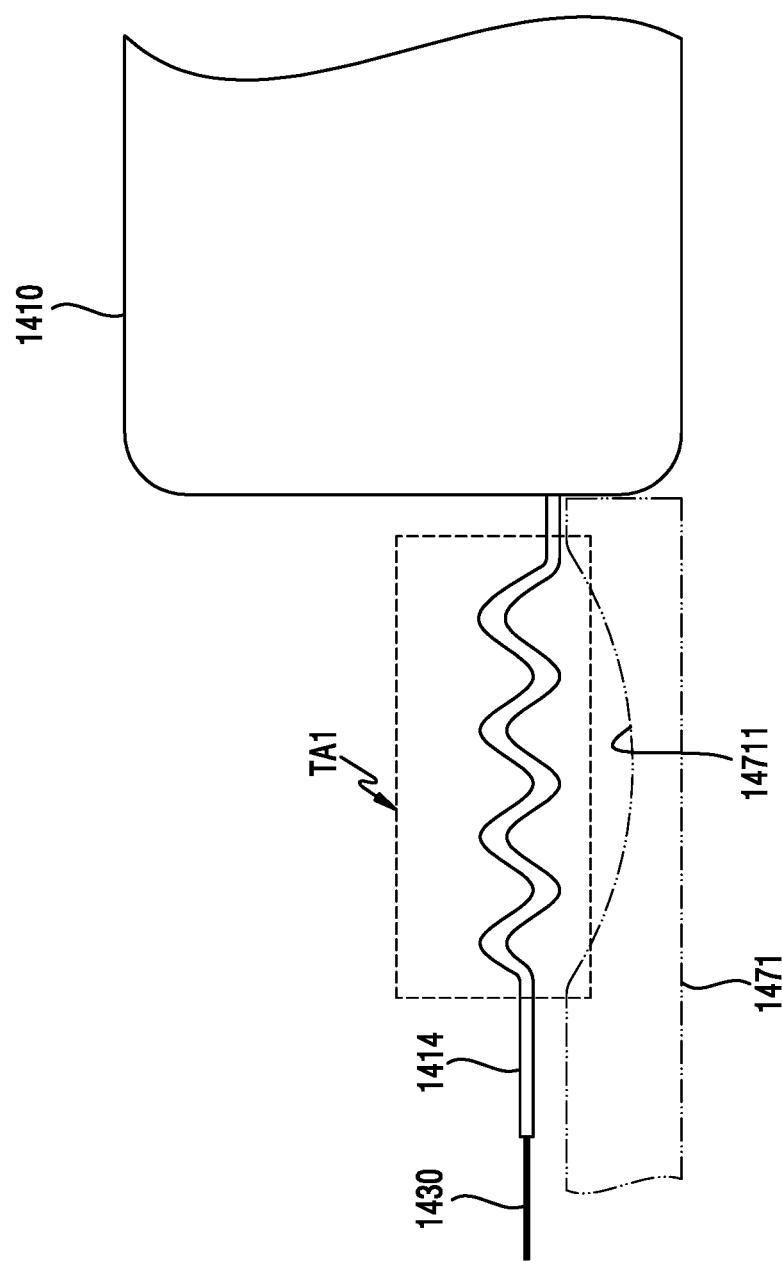

FIG. 14B and FIG. 14C illustrate a shape of a pouch terrace according to various embodiments of the present disclosure.

Referring to FIG. 14B and FIG. 14C, the battery pouch 1410 may protrude with a specific length to be a sealing portion, and may include a pouch terrace 1414 in which the conductive terminal 1430 is exposed at an ending portion. According to an embodiment of the present disclosure, since the pouch terrace 1414 is formed such that a sub-area TA1 has a foldable shape, a buffering effect may be provided when an external impact is delivered.

According to various embodiments of the present disclosure, a supporting member 1471 may be disposed in a lower side of the pouch terrace 1414, and a recess 14711 may be formed in a portion of the supporting member 1471 corresponding to the area TA1. When the pouch terrace 1414 including the conductive terminal 1430 is changed by an external impact, the recess 14711 may accommodate a changed portion of the pouch terrace 1414, thereby preventing breakage of the battery pouch 1410 caused by the pushing of the pouch terrace 1414 or the conductive terminal 1430.

Figure 14D:
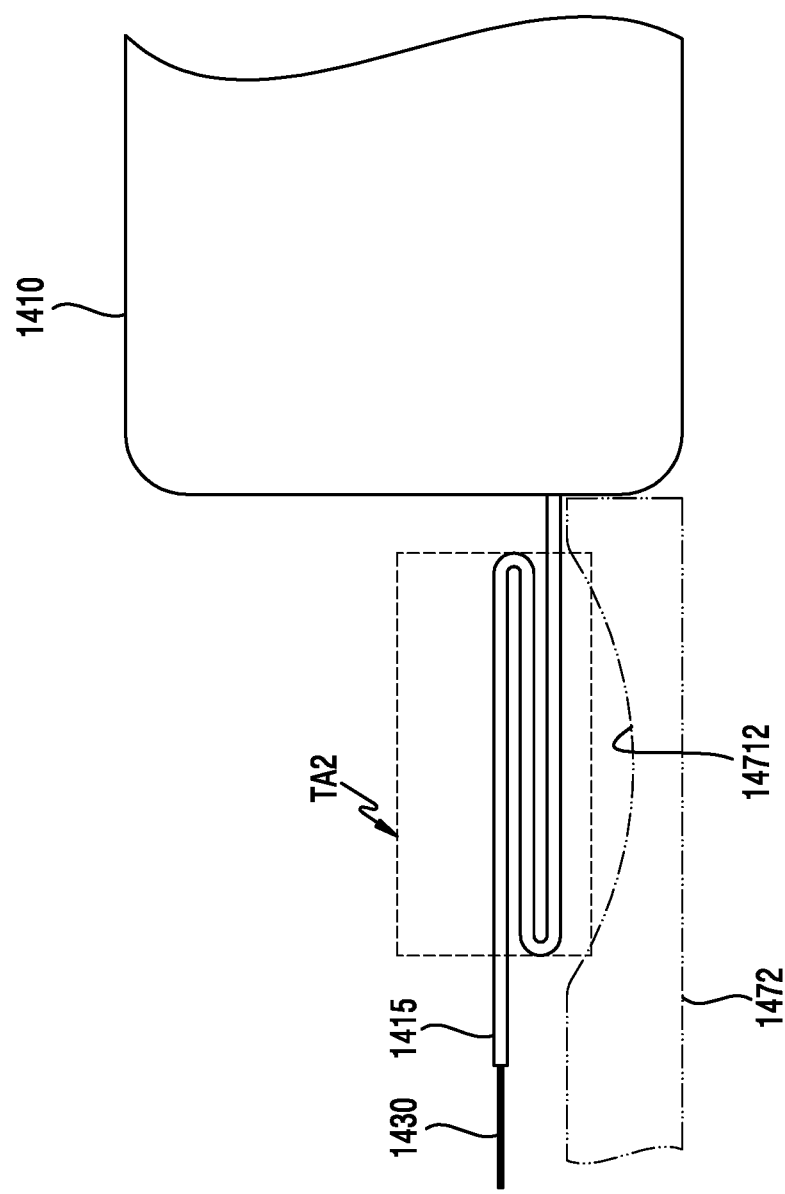
Figure 14E:
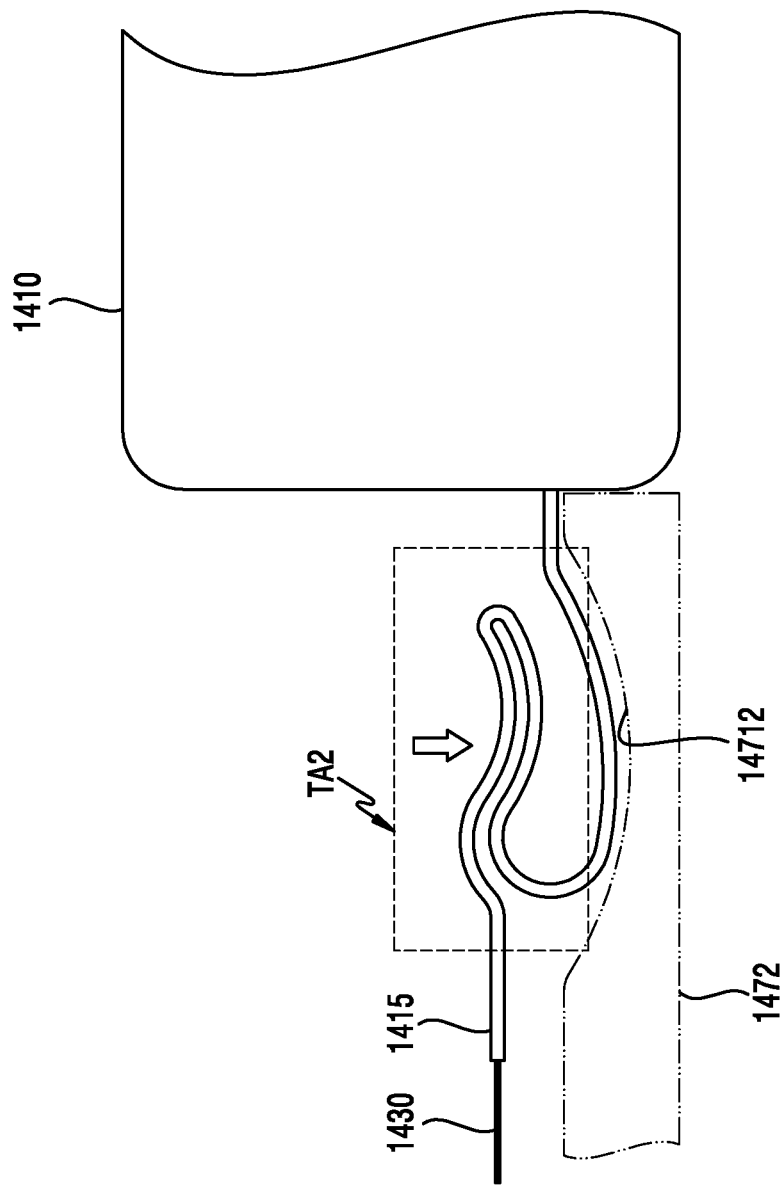

FIG. 14D and FIG. 14E illustrate a shape of a pouch terrace according to various embodiments of the present disclosure.

Referring to FIG. 14D and FIG. 14E, the battery pouch 1410 may protrude with a specific length to be a sealing portion, and may include a pouch terrace 1415 in which the conductive terminal 1430 is exposed at an ending portion. According to an embodiment of the present disclosure, since the pouch terrace 1415 may be formed such that a sub-area TA2 thereof is perpendicularly folded multiple times, a buffering effect may be provided when an external impact is delivered.

According to various embodiments of the present disclosure, a supporting member 1472 may be disposed in a lower side of the pouch terrace 1415, and a recess 14712 may be formed in a portion of the supporting member 1472 corresponding to the area TA2. When the pouch terrace 1415 including the conductive terminal 1430 is changed by an external impact, the recess 14712 may accommodate a changed portion of the pouch terrace 1415, thereby preventing breakage of the battery pouch 1410 caused by the pushing of the pouch terrace 1415 or the conductive terminal 1430.

However, a portion having a foldable shape of the aforementioned pouch terraces 1414 and 1415 or a portion disposed in a foldable manner may be extended to not only the pouch terrace but also the conductive terminal 1430 exposed from the pouch terrace or may be formed only in the conductive terminal 1430.

Figure 15A:
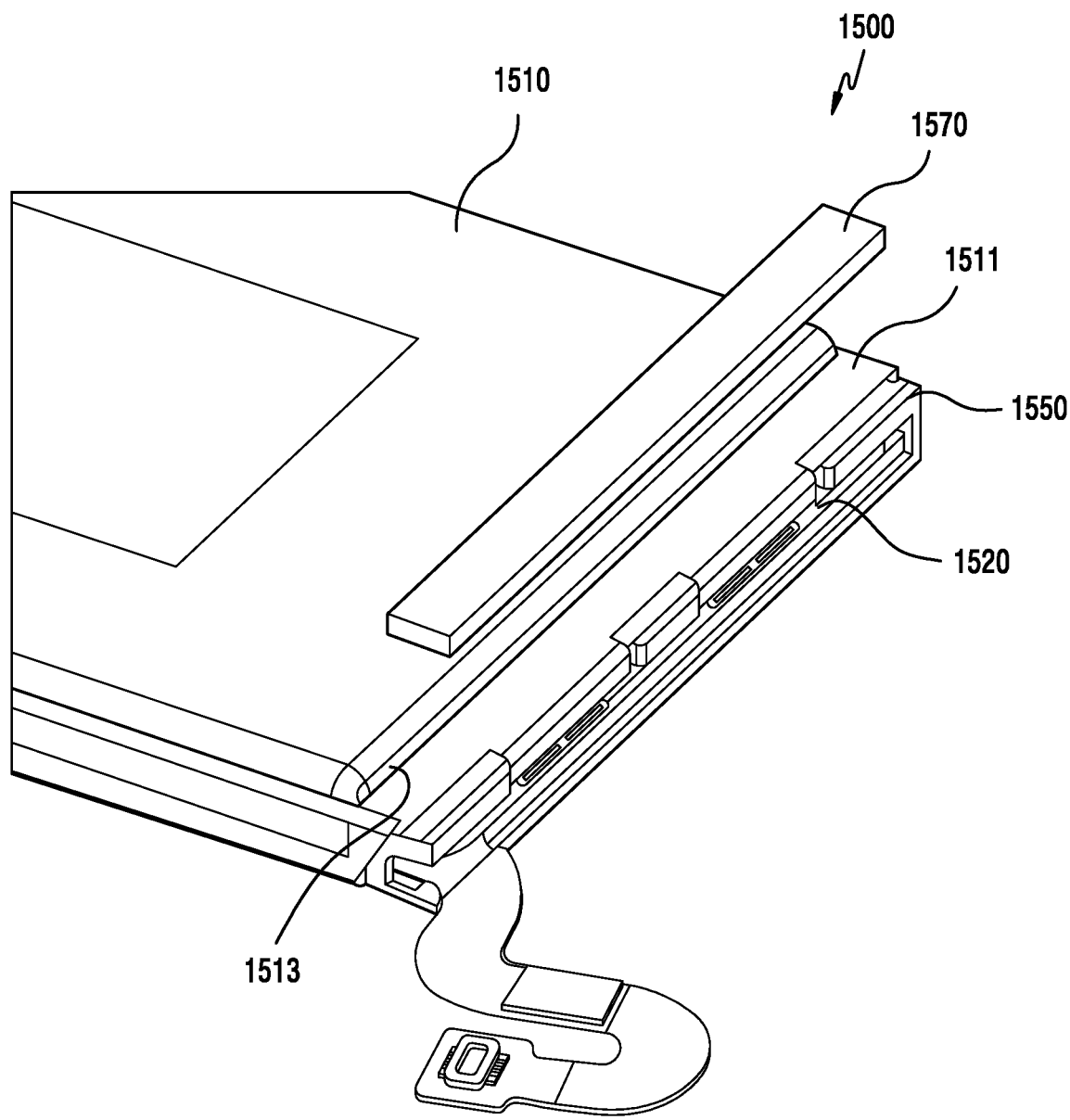
FIG. 15A and FIG. 15B illustrate a state where a supporting member is assembled in a battery pouch according to various embodiments of the present disclosure.
Figure 15B:
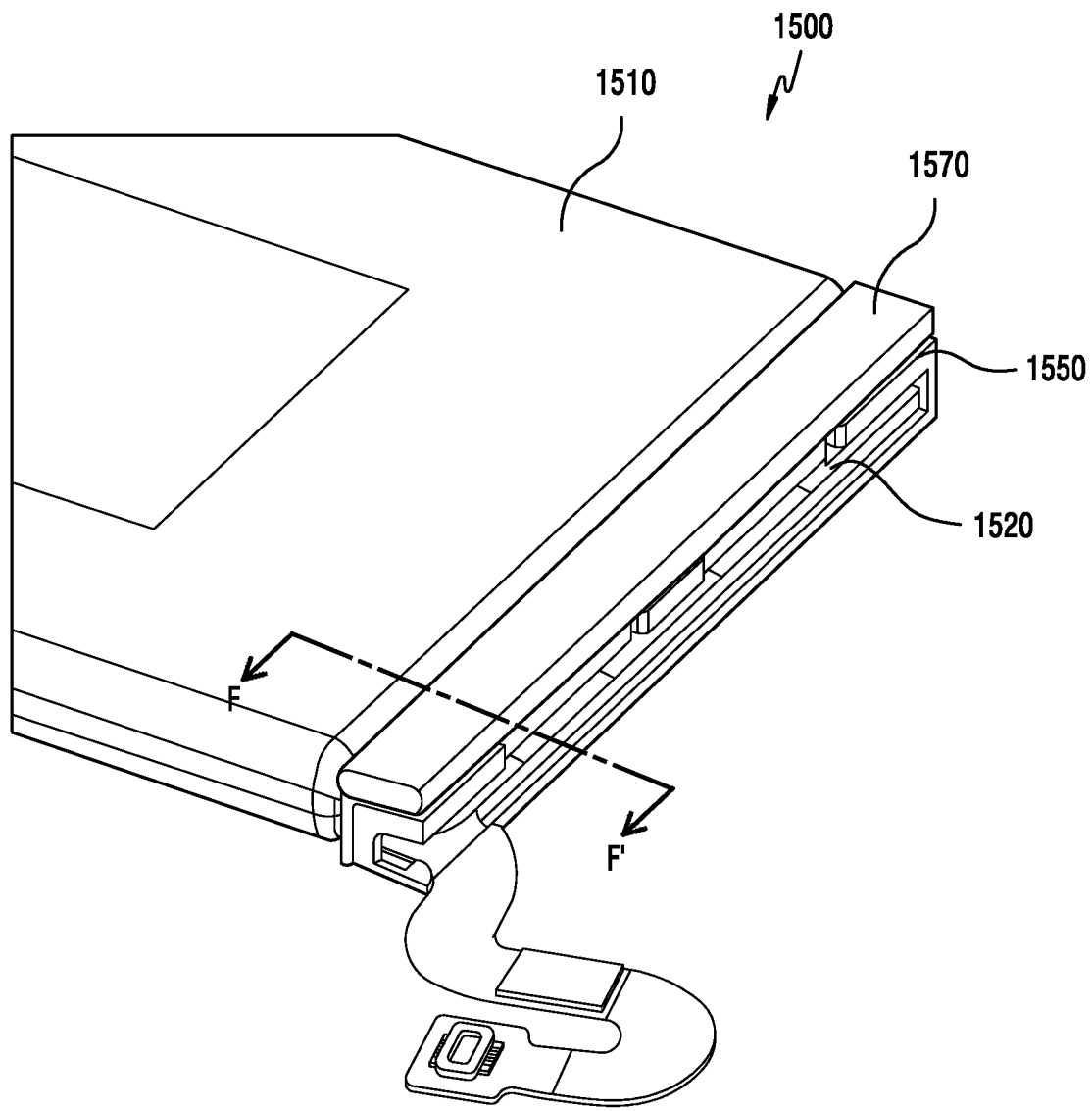
Figure 15C:
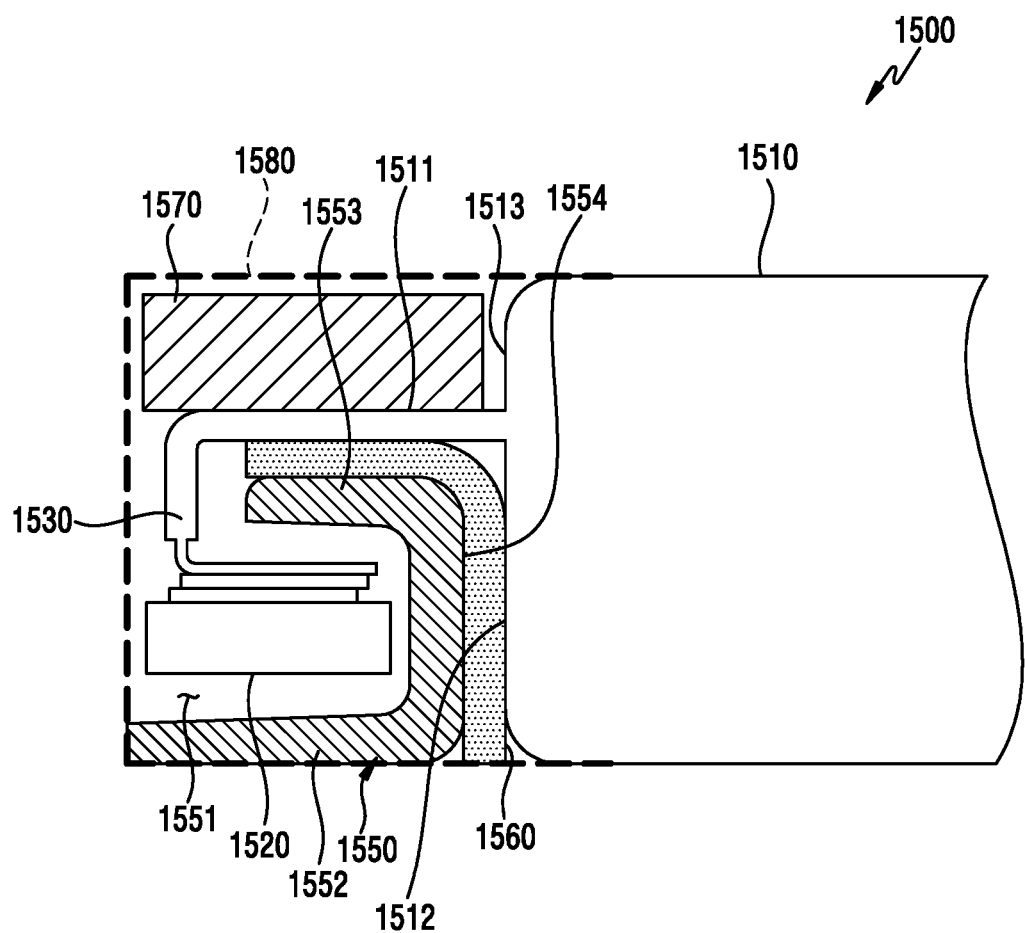
FIG. 15C is a sectional view, cut along the line F-F' of FIG. 15B, according to various embodiments of the present disclosure.

FIG. 15A and FIG. 15B illustrate a state where a supporting member is assembled in a battery pouch according to various embodiments of the present disclosure. FIG. 15C is a sectional view, cut along the line F-F' of FIG. 15B according to various embodiments of the present disclosure.

A battery 1500 of FIG. 15A may be similar to the battery 370, or may include another embodiment of the battery.

Referring to FIG. 15A to FIG. 15C, the battery 1500 may include a battery pouch 1510 including a battery cell, a case 1550 fixed to one side of the battery pouch 1510, a PCM 1520 disposed in an inner accommodating space 1551 of the case 1550, and a supporting member 1570 for compensating (e.g., supporting, or sealing) a second lateral wall 1513 of the battery pouch 1510 to which the case 1550 is not placed.

According to various embodiments of the present disclosure, the case 1550 may include a first plate 1552, a second plate 1553 disposed to be spaced apart from the first plate 1552, and a lateral plate 1554 attached to the first lateral wall 1512 of the battery pouch 1510 to connect the first plate 1552 and the second plate 1553. The PCM 1520 may be electrically connected in such a manner that an electrode connection portion 1530 (e.g., a conductive terminal and a conductive plate) extended from the battery pouch 1510 is provided by detouring to an accommodating space of the case 1550 along an outer surface of the second plate 1553.

According to various embodiments of the present disclosure, the battery pouch 1510 may include lateral walls 1512 and 1513 from which a pouch terrace 1511 protrudes. The lateral wall may include the first lateral wall 1512 located on one side (e.g., a lower side) of the protruding pouch terrace 1511 and the second lateral wall 1513 located at the other side (e.g., an upper side) of the pouch terrace 1151. The first lateral wall 1512 may accommodate the case 1550 including the PCM 1520, and the second lateral wall 1513 may accommodate the supporting member 1570 for compensating (e.g., supporting or sealing) a step height. An attachment area of the case 1550 and an attachment area of the supporting member 1570 may be configured to substantially correspond to an area of the lateral walls 1512 and 1513 of the battery pouch 1510.

According to various embodiments of the present disclosure, the case 1550 may have the accommodating space 1552 prepared to accommodate the PCM 1520 by means of the first plate 1552, the second plate 1553, and the lateral plate 1554. The case 1550 may accommodate the PCM 1520 in the accommodating space 1551, and thereafter may be bent multiple times, so that an outer surface of the lateral plate 1554 is attached to the lateral wall 1512 of the battery pouch 1510 by means of a coupling member 1560. The coupling member 1560 may be disposed to be extended to the lateral plate 1554 and second plate 1553 of the case 1550.

According to various embodiments of the present disclosure, the case 1550 may be formed such that at least a sub-area further protrudes in a direction opposite to a case placement direction than the PCM 1520 to which the accommodating space 1551 is disposed. As illustrated, the case 1550 may be formed such that the first plate 1551 has a protrusion amount greater than the PCM 1520. An impact or breakage caused by a direct contact from the outside of the PCM 1520 may be avoided by means of the first plate 1552 having such a protrusion amount. Even if a secondary impact caused by an external impact of the electronic device is delivered, the impact may be first delivered to the first plate 1552 of the case 1550 protruding further than the PCM 1520, thereby preventing breakage of the PCM 1520. The secondary impact delivered to the first plate 1552 may be cancelled through the lateral plate 1554 and coupling member 1560 which are in surface contact with the lateral wall 1512 of the battery pouch 1110, thereby preventing damage of a battery cell 600 inside thereof.

According to various embodiments of the present disclosure, the supporting member 1570 may be in contact with or fixed to a surface of the pouch terrace 1511. The supporting member 1570 may be disposed to be in contact with or adjacent to the second lateral wall 1513 of the battery pouch 1510 while being in contact with the surface of the pouch terrace 1511. The supporting member 1570 may be applied to uniformly ensure a distribution area of a secondary impact for the battery pouch 1510. The supporting member 1570 may provide an effect of surrounding a periphery of the electrode connection portion 1530 in a sandwich manner, and may provide a structure for avoiding buckling caused by external force applied perpendicularly to a direction of extending the electrode connection portion. The supporting member 1570 may be disposed to protrude further than the second plate 1553 and the electrode connection portion 1530. The supporting member 1570 may be disposed to have the same protrusion amount as the first plate 1552. However, the present disclosure is not limited thereto, and thus, the supporting member 1570 may be disposed to protrude further than the first plate 1552.

According to various embodiments of the present disclosure, the battery 1500 may include a finishing member 1580 applied to finish the case 1550 in which the PCM 1520 is accommodated in a state where the case 1550 is fixed to the first lateral wall 1512 of the battery pouch 1510 and the supporting member 1570 is attached to the second lateral wall 1513 or the pouch terrace 1511.

Figure 16:
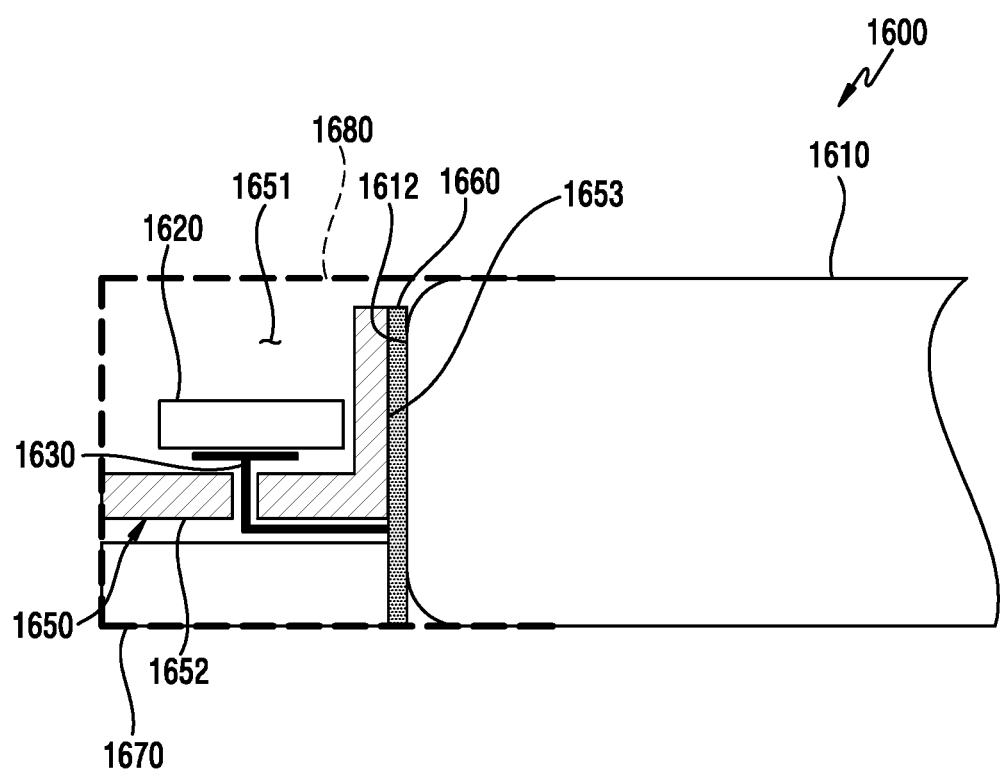
FIG. 16 and FIG. 17 are sectional views illustrating a state where a battery is assembled according to various embodiments of the present disclosure.
Figure 17:
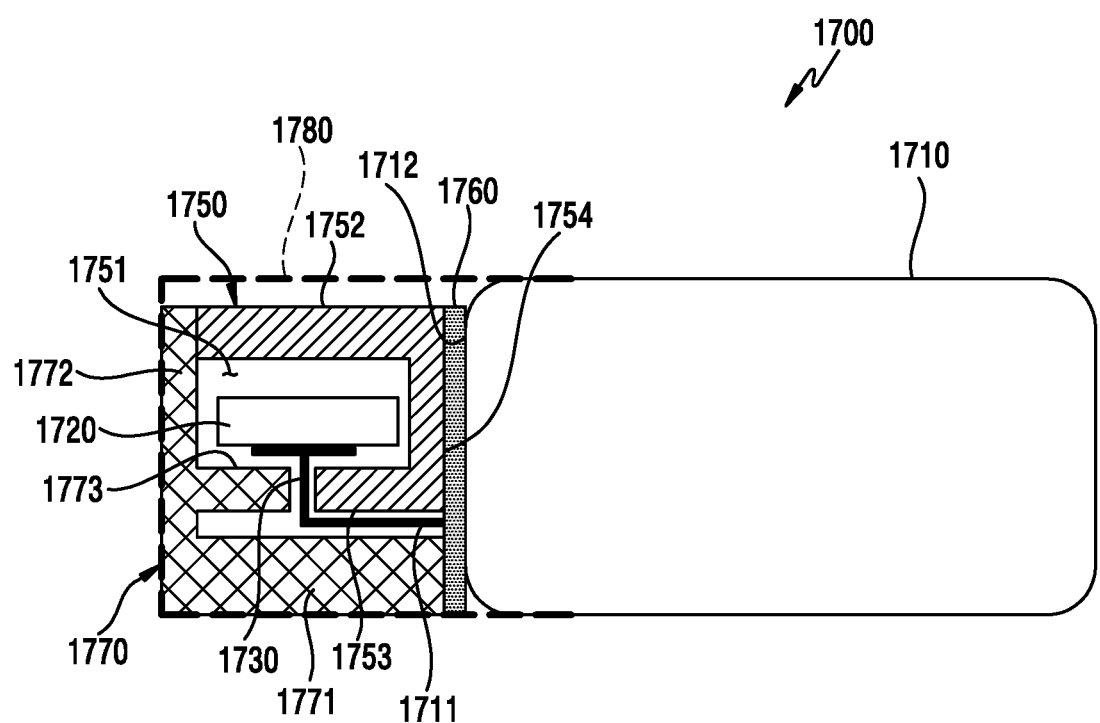

FIG. 16 and FIG. 17 are sectional views illustrating a state where a battery is assembled according to various embodiments of the present disclosure.

Referring to FIG. 16, a battery 1600 may include a battery pouch 1610 including a battery cell, a case 1650 fixed to one side of the battery pouch 1610, a PCM 1620 disposed in an inner accommodating space 1651 of the case 1650, and a supporting member 1670 for compensating (e.g., supporting or sealing) a remaining area of a lateral wall 1612 of the battery pouch 1610 to which the case 1650 is not placed, other than a portion to which the case 1650 is attached.

According to various embodiments of the present disclosure, the case 1650 for accommodating the PCM 1620 may be applied in an 'L' shape. The case 1650 may include a first plate 1652 and a lateral plate 1653 extended to have a specific length perpendicularly from an ending portion of the first plate 1652. The PCM 1620 may be disposed on the rectangular accommodating space 1651 formed by the first plate 1652, the lateral plate 1653, and a virtual extension line constituted by the first plate 1652 and the lateral plate 1653. The PCM 1620 may be extended from the battery pouch 1610 and may be electrically connected to the electrode connection portion 1630 disposed by detouring or penetrating at least a sub-area of the first plate 1652. The supporting member 1670 may be disposed to a step height area other than an area to which the case 1650 is disposed, and the supporting member 1670 and the lateral plate 1653 of the case 1650 may be attached to the lateral wall 1612 of the battery pouch 1610 by means of one coupling member 1660. However, the present disclosure is not limited thereto, and thus the case 1650 and the supporting member 1670 may be fixed to the lateral wall 1612 by means of a separate coupling member. In this case, the first plate 1652 may be formed to have a greater protrusion amount than the PCM 1650 and the electrode connection portion 1630. The supporting member 1670 may also be disposed to have a protrusion amount the same as or greater than the first plate 1652. The battery 1600 may be finished to cover the case 1650 and the supporting member 1670 by using a finishing member 1680.

Referring to FIG. 17, a battery 1700 may include a battery pouch 1710 including a battery cell, a first case 1750 fixed to one side of the battery pouch 1710, a second case 1770 structurally coupled to the first case 1750 to provide a closed accommodating space 1751 for substantially accommodating a PCM 1720, and the PCM 1720 disposed in the accommodating space 1751 formed by the first case 1750 and the second case 1770.

According to various embodiments of the present disclosure, the first case 1750 for accommodating the PCM 1720 may be applied in a 'ㄷ' shape. The first case 1750 may include a first plate 1752, a second plate 1753 facing the first plate 1752 in a spaced apart manner, and a lateral plate 1754 for connecting the first plate 1752 and the second plate 1753. The lateral plate 1754 may be fixed to a lateral wall 1712 of the battery pouch 1710 by means of a coupling member 1760. The second plate 1753 may be formed to have a shorter length than the first plate 1752. The second plate 1753 may be disposed adjacent to or in contact with the pouch terrace 1711 at one side of the pouch terrace 1711.

According to various embodiments of the present disclosure, the second case 1770 may include a third plate 1771 disposed adjacent to or in contact with a pouch terrace 1711 at the other side of the pouch terrace 1711, a fourth plate 1772 extended from the third plate 1771 to an ending portion of the first plate 1752, and a fifth plate 1773 disposed adjacent to an ending portion of the second plate 1753 by being branched from the fourth plate 1772. The accommodating space 1751 may include a substantially closed space by connecting the first plate 1752, the lateral plate 1754, the second plate 1753, the fifth plate 1773, and the fourth plate 1772. The electrode connection portion 1730 extended from the pouch terrace 1711 may be inserted to the accommodating space 1751 through a space between the second plate 1753 and the fifth plate 1773 and may be electrically connected to the PCM 1720.

According to various embodiments of the present disclosure, the third plate 1771 being disposed to the other side of the pouch terrace 1711 may be formed with a thickness capable of compensating (e.g., supporting or sealing) a portion of the lateral wall 1712 of the battery pouch 1710 other than a portion to which the lateral plate 1754 of the first case 1750 is attached, and may be attached to the lateral wall by means of the coupling member 1760 together with the first case 1750. The battery 1700 may be finished by a finishing member 1780.

Figure 18:
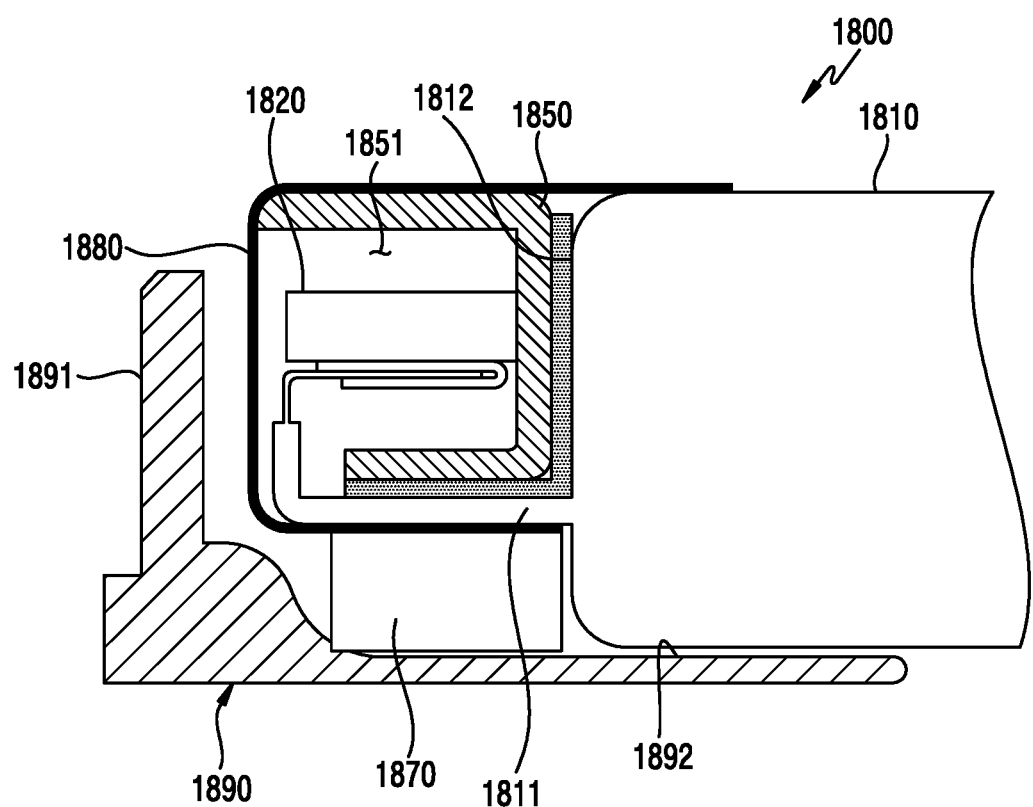
FIG. 18 and FIG. 19 are sectional views illustrating a structure of supporting a battery according to various embodiments of the present disclosure.
Figure 19:
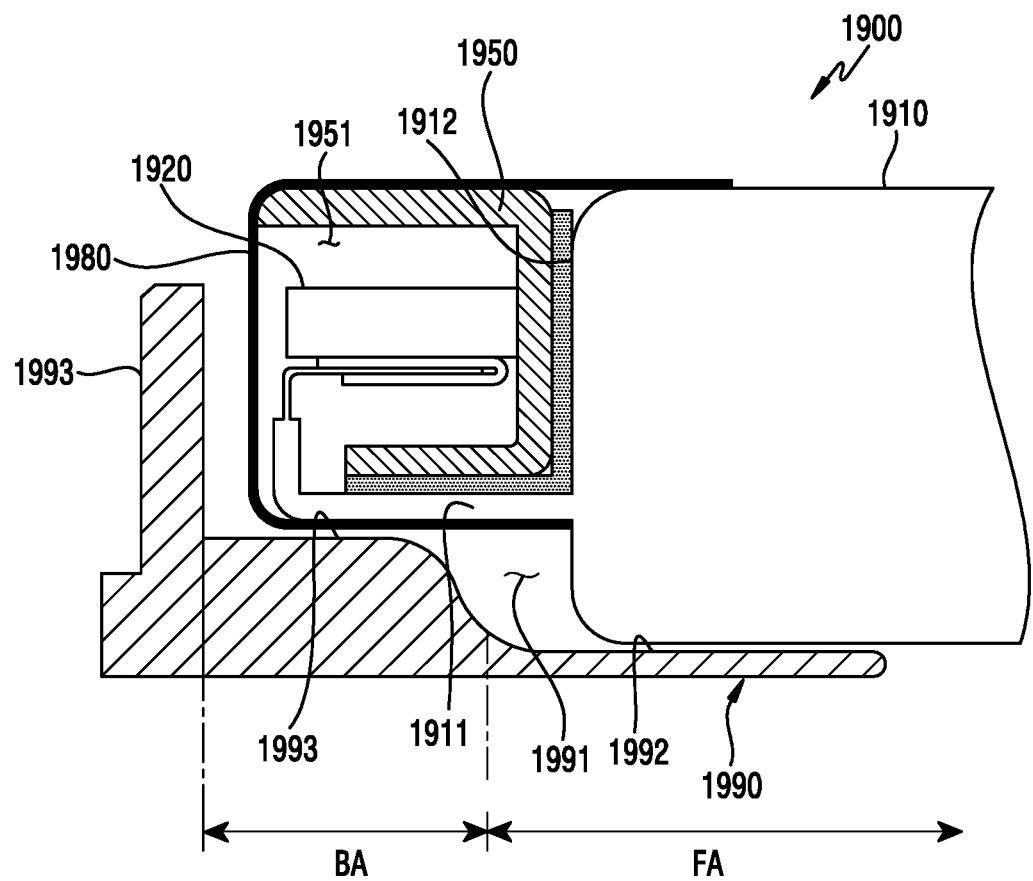

FIG. 18 and FIG. 19 are sectional views illustrating a structure of supporting a battery according to various embodiments of the present disclosure.

FIG. 18 and FIG. 19 illustrate a state where a supporting member is applied to the outside of a battery finished by a finishing member.

Referring to FIG. 18, a battery 1800 may include a battery pouch 1810 including a battery cell, a case 1850 fixed to one side of the battery pouch 1810, a PCM 1820 disposed in an inner accommodating space 1851 of the case 1850, and a finishing member 1880 attached to at least a sub-area of the battery pouch 1810 including the case 1850.

According to various embodiments of the present disclosure, since the battery 1800 has the case 1850 fixed to one side of a pouch terrace 1811 extended from a lateral wall 1812 of the battery pouch 1810, a step height of the pouch terrace 1811 may be formed even if it is finished by the finishing member 1880. When the battery 1800 is placed in a mounting portion 1892 formed in a housing 1890 of the electronic device by a guide rib 1891, a separate supporting member 1870 may be interposed between the mounting portion 1892 and the pouch terrace 1811. The supporting member 1870 may be a robust body, or an elastic member such as rubber, urethane, or silicon.

Referring to FIG. 19, a battery 1900 may include a battery pouch 1910 including a battery cell, a case 1950 fixed to one side of the battery pouch 1910, a PCM 1920 disposed in an inner accommodating space 1951 of the case 1950, and a finishing member 1980 attached to at least a sub-area of the battery pouch 1910 including the case 1950.

According to various embodiments of the present disclosure, since the battery 1900 has the case 1950 attached to one side of a pouch terrace 1911 which is extended from a lateral wall 1912 of the battery pouch 1910, a step height of the pouch terrace 1911 may be formed even if it is finished by the finishing member 1980. The battery 1900 may be placed in a mounting portion 1991 in a housing 1990 of the electronic device. In this case, a focal area (FA) of a bottom surface 1992 of the mounting portion 1991 may have a first thickness, and a boundary area (BA) of the bottom surface 1992 of a lateral surface 1993 for forming the mounting portion 1991 may have a second thickness. The second thickness may be formed to be greater than the first thickness to compensate for the aforementioned step height. The BA having the second thickness may be disposed to support at least a sub-area of the other side of the pouch terrace 1911 in a contact or adjacent manner.

A battery according to various embodiments of the present disclosure is designed by considering a replacement relation between a battery pouch and a case for protecting a circuit board (e.g., a PCM), thereby effectively preventing battery breakage caused by an external impact.

According to various embodiments of the present disclosure, an electronic device may include a housing including a mounting portion to which a battery is mountable, and the battery mounted to the mounting portion. The battery may include a battery pouch including at least one conductive terminal exposed to the outside, a circuit board electrically connected to the exposed at least one conductive terminal and having at least one circuit element mounted thereon to electrically protect the battery pouch, a case including a first plate, a second plate facing the first plate and spaced apart from the first plate, and a lateral plate surrounding at least a part of a space formed between the first plate and the second plate and connected to the first plate and the second plate, and a coupling member disposed between the lateral wall of the battery pouch and the lateral plate. The circuit board may be accommodated in the space of the case. The first plate or the second plate may further protrude than the circuit board in an opposite direction of the lateral wall.

According to various embodiments of the present disclosure, the lateral plate may be attached to the lateral wall by means of the coupling member 1160.

According to various embodiments of the present disclosure, the battery pouch having the exposed at least one conductive terminal may include a pouch terrace formed to seal the battery pouch. The first plate or the second plate may be disposed over or on the pouch terrace by means of the coupling member.

According to various embodiments of the present disclosure, the at least one conductive terminal may be electrically connected to the circuit board by detouring the first plate or the second plate.

According to various embodiments of the present disclosure, the first plate or the second plate may protrude further than the at least one conductive terminal in an opposite direction of the lateral wall.

According to various embodiments of the present disclosure, at least one stopper protrusion protruding to the space may be formed in the first plate or the second plate. At least one stopper recess at which the at least one stopper protrusion can be stopped may be formed in the circuit board.

According to various embodiments of the present disclosure, the first plate or the second plate may include at least one supporting rib protruding into the space, and may support at least one surface of the circuit board.

According to various embodiments of the present disclosure, an area of the lateral plate in contact with the lateral wall may be 65% to 100% of an area of the lateral wall.

According to various embodiments of the present disclosure, an area of the lateral plate in contact with the lateral wall may be formed to have the same area of a sub-area of the lateral wall and is attached to the lateral wall. The battery may further include a supporting member disposed to another sub-area of the lateral wall.

According to various embodiments of the present disclosure, the electronic device may further include a finishing member surrounding an ending portion of the first plate or an ending portion of the second plate, and extended to up to at least a sub-area of the battery pouch. The supporting member may be disposed outside the finishing member.

According to various embodiments of the present disclosure, the case, the coupling member, the supporting member, or the finishing member may be visually transparent.

According to various embodiments of the present disclosure, the mounting portion may include at least one supporting rib extended to a specific height along a boundary. At least a sub-area of the supporting rib may be visually transparent.

According to various embodiments of the present disclosure, a focal area of a bottom surface of the mounting portion may be a first thickness. A boundary area of the mounting portion may have a second thickness.

According to various embodiments of the present disclosure, at least a part of the at least one conductive terminal may surround at least a part of an outer surface of the first plate or the second plate. The supporting member may be disposed between the conductive terminal and the bottom surface of the mounting portion.

According to various embodiments of the present disclosure, the circuit board may be electrically connected to a printed circuit board disposed around the mounting portion by means of an FPCB in which a bent area is formed.

According to various embodiments of the present disclosure, an electronic device may include a housing including a mounting portion to which a battery is mountable, and the battery mounted to the mounting portion. The battery may include a battery pouch including at least one conductive terminal exposed to the outside, a circuit board electrically connected to the exposed at least one conductive terminal and having at least one circuit element mounted thereon to electrically protect the battery pouch, a case including a first plate and a lateral plate extended to be bent from the first plate, wherein the circuit board is accommodated in a space surrounded by the first plate and the lateral plate, and the first plate further protrudes than the accommodated circuit board in an opposite direction of a lateral wall of the battery pouch, and at least one supporting member disposed to support the first plate.

According to various embodiments of the present disclosure, the electronic device may further include a second plate facing the first plate and connected to surround a part of a space between the first plate and the lateral plate.

According to various embodiments of the present disclosure, the supporting member may have a hollow portion formed thereon to accept a change in a movement or a shape of the conductive terminal.

According to various embodiments of the present disclosure, the electronic device may include a finishing member surrounding an ending portion of the first plate of the case, and extended to up to at least a sub-area of the battery pouch. The supporting member may be disposed outside the finishing member.

According to various embodiments of the present disclosure, the at least one conductive terminal may surround at least a part of an outer surface of the first plate. The supporting member may be disposed between the conductive terminal and the bottom surface of the mounting portion.

According to various embodiments of the present disclosure, a battery may include a battery pouch including one pair of conductive terminals exposed to the outside, a circuit board electrically connected to the exposed one pair of conductive terminals and having at least one circuit element mounted thereon to electrically protect the battery pouch, a case including a first plate, a second plate facing the first plate and spaced apart from the first plate, and a lateral plate surrounding at least a part of a space formed between the first plate and the second plate and connected to the first plate and the second plate, a coupling member disposed between the lateral wall of the battery pouch and the lateral plate, and at least one supporting member disposed adjacent to the first plate or the second plate. The circuit board may be accommodated in the space of the case. The first plate or the second plate may further protrude than the circuit board in an opposite direction of the lateral wall.

According to various embodiments of the present disclosure, the lateral plate may be disposed in contact with or adjacent to one side of the pouch terrace in an area of the lateral wall. The supporting member may be disposed in contact with or adjacent to the other side of the pouch terrace in the area of the lateral wall.

According to various embodiments of the present disclosure, the at least one conductive terminal may be disposed to an outer surface of the first plate or the second plate. The supporting member may be disposed adjacent to a plate to which the conductive terminal is disposed to support the conductive terminal when the conductive terminal is disposed therebetween.

According to various embodiments of the present disclosure, the supporting member may be attached or fixed to the lateral wall by means of the at least one coupling member.

Each of the elements described in the present disclosure may consist of one or more components, and the names of the elements may vary depending on a type of an electronic device. The electronic device according to various embodiments of the present disclosure may include at least one of the elements described in the present disclosure. Some of the elements may be omitted, or additional elements may be further included. In addition, some of the elements of the electronic device according to the various embodiments of the present disclosure may be combined and constructed to one entity, so as to equally perform functions of corresponding elements before combination.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a housing having a mounting portion to which a battery is mountable; and
the battery mounted to the mounting portion,
wherein the battery comprises:
a battery pouch including at least one conductive terminal exposed to an area outside of the battery pouch;
a circuit board electrically connected to the exposed at least one conductive terminal and having at least one circuit element mounted thereon to electrically protect the battery pouch;
a case comprising a first plate, a second plate facing the first plate and spaced apart from the first plate, and a lateral plate surrounding at least a part of a space formed between the first plate and the second plate and connected to the first plate and the second plate; and
a coupling member disposed between a lateral wall of the battery pouch and the lateral plate, the lateral plate being coupled to the lateral wall of the battery pouch via the coupling member, wherein the coupling member is directly attached to the lateral wall of the battery pouch,
wherein the circuit board is disposed in the space of the case, and
wherein the first plate or the second plate extends from the lateral plate in a direction away from the lateral wall of the battery pouch, and protrudes further than the circuit board in the direction away from the lateral wall of the battery pouch.

2. The electronic device of claim 1, wherein when the lateral plate is attached to the lateral wall, the coupling member is connected to the circuit board.

3. The electronic device of claim 1,
wherein the battery pouch having the exposed at least one conductive terminal comprises a pouch terrace formed to seal the battery pouch, and
wherein at least one of the first plate and the second plate is disposed over or on the pouch terrace by means of the coupling member.

4. The electronic device of claim 1, wherein the at least one conductive terminal is electrically connected to the circuit board by disposing the first plate or the second plate.

5. The electronic device of claim 1, wherein at least one of the first plate and the second plate protrudes further than the at least one conductive terminal in an opposite direction of the lateral wall.

6. The electronic device of claim 1, wherein at least one of the first plate and the second plate includes at least one stopper protrusion protruding to the space formed in at least one of the first plate and the second plate, and
wherein at least one stopper recess at which the at least one stopper protrusion can be stopped is formed in the circuit board.

7. The electronic device of claim 1, wherein at least one of the first plate and the second plate comprises at least one supporting rib protruding into the space, and supports at least one surface of the circuit board.

8. The electronic device of claim 1, wherein an area of the lateral plate in contact with the lateral wall is 65% to 100% of an area of the lateral wall.

9. The electronic device of claim 1,
wherein an area of the lateral plate in contact with the lateral wall is formed to have the same area of a sub-area of the lateral wall and is attached to the lateral wall, and
wherein the battery further comprises a supporting member disposed on another sub-area of the lateral wall.

10. The electronic device of claim 9, further comprising a finishing member surrounding an ending portion of the first plate or an ending portion of the second plate, and extended up to at least a sub-area of the battery pouch, wherein the supporting member is disposed outside the finishing member.

11. The electronic device of claim 10, wherein at least one of the case, the coupling member, the supporting member, and the finishing member is visually transparent.

12. The electronic device of claim 11, wherein the mounting portion comprises at least one supporting rib extended to a specific height along a boundary, and at least a sub-area of the supporting rib is visually transparent.

13. The electronic device of claim 9, wherein a focal area of a bottom surface of the mounting portion has a first thickness, and a boundary area of the mounting portion has a second thickness.

14. The electronic device of claim 9,
wherein at least a part of the at least one conductive terminal surrounds at least a part of an outer surface of at least one of the first plate and the second plate, and
wherein the supporting member is disposed between the conductive terminal and a bottom surface of the mounting portion.

15. The electronic device of claim 1, wherein the circuit board is electrically connected to a printed circuit board disposed around the mounting portion by means of a flexible printed circuit board (FPCB) in which a bent area is formed.

16. An electronic device comprising:
a housing having a mounting portion to which a battery is mountable; and
the battery mounted to the mounting portion,
wherein the battery comprises:
a battery pouch including at least one conductive terminal exposed to an area outside of the battery pouch;
a circuit board electrically connected to the exposed at least one conductive terminal and having at least one circuit element mounted thereon to electrically protect the battery pouch;
a case comprising a lateral plate coupled to a lateral wall of the battery pouch via a coupling member between the lateral wall and the lateral plate, wherein the coupling member is directly attached to the lateral wall of the battery pouch, and a first plate extending from the lateral plate in a direction away from the lateral wall of the battery pouch, wherein the circuit board is disposed in a space surrounded by the first plate and the lateral plate, and the first plate protrudes further than the circuit board in the direction away from the lateral wall of the battery pouch; and
at least one supporting member disposed to support the first plate.

17. The electronic device of claim 16, further comprising a second plate facing the first plate and connected to surround a part of a space between the first plate and the lateral plate.

18. The electronic device of claim 16, wherein the at least one supporting member has a hollow portion formed thereon to accept a change in at least one of a movement and a shape of the conductive terminal.

19. The electronic device of claim 16, further comprising a finishing member surrounding an ending portion of the first plate of the case, and extended up to at least a sub-area of the battery pouch, wherein the supporting member is disposed outside the finishing member.

20. The electronic device of claim 16,
wherein the at least one conductive terminal surrounds at least a part of an outer surface of the first plate, and
wherein the supporting member is disposed between the conductive terminal and a bottom surface of the mounting portion.

21. A battery comprising:
a battery pouch comprising one pair of conductive terminals exposed to an area outside of the battery pouch;
a circuit board electrically connected to the exposed one pair of conductive terminals and having at least one circuit element mounted thereon to electrically protect the battery pouch;
a case comprising a first plate, a second plate facing the first plate and spaced apart from the first plate, and a lateral plate surrounding at least a part of a space formed between the first plate and the second plate and connected to the first plate and the second plate;
a coupling member disposed between a lateral wall of the battery pouch and the lateral plate, wherein the coupling member is directly attached to the lateral wall of the battery pouch; and
at least one supporting member disposed adjacent to at least one of the first plate and the second plate,
wherein the circuit board is disposed in the space of the case, and
wherein at least one of the first plate and the second plate protrudes further than the circuit board in a direction away from the lateral wall of the battery pouch.

22. The battery of claim 21,
wherein the lateral plate is disposed in at least one of contact with and adjacent to one side of a pouch terrace in an area of the lateral wall, and
wherein the at least one supporting member is disposed in at least one of contact with and adjacent to the other side of the pouch terrace in the area of the lateral wall.

23. The battery of claim 21,
wherein the at least one conductive terminal is disposed in an outer surface of at least one of the first plate and the second plate, and
wherein the supporting member is disposed adjacent to a plate to which the conductive terminal is disposed to support the at least one conductive terminal when the at least one conductive terminal is disposed therebetween.

24. The battery of claim 21, wherein the supporting member is attached or fixed to the lateral wall by means of the coupling member.

* * * * *